(12) United States Patent
Nishimaki et al.

(10) Patent No.: US 8,549,290 B2
(45) Date of Patent: Oct. 1, 2013

(54) SECRET SHARING SYSTEM, SHARING APPARATUS, SHARE MANAGEMENT APPARATUS, ACQUISITION APPARATUS, PROCESSING METHODS THEREOF, SECRET SHARING METHOD, PROGRAM, AND RECORDING MEDIUM

(75) Inventors: Ryo Nishimaki, Tokyo (JP); Koutarou Suzuki, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 13/264,445

(22) PCT Filed: Apr. 23, 2010

(86) PCT No.: PCT/JP2010/057274
§ 371 (c)(1),
(2), (4) Date: Oct. 14, 2011

(87) PCT Pub. No.: WO2010/123114
PCT Pub. Date: Oct. 28, 2010

(65) Prior Publication Data
US 2012/0030464 A1 Feb. 2, 2012

(30) Foreign Application Priority Data
Apr. 24, 2009 (JP) ................................. 2009-106031

(51) Int. Cl.
*H04L 29/06* (2006.01)
(52) U.S. Cl.
USPC ............................ 713/167; 713/162; 713/150
(58) Field of Classification Search
None
See application file for complete search history.

(56) References Cited

U.S. PATENT DOCUMENTS

| | | | |
|---|---|---|---|
| 6,363,481 B1 | 3/2002 | Hardjono | |
| 7,940,927 B2 * | 5/2011 | Futa et al. ........................ | 380/28 |
| 7,983,415 B2 * | 7/2011 | Al-Gahtani et al. ............ | 380/30 |
| 2007/0076871 A1 * | 4/2007 | Renes ........................... | 380/201 |

OTHER PUBLICATIONS

Kawashima, C., et al., "A study on Hierarchical Secret Sharing Schemes Using Product Codes," The 2008 Symposium on Cryptography and Information Security, Miyazaki, Japan, pp. 1-6 and 1/3-3/3, (Jan. 22, 2008) (with Partial English Translation).

Fujita, H., et al., "Sharing Multilevel Secrets among Groups Using Concatenation of Reed-Solomon Codes," IEICE Technical Report, vol. 108, No. 472, pp. 65-71, (Mar. 2, 2009).

Kurosawa, K., et al., "Introduction to Modern Cryptography," Lecture Series in Electronics, Information and Communication Engineers D-8, Total 14 Pages, (Mar. 31, 2004) (with Partial English Translation).

Shamir, A., "How to Share a Secret," Communications of the ACM, vol. 22, No. 11, pp. 612-613, (Nov. 1979).

(Continued)

Primary Examiner — David Y Jung
(74) Attorney, Agent, or Firm — Oblon, Spivak, McClelland, Maier & Neustadt, L.L.P.

(57) ABSTRACT

A secure secret sharing system is implemented. Shares SH($\alpha$, h($\alpha$)) are generated by secret sharing of secret information separately for each subset SUB($\alpha$); each of share management apparatuses PA($\alpha$, h($\alpha$)) generates a shared secret value DSH($\alpha$, h($\alpha$)) by performing a common operation to a corresponding share SH($\alpha$, h($\alpha$)) and common information containing a common value $\sigma(\alpha)$ shared in each subset SUB($\alpha$); and an acquisition apparatus generates a reconstructed secret value SUBSK($\alpha$) by reconstruction processing for each subset SUB($\alpha$), using a plurality of shared secret values DSH($\alpha$, h($\alpha$)) corresponding to the same subset SUB($\alpha$), and generates generation information SK by using the reconstructed secret values SUBSK($\alpha$).

28 Claims, 22 Drawing Sheets

(56) References Cited

OTHER PUBLICATIONS

"International Standard ISO/IEC 18033-2: Information technology-Security techniques-Encryption algorithms-Part 2: Asymmetric ciphers," ISO/IEC 18033-2:2006(E), Total 3 Pages, (May 1, 2006).
Boyen, X., et al., "Identity-Based Cryptography Standard (IBCS) #1: Supersingular Curve Implementations of the BF and BB1 Cryptosystems," Voltage Security, pp. 1-63, (Dec. 2007).
Blake, I. F., et al., "Elliptic Curves in Cryptography," London Mathematical Society Lecture Note Series. 265, Total 15 Pages, (Dec. 20, 2001) (with Partial English Translation).
Menezes, A., "Elliptic Curve Public Key Cryptosystems," The Kluwer International Series in Engineering and Computer Science, Communications and Information Theory, Kluwer Academic Publisher, Total 15 Pages, (1993).
Miller, V. S., "Short Programs for functions on Curves," Exploratory Computer Science, pp. 1-7, (May 6, 1986).
Miyaji, A., et al., "New explicit conditions of elliptic curve traces for FR-reduction," IEICE Trans. Fundamentals, vol. E84-A, No. 5, pp. 1-10, (May 2001).
Barreto, P. S. L. M., et al., "Constructing Elliptic Curves with Prescribed Embedding Degrees," SCN 2002, LNCS 2576, pp. 257-267, (2003).
Dupont, R., et al., "Building curves with arbitrary small MOV degree over finite prime fields," pp. 1-13, (Jul. 18, 2002).
Dupont, R., et al., "Buiding Curves with Arbitrary Small MOV Degree over Finite Prime Fields," Journal of Cryptology, http://eprint.iacr.org/2002/094/), vol. 18, pp. 79-89, (Oct. 21, 2004).
Katz, J., et al., "Predicate Encryption Supporting Disjunctions, Polynomial Equations, and Inner Products," EUROCRYPT, pp. 146-162, (2008).
International Search Report Issued Aug. 10, 2010 in PCT/JP10/057274 Filed Apr. 23, 2010.
Office Action issued on Apr. 30, 2013, (Notice of Reasons for Refusal) in corresponding Japanese Patent Application No. 2011-510381, with an English translation.
Kawamoto, Yohei and Yamamoto, Hirosuke; "Secret Function Sharing Systems for Multi-Groups and their Application to Oblivious Transfers," The Institute of Electronics, Information and Communication Engineers, Technical Report of IEICE, IT2001-84, ISEC2001-122, SST2001-200, ITS2001-138 (Mar. 2002).
Shamir et al; "How to Share a Secret," IP Com Inc., West Henrietta, New York, U.S.A. (Apr. 30, 1979, IP CON Electronic Publication: Mar. 30, 2007); whole document; XP-013119902.

\* cited by examiner

SECRET SHARING SYSTEM, SHARING APPARATUS, SHARE MANAGEMENT APPARATUS, ACQUISITION APPARATUS, PROCESSING METHODS THEREOF, SECRET SHARING METHOD, PROGRAM, AND RECORDING MEDIUM

TECHNICAL FIELD

The present invention relates to secret sharing techniques.

BACKGROUND ART

Storage of secret information involves the risk of loss or destruction of the secret information and the risk of theft. The risk of loss or destruction can be reduced by storing a plurality of copies of the secret information. This, however, increases the risk of theft. One solution for eliminating these risks is a secret sharing scheme (SSS) (refer to non-patent literature 1 and 2, for example).

In the secret sharing scheme, a plurality of shares SH(1) to SH(N) are generated from secret information MSK and are managed separately by a plurality of share management apparatuses PA(1) to PA(N), and the secret information MSK can be reconstructed only when a predetermined number or greater of shares among the shares SH(1) to SH(N) are obtained. A typical method for the secret sharing scheme will be described next.

[(N, N) threshold secret sharing scheme]

In an (N, N) threshold secret sharing scheme, if all the shares SH(1) to SH(N) are given, the secret information MSK can be reconstructed, whereas if any (N−1) shares $SH(\phi_1)$ to $SH(\phi_{N-1})$ are given, the secret information MSK can never be obtained. An example will be given below.

$SH_1, \ldots, SH_{N-1}$ are selected at random.

$SH_N = MSK - (SH_1 + \ldots + SH_{N-1})$ is calculated.

The shares $SH_1, \ldots, SH_N$ are managed separately by a plurality of share management apparatuses PA(1), ..., PA(N).

If all the shares $SH_1, \ldots, SH_N$ are given, the secret information MSK can be reconstructed by the reconstruction processing represented as $MSK = SH_1 + \ldots + SH_N$.

The operation $MSK = SH_1 + \ldots + SH_N$ for reconstructing the secret information MSK from the shares $SH_1$ to $SH_N$ is linear. If the reconstruction processing is performed with the results of the same linear operation CALC for individual shares, using the shares SH(1) to SH(N) and a value σ as operands, the results being shares SH'(1) to SH'(N), the result of the linear operation CALC using the secret information MSK and the value σ as operands can be obtained. If the reconstruction processing is executed with SH'(1)=σ·SH(1), ..., SH'(N)=σ·SH(N) as the shares SH'(1), ..., SH'(N), the following can be obtained, for example.

$$\sigma \cdot SH(1) + \ldots + \sigma \cdot SH(N) = \sigma \cdot (SH(1) + \ldots + SH(N)) \quad (1)$$
$$= \sigma \cdot MSK$$

On the other hand, if the reconstruction processing is executed with the results of the same linear operation CALC for individual shares, using the shares SH(1) to SH(N) and independent values σ(1) to σ(N) as operands, the results being shares SH'(1) to SH'(N), the result of the operation using the secret information MSK as an operand cannot be obtained usually. If the reconstruction processing is executed with SH'(1)=σ(1)·SH(1), ..., SH'(N)=σ(N)·SH(N) as the shares SH'(1), ..., SH'(N), the following can be obtained, for example.

$$\sigma(1) \cdot SH(1) + \ldots + \sigma(N) \cdot SH(N) \quad (2)$$

[(K, N) Threshold Secret Sharing Scheme]

In a (K, N) threshold secret sharing scheme, if any K different shares $SH(\phi_1)$ to $SH(\phi_K)$ are given, the secret information MSK can be reconstructed, whereas if any (K−1) shares $SH(\phi_1)$ to $SH(\phi_{K-1})$ are given, the secret information MSK can never be obtained. An example is given below.

A (K−1)-th degree polynomial $f(x) = \xi_0 + \xi_1 \cdot x + \xi_2 \cdot x^2 + \ldots + \xi_{K-1} \cdot x^{K-1}$ that satisfies $f(0) = MSK$ is selected at random. That is, $\xi_0 = MSK$ is specified, and $\xi_1$ to $\xi_{K-1}$ are selected at random. The shares are given by $SH_\rho = (\rho, f(\rho))$ ($\rho = 1$ to N).

If any K different shares $SH(\phi_1)$ to $SH(\phi_K)$ ($(\phi_1, \ldots, \phi_K) \subset (1, \ldots, N)$) are obtained, the secret information MSK can be reconstructed by the following reconstruction processing, using Lagrange's interpolation Expression, for example.

$$MSK = f(0) = \lambda_1 \cdot f(\varphi_1) + \ldots + \lambda_K \cdot f(\varphi_K) \quad (3)$$

$$\lambda_\rho(x) = \frac{(x - \phi_1) \ldots \overset{\rho}{\vee} \ldots (x - \phi_K)}{(\phi_\rho - \phi_1) \ldots \overset{\rho}{\vee} \ldots (\phi_\rho - \phi_K)} \in F_q \quad (4)$$

Here, the symbol $\overset{\rho}{\vee}$ indicates that the ρ-th operand [element $(\phi_\rho - \phi_\rho)$ of the denominator, element $(x - \phi_\rho)$ of the numerator] from the beginning is not present. The denominator of Expression (4) is $$(\phi_\rho - \phi_1) \cdot \ldots \cdot (\phi_\rho - \phi_{\rho-1}) \cdot (\phi_\rho - \phi_{\rho+1}) \cdot \ldots \cdot (\phi_\rho - \phi_K)$$

and the numerator of Expression (4) is $$(x - \phi_1) \cdot \ldots \cdot (x - \phi_{\rho-1}) \cdot (x - \phi_{\rho+1}) \cdot \ldots \cdot (x - \phi_K)$$

These relationships hold on the field.

The operation of Expression (3) is linear. A value reconstructed with the results of the same linear operation CALC for individual shares, using the shares $SH(\phi_1)$ to $SH(\phi_K)$ and the value σ as operands, the results being shares $SH'(\phi_1)$ to $SH'(\phi_K)$, becomes equal to the result of the linear operation CALC using the secret information MSK and the value σ as operands. If a value is reconstructed with the results of the same linear operation CALC for the individual shares using the shares $SH(\phi_1)$ to $SH(\phi_K)$ and independent values $\sigma(\phi_1)$ to $\sigma(\phi_K)$ as operands, the results being shares $SH'(\phi_1)$ to $SH'(\phi_K)$, the result of the operation using the secret information MSK as an operand cannot be obtained usually.

PRIOR ART LITERATURE

Non-Patent Literature

Non-patent literature 1: Kaoru Kurosawa, Wakaha Ogata, "Introduction to Modern Cryptography" (written in Japanese), (lecture series in Electronics, Information and Communication Engineers), CORONA PUBLISHING Co., Ltd., March, 2004, pp. 116-119

Non-Patent literature 2: A Shamir, "How to Share a Secret," Communications of the ACM, November 1979, Volume 22, Number 11, pp. 612-613

SUMMARY OF THE INVENTION

Problems to be Solved by the Invention

A system satisfying the following conditions is considered.

Condition 1: A sharing apparatus generates a plurality of shares SH(1) to SH(N) by secret sharing of the secret information MSK and lets a plurality of share management apparatuses PA(1) to PA(N) manage the shares separately.

Condition 2: The share management apparatuses PA(1) to PA(N) execute some kind of operations separately.

Condition 3: An acquisition apparatus cannot obtain the secret information MSK, but if the operation results generated by a predetermined number or greater of share management apparatuses are given, generation information SK, which is the same as the result of an operation using the secret information MSK and a given value σ as operands, can be obtained.

However, it is not easy to implement that type of system. If the share management apparatuses PA(1) to PA(N) execute the operations by using independent values σ(1) to σ(N), the acquisition apparatus cannot generate the generation information SK by reconstruction processing using the results of operations by the share management apparatuses as shares. In addition, since the value σ can be information from which the generation information SK is predicted, it is preferred from the perspective of security that all the share management apparatuses PA(1) to PA(N) do not share the value σ itself.

In view of that point, an object of the present invention is to securely implement a system that satisfies the conditions 1 to 3.

Means to Solve the Problems

According to the present invention, a sharing apparatus generates shares $SH(\alpha, h(\alpha))$ by secret sharing of secret information separately for each of subsets $SUB(\alpha)$, each of the subsets $SUB(\alpha)$ being formed of $H(\alpha)$ share management apparatuses $PA(\alpha, 1)$ to $PA(\alpha, H(\alpha))$ belonging to a set of $\Sigma_{\alpha=1}^{L} h(\alpha)$ share management apparatuses $PA(\alpha, h(\alpha))$ ($\alpha=1, \ldots, L, L \geq 2, h(\alpha)=1, \ldots, H(\alpha), H(\alpha) \geq 2$), and outputs the shares $SH(\alpha, h(\alpha))$. Each of the share management apparatuses $PA(\alpha, h(\alpha))$ generates a shared secret value $DSH(\alpha, h(\alpha))$ by performing a common operation to the share $SH(\alpha, h(\alpha))$ and common information containing a common value $\sigma(\alpha)$ shared in each of the subsets $SUB(\alpha)$ and output the shared secret value $DSH(\alpha, h(\alpha))$. The common information used by the shared secret value generators of the share management apparatuses $PA(\alpha, h(\alpha))$ belonging to the same subset $SUB(\alpha)$ is the same, and the shared secret value generators of the share management apparatuses $PA(\alpha, h(\alpha))$ belonging to the same subset $SUB(\alpha)$ perform the same common operation.

An acquisition apparatus generates reconstructed secret values $SUBSK(\alpha)$ corresponding to the subsets $SUB(\alpha)$ respectively. Each of the reconstructed secret values $SUBSK(\alpha)$ is generated by reconstruction processing for each subset $SUB(\alpha)$ using a plurality of shared secret values $DSH(\alpha, h(\alpha))$ corresponding to the same subset $SUB(\alpha)$. The acquisition apparatus outputs the reconstructed secret values $SUBSK(\alpha)$. The acquisition apparatus then generates generation information SK by using the reconstructed secret values $SUBSK(\alpha)$ and outputs the generation information SK.

According to the present invention, the secret information is secret-shared separately for each subset $SUB(\alpha)$, and the shared secret values $DSH(\alpha, h(\alpha))$ are generated by using common information containing a common value $\sigma(\alpha)$ shared in each subset $SUB(\alpha)$. Each of the reconstructed secret values $SUBSK(\alpha)$ obtained by reconstruction processing for each subset $SUB(\alpha)$ becomes the same as the result of an operation that includes the secret information and the common information containing the common value $\sigma(\alpha)$ as operands. Therefore, the generation information SK generated by using the reconstructed secret values $SUBSK(\alpha)$ after the reconstruction can be the same as the result of an operation containing the secret information and a given value σ as operands. According to the present invention, not all the share management apparatuses $PA(\alpha, h(\alpha))$ share the given value σ, so that a high level of security is provided.

Effects of the Invention

As described above, according to the present invention, a system satisfying the conditions 1 to 3 can be securely implemented.

DETAILED DESCRIPTION OF THE EMBODIMENTS

Figure 1:
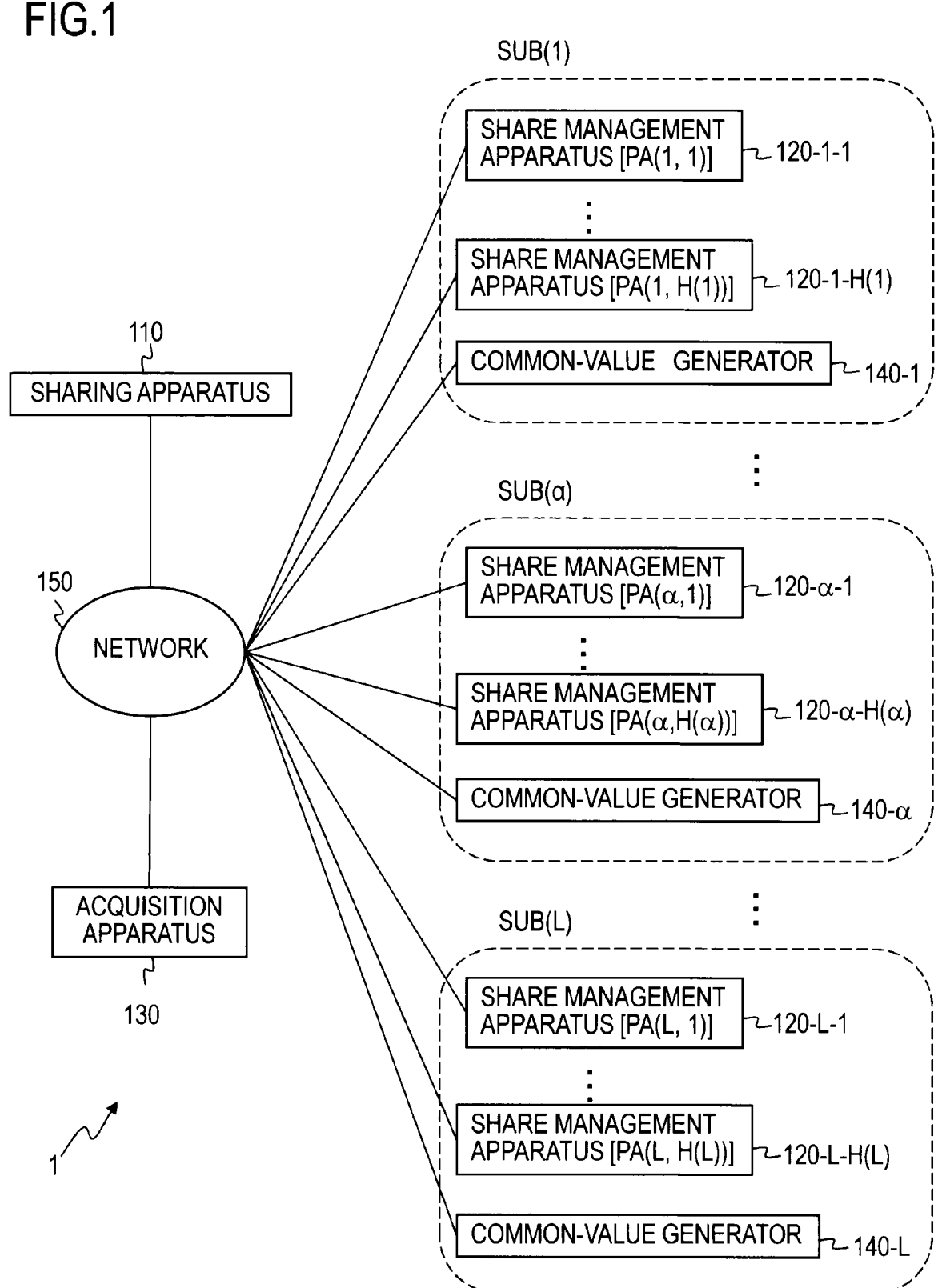
FIG. 1 is a block diagram illustrating the overall structure of a secret sharing system according to a first embodiment.

Embodiments of the present invention will be described below with reference to the drawings.

[First Embodiment]

A first embodiment of the present invention will be first described.

[Definitions]

Terms and symbols to be used in the embodiment will be defined first.

$F_q$: $F_q$ represents a finite field of order q, where q is an integer equal to or larger than 1. For example, the order q is a prime number of a power of a prime number. In other words, the finite field $F_q$ is a prime field or an extension field over the prime field, for example. Operations in the prime finite field $F_q$ can be easily defined as modulo operations with the order q as modulus, for example. Operations in the extension filed $F_q$ can be easily defined as modulo operations with an irreducible polynomial as modulus, for example. A specific method for configuring a finite field $F_q$ is disclosed, for example, in reference literature 1, "ISO/IEC 18033-2: Information technology—Security techniques—Encryption algorithms—Part 2: Asymmetric ciphers".

$0_F$: $0_F$ represents an additive identity element of the finite field $F_q$.

$1_F$: $1_F$ represents a multiplicative identity element of the finite field $F_q$.

E: E represents an elliptic curve over the finite field $F_q$. E is defined as a set having a specific point O called a point at infinity and other points (x,y) of x,y∈$F_q$ that satisfy the following Weierstrass equation on affine coordinates:

$$y^2 + a_1 xy + a_3 y = x^3 + a_2 x^2 + a_4 x + a_6$$

where $a_1, a_2, a_3, a_4, a_6 \in F_q$. A binary operation "+" called an elliptic curve addition can be defined for any two points on the elliptic curve E, and a unary operation "−" called an additive inverse can be defined for any one point on the elliptic curve E. It is well known that a finite set of rational points on the elliptic curve E forms a group with respect to the elliptic curve addition. It is also well known that an operation called an elliptic curve scalar multiplication can be defined with the elliptic curve addition. A specific operation method of elliptic operations such as the elliptic curve addition on a computer is also well known. (For example, see the reference literature 1, reference literature 2, "RFC 5091: Identity-Based Cryptography Standard (IBCS) #1: Supersingular Curve Implementations of the BF and BB1 Cryptosystems", and reference literature 3, Ian F. Blake, Gadiel Seroussi, and Nigel P. Smart, "Elliptic Curves in Cryptography", Pearson Education, ISBN 4-89471-431-0.)

A finite set of rational points on the elliptic curve E has a subgroup of order p (p≥1). For example, a finite set E[p] of p-division points on the elliptic curve E forms a subgroup of the rational points on the elliptic curve, where #E represents the element count of the finite set of the p-division points on the elliptic curve E and #E is divisible by the large prime p. The p-division points on the elliptic curve E are points A on the elliptic curve E which satisfy the elliptic curve scalar multiplication p·A=O.

G: G represents a cyclic group. Examples of the cyclic group G include the finite set E[p] of p-division points on the elliptic curve E, subgroups thereof, and residue groups. In the embodiment, an operation defined on the cyclic group G is expressed additively. More specifically, $\chi \cdot \Omega \in G$ for $\chi \in F_q$ and $\Omega \in G$ means that the operation defined in the cyclic group G is applied to $\Omega \in G$, $\chi$ times, and $\Omega_1 + \Omega_2 \in G$ for $\Omega_1, \Omega_2 \in G$ means that the operation defined in the cyclic group G is applied to $\Omega_1 \in G$ and $\Omega_2 \in G$.

g: g represents a generator of the cyclic group G.

[Overall Structure]

FIG. 1 is a block diagram illustrating the overall structure of a secret sharing system 1 according to a first embodiment.

As illustrated in FIG. 1, the secret sharing system 1 in this embodiment includes a sharing apparatus 110, $\Sigma_{\alpha=1}^{L} h(\alpha)$ share management apparatuses [PA(α, h(α)) (α=1 to L, L≥2, h(α)=1 to H(α), H(α)≥2)] 120-α-h(α), an acquisition apparatus 130, and common-value generators 140-1 to 140-L, and those units are structured to allow communication among them through a network 150. For the sake of simplicity, a structure that includes a single sharing apparatus 110 and a single acquisition apparatus 130 will be described in this embodiment although the structure may include two or more sharing apparatuses 110 and/or two or more acquisition apparatuses 130. For the same reason, a structure that includes a single set of $\Sigma_{\alpha=1}^{L} h(\alpha)$ share management apparatuses [PA(α, h(α))] 120-α-h(α) will be described in this embodiment, although a plurality of these sets may be included.

As shown in FIG. 1, the set of $\Sigma_{\alpha=1}^{L} h(\alpha)$ share management apparatuses [PA(α, h(α))] 120-α-h(α) is divided into a plurality of subsets SUB(α) that includes H(α) share management apparatuses PA(α, 1) to PA (α, H(α)). Each subset SUB(α) corresponds to a common-value generator 140-α for generating a value σ(α) to be shared in each subset SUB(α).

[Sharing Apparatus 110]

Figure 2:
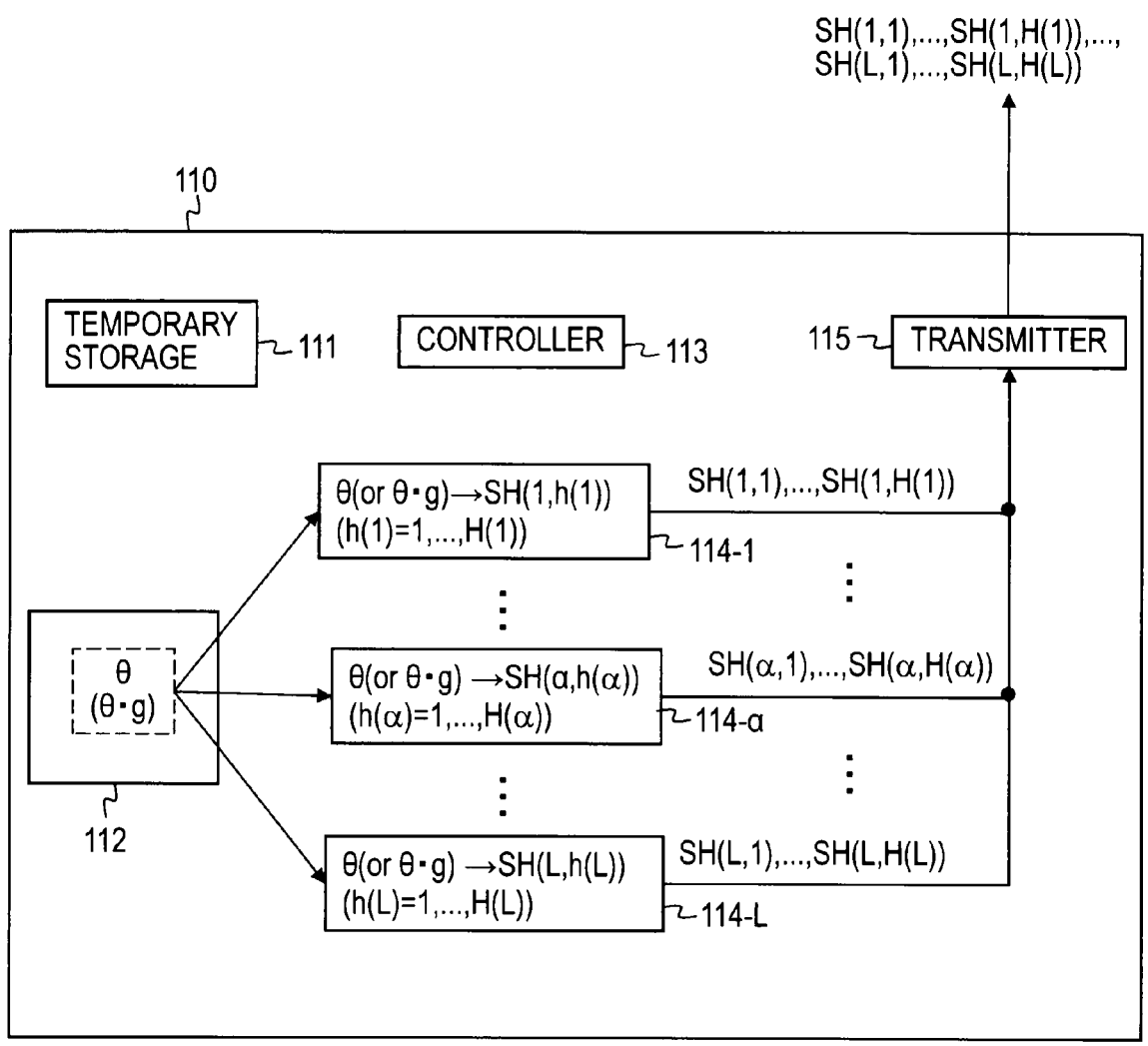
FIG. 2 is a block diagram illustrating the structure of a sharing apparatus in FIG. 1.
Figure 5A:
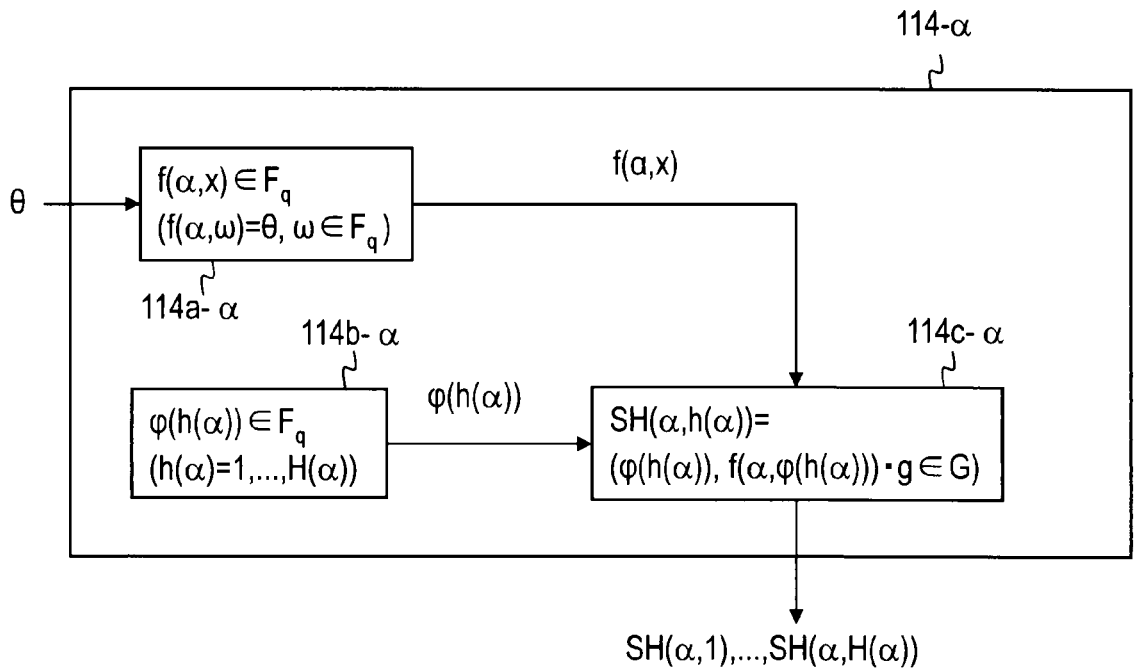
FIG. 5A is a block diagram illustrating a secret sharing unit in FIG. 2 in detail.

FIG. 2 is a block diagram illustrating the structure of the sharing apparatus 110 in FIG. 1. FIG. 5A is a block diagram illustrating a secret sharing unit 114-α in FIG. 2 in detail.

As shown in FIG. 2, the sharing apparatus 110 in this embodiment includes a temporary storage 111, a storage 112, a controller 113, secret sharing units 114-α (α=1 to L), and a transmitter 115. As shown in FIG. 5A, the secret sharing unit 114-α in this embodiment includes a function selection unit 114a-α, an index generator 114b-α, and a sharing processing unit 114c-α.

The sharing apparatus 110 in this embodiment is a special apparatus that includes a known or specialized computer provided with a central processing unit (CPU), a random access memory (RAM), a read-only memory (ROM), and the like, and a special program, for example. The temporary storage 111 and the storage 112 are, for example, auxiliary storage such as a RAM, a register, a cache memory, a device on a chip, or a hard disk, or a storage area formed by combining at least some of these. The controller 113 and the secret sharing units 114-α (α=1 to L) are processing units implemented by the CPU executing predetermined programs, for example. At least a part of the controller 113 and the secret sharing units 114-α (α=1 to L) may be implemented by a specialized integrated circuit. The transmitter 115 is a communication device such as a modem or a local area network (LAN) card.

The sharing apparatus 110 executes processing under the control of the controller 113. Each piece of data output from each processing unit is stored in the temporary storage 111 or the storage 112, and a description thereof will be simplified below. The data stored in the temporary storage 111 or the storage 112 is read, input to a processing unit, and used for processing thereof, when necessary.

[Share Management Apparatus [PA(α, h(α)] 120-α-h(α)]

Figure 3A:
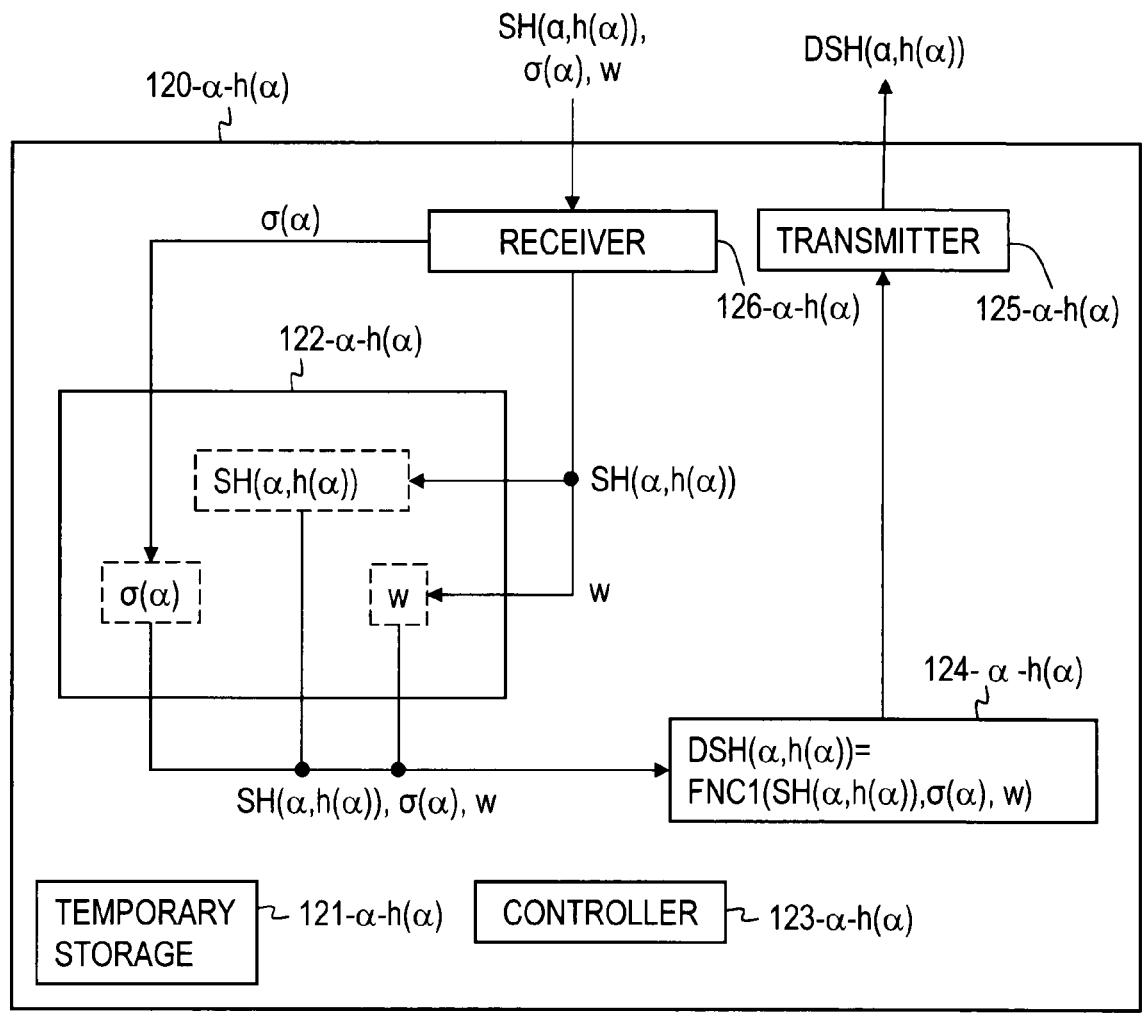
FIG. 3A is a block diagram illustrating the structure of a share management apparatus in the first embodiment.
Figure 5B:
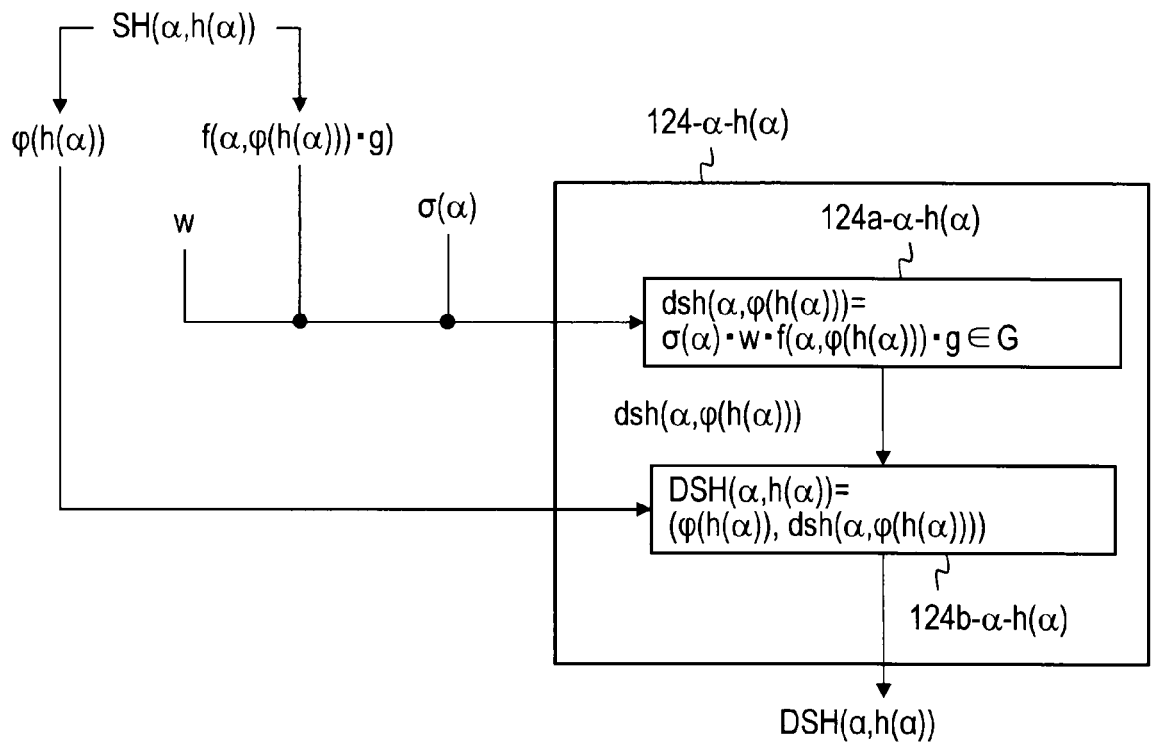
FIG. 5B is a block diagram illustrating a shared secret value generator in FIG. 3A in detail.

FIG. 3A is a block diagram illustrating the structure of the share management apparatus [PA(α, h(α)] 120-α-h(α) in the first embodiment. FIG. 5B is a block diagram illustrating a shared secret value generator 124-α-h(α) in FIG. 3A in detail.

As shown in FIG. 3A, each of the share management apparatuses [PA(α, h(α))] 120-α-h(α) in this embodiment includes a temporary storage 121-α-h(α), a storage 122-α-h(α), a controller 123-α-h(α), the shared secret value generator 124-α-h(α), a transmitter 125-α-h(α), and a receiver 126-α-h(α). As shown in FIG. 5B, the shared secret value generator 124-α-h(α) includes a linear operation unit 124a-α-h(α) and a shared secret value composition unit 124b-α-h(α).

Each of the share management apparatuses [PA(α, h(α))] 120-α-h(α) is a special apparatus that includes a known or specialized computer provided with a CPU, a RAM, a ROM, and the like, and a special program, for example. More specifically, the temporary storage 121-α-h(α) and the storage 122-α-h(α) are, for example, auxiliary storage such as a RAM, a register, a cache memory, a device on a chip, or a hard disk, or a storage area formed by combining at least some of these. The controller 123-α-h(α) and the shared secret value generator 124-α-h(α) are processing units implemented by the CPU executing predetermined programs, for example. At least a part of the controller 123-α-h(α) and the shared secret value generator 124-α-h(α)114-α may be implemented by a specialized chip. The transmitter 125-α-h(α) and the receiver 126-α-h(α) are communication devices such as a modem or a LAN card.

Each of the share management apparatuses [PA(α, h(α))] 120-α-h(α) executes processing under the control of the controller 123-α-h(α). Each piece of data output from each processing unit is stored in the temporary storage 121-α-h(α) or the storage 122-α-h(α), and a description thereof will be simplified below. The data stored in the temporary storage 121-α-h(α) or the storage 122-α-h(α) is read, input to a processing unit, and used for processing thereof, when necessary.

[Common-Value Generator 140-α]

Figure 3B:
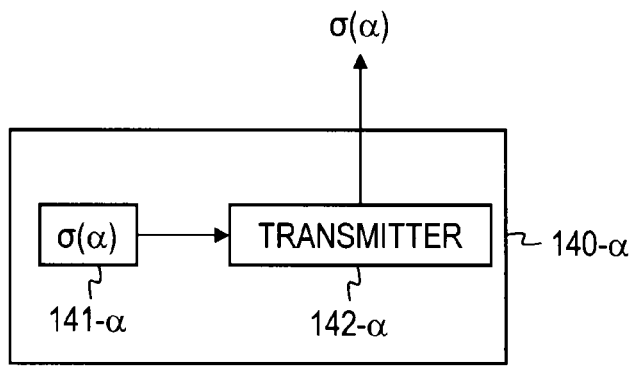
FIG. 3B is a block diagram illustrating the structure of a common-value generator in the first embodiment.

FIG. 3B is a block diagram illustrating the structure of a common-value generator 140-α in the first embodiment.

As shown in FIG. 3B, each of the common-value generators 140-α in this embodiment includes a random number generator 141-α and a transmitter 142-α. The common-value generator 140-α in this embodiment is a special unit that includes a known or specialized computer provided with a CPU, a RAM, a ROM, and the like, and a special program, for example, and the random number generator 141-α may be implemented by a specialized chip.

[Acquisition Apparatus 130]

Figure 4:
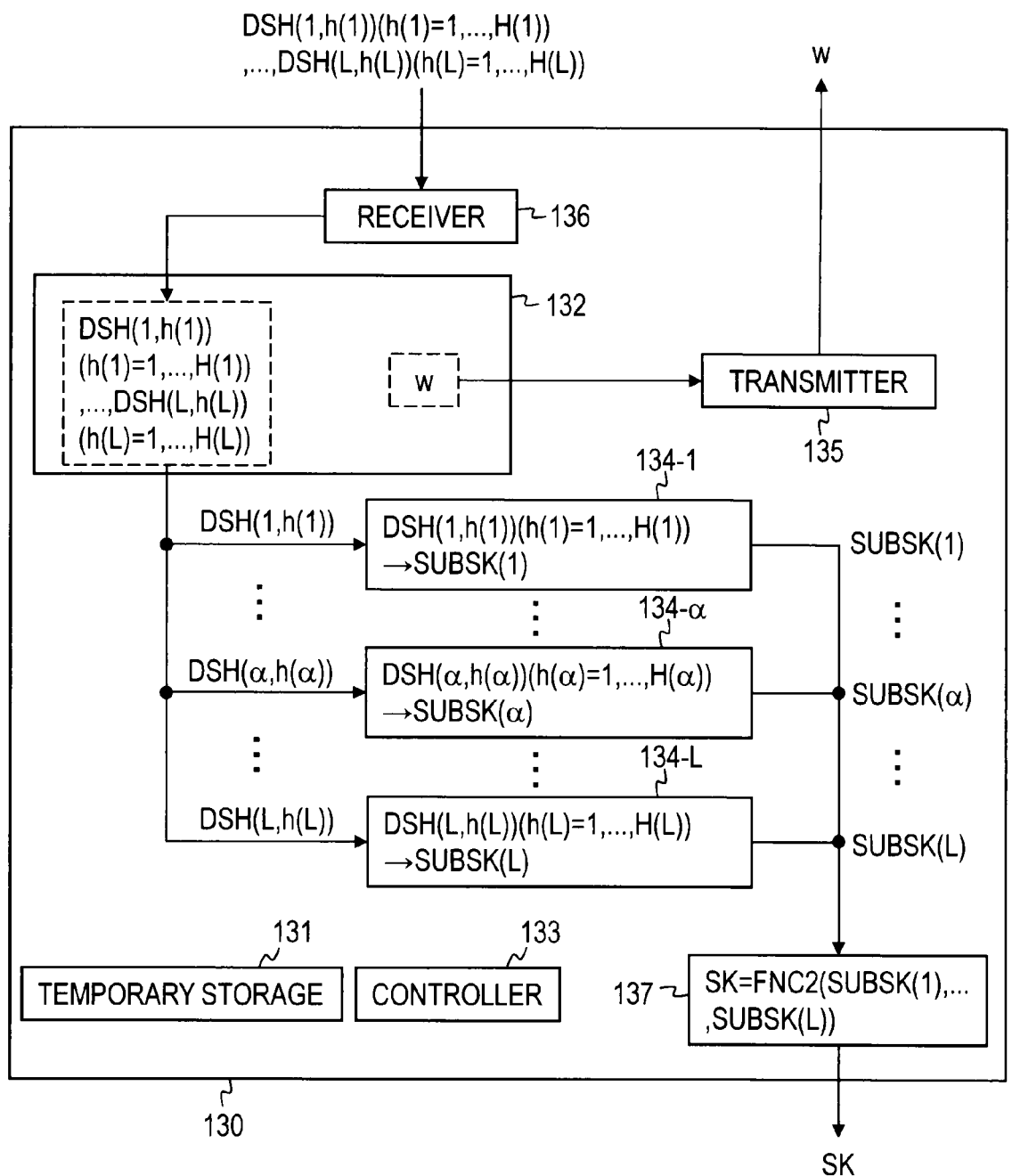
FIG. 4 is a block diagram illustrating the structure of an acquisition apparatus in the first embodiment.
Figure 6:
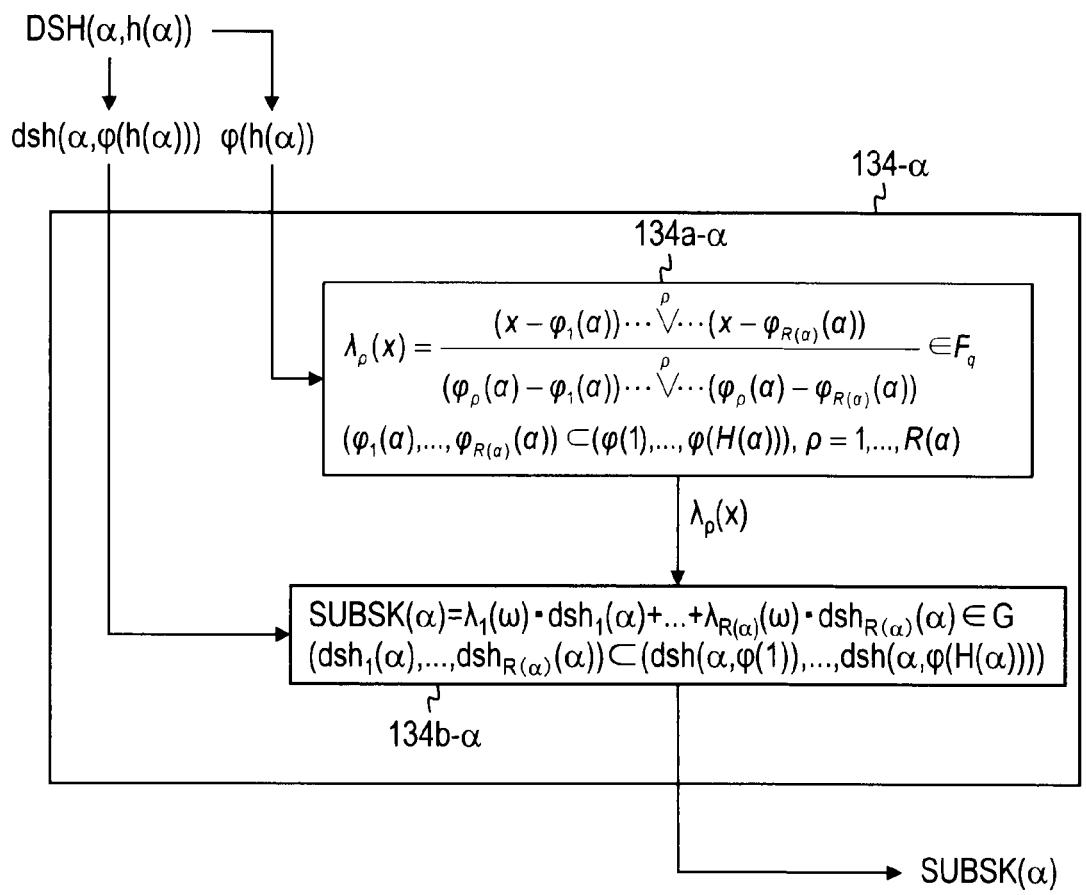
FIG. 6 is a block diagram illustrating a reconstruction unit in FIG. 4 in detail.

FIG. 4 is a block diagram illustrating the structure of the acquisition apparatus 130 in the first embodiment. FIG. 6 is a block diagram illustrating a reconstruction unit 134-α in FIG. 4 in detail.

As shown in FIG. 4, the acquisition apparatus 130 in this embodiment includes a temporary storage 131, a storage 132, a controller 133, reconstruction units 134-α (α=1 to L), a composition unit 137, a transmitter 135, and a receiver 136. As shown in FIG. 6, each of the reconstruction units 134-α includes a coefficient calculation unit 134a-α and a polynomial operation unit 134b-α.

The acquisition apparatus 130 in this embodiment is a special apparatus that includes a known or specialized computer provided with a CPU, a RAM, a ROM, and the like, and a special program, for example. More specifically, the temporary storage 131 and the storage 132 are, for example, auxiliary storage such as a RAM, a register, a cache memory, a device on a chip, or a hard disk, or a storage area formed by combining at least some of these. The controller 133, the reconstruction units 134-α, and the composition unit 137 are processing units implemented by the CPU executing predetermined programs. At least a part of the controller 133, the reconstruction units 134-α (α=1 to L), and the composition unit 137 may be implemented by a specialized chip. The transmitter 135 and the receiver 136 are communication devices such as a modem or a LAN card.

The acquisition apparatus 130 executes processing under the control of the controller 133. Each piece of data output from each processing unit is stored in the temporary storage 131 or storage 132, and the description will be simplified below. The data stored in the temporary storage 131 or the storage 132 is read, input to a processing unit, and used for processing thereof, when necessary.

[Secret Sharing Processing]

Secret sharing processing in this embodiment will be described next.

[Preparatory Processing]

In preparatory processing for secret sharing processing in this embodiment, information $\theta \in F_q$ for identifying secret information $\theta \cdot g \in G$ is stored in the storage 112 of the sharing apparatus 110.

[Entire Secret Sharing Processing]

Figure 7:
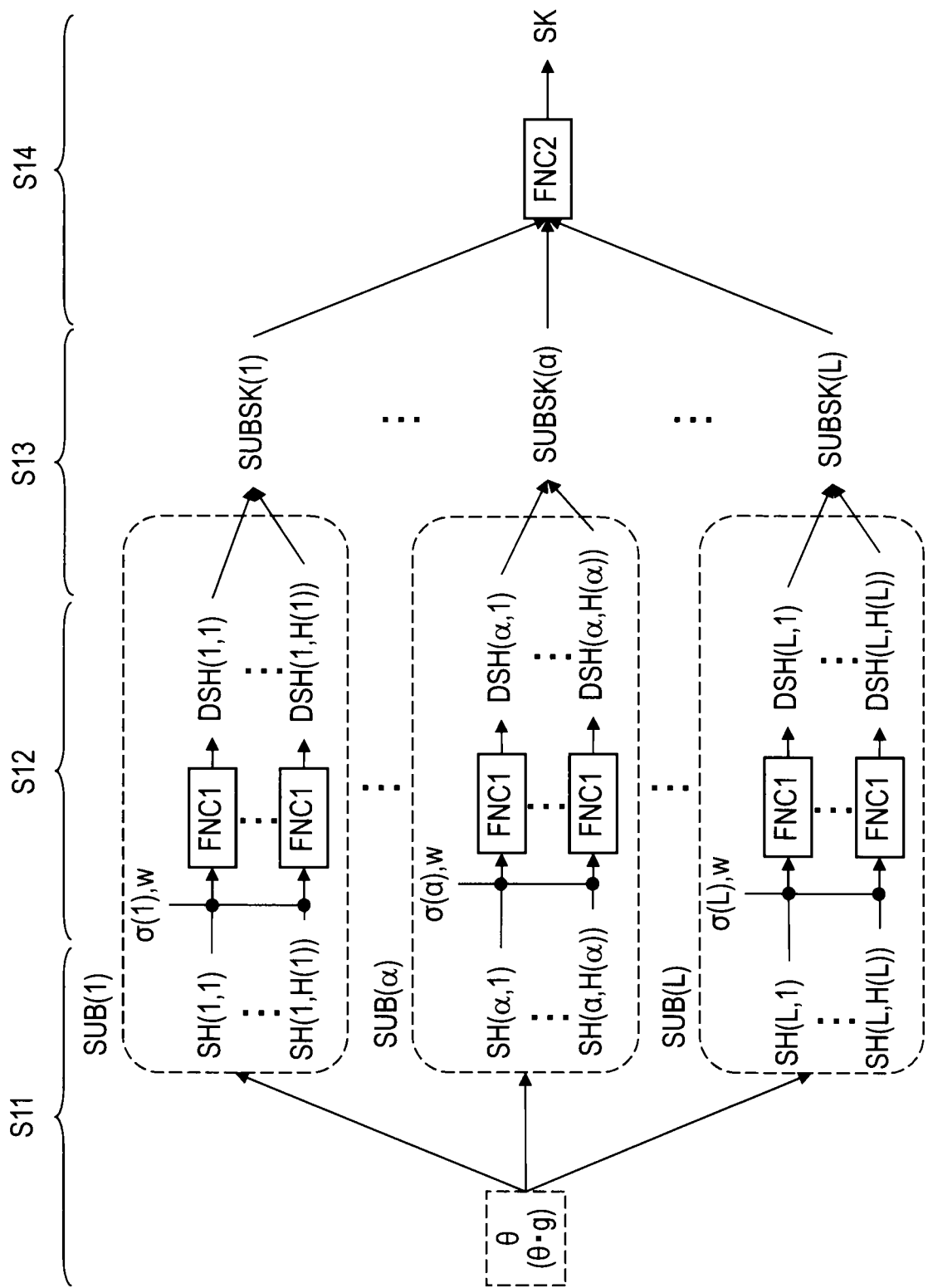
FIG. 7 is a view illustrating the entire secret sharing processing in the first embodiment.

FIG. 7 is a view illustrating the entire secret sharing processing in the first embodiment. The entire secret sharing processing in this embodiment will be described next with reference to FIG. 7.

In this embodiment, the sharing apparatus 110 (FIG. 1) first generates shares SH(α, h(α)) by performing secret sharing of the secret information $\theta \cdot g \in G$ separately for each subset SUB(α) and outputs the shares SH(α, h(α)) (step S11). The shares SH(α, h(α)) are sent separately through the network 150 to the share management apparatuses [PA(α, h(α))] 120-α-h(α).

Each of the share management apparatuses [PA(α, h(α))] 120-α-h(α) to which the shares SH(α, h(α)) were sent generates a shared secret value DSH(α, h(α)) by performing a predetermined common operation to the share SH(α, h(α)) and common information that includes a common value σ(α) shared in each subset SUB(α) and output the shared secret value DSH(α, h(α)) (step S12).

In this embodiment, the common values σ(α) shared separately in different subsets SUB(α) are independent of one another. The share management apparatuses [PA(α, h(α))]

120-α-h(α) in the same subset SUB(α) use the same common information. In particular, the common information used as an example in this embodiment contains the common value σ(α) and provided information w in common with all the share management apparatuses [PA(α, h(α))] 120-α-h(α), provided by the acquisition apparatus 130. The share management apparatuses [PA(α, h(α))] 120-α-h(α) belonging to the same subset SUB(α) perform the same common operation. In this embodiment, all the common operations are the same. The common operation in this embodiment is a linear operation.

The shared secret values DSH(α, h(α)) output by the share management apparatuses [PA(α, h(α))] 120-α-h(α) are sent separately through the network 150 to the acquisition apparatus 130. The acquisition apparatus 130 generates a reconstructed secret value SUBSK(α) by reconstruction processing for each subset SUB(α) by using a plurality of shared secret values DSH(α, h(α)) corresponding to the same subset SUB(α) (step S13).

The acquisition apparatus 130 then creates generation information SK by using the reconstructed secret values SUBSK(α) generated separately for the subsets SUB(α) and outputs the generation information SK (step S14). In this embodiment, the acquisition apparatus 130 creates the generation information SK by performing a linear combination of the reconstructed secret values SUBSK(α).

[Processing (in Step S11) in Sharing Apparatus]

Figure 8A:
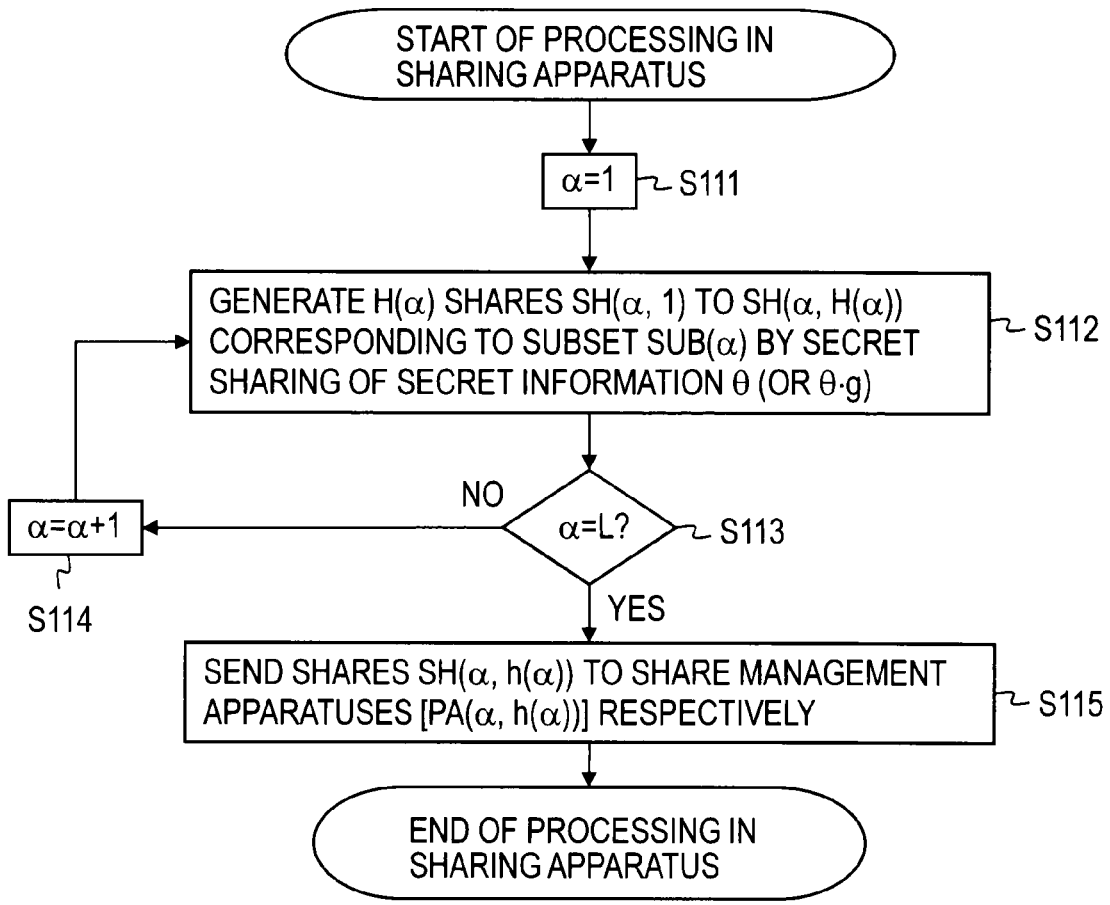
FIG. 8A is a view illustrating an example of processing in the sharing apparatus in the first embodiment.
Figure 8B:
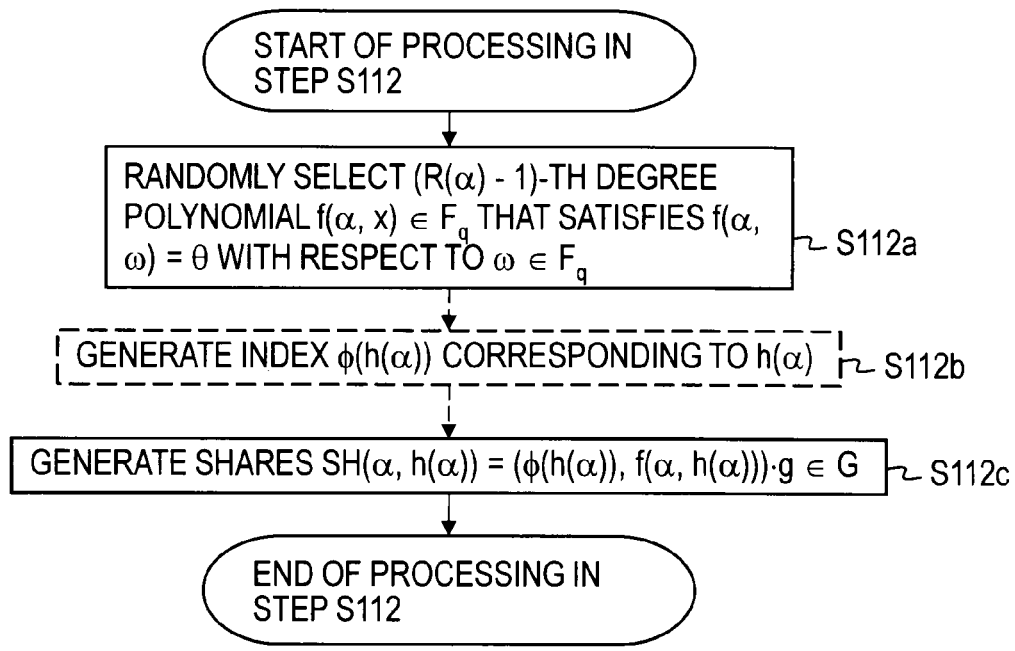
FIG. 8B is a view illustrating an example of processing in step S112 in detail.

FIG. 8A is a view illustrating an example of processing in the sharing apparatus in the first embodiment. FIG. 8B is a view illustrating an example of processing in step S112 in detail. The processing in the sharing apparatus 110 will be described next in detail with reference to those figures.

The controller 113 of the sharing apparatus 110 (FIG. 2) specifies α=1 and stores the setting in the temporary storage 111 (step S111). The information θ∈$F_q$ for identifying the secret information θ·g ∈G is read next from the storage 112 and input to the secret sharing unit 114-α. The secret sharing unit 114-α shares the secret information θ·g by using the information θ∈$F_q$, generates H(α) shares SH(α, 1) to SH(α, H(α)) corresponding to the subset SUB(α), and outputs them (step S112).

Details of Step S112:

The secret sharing unit 114-α in this embodiment generates the shares SH(α, h(α)) by performing secret sharing of the secret information for each subset SUB(α) by using an (R(α), H(α)) threshold secret sharing scheme (R(α) is a constant satisfying 2≤R(α)<H(α)).

As shown in FIG. 8B, the function selection unit 114a-α in the secret sharing unit 114-α (FIG. 5A) selects at random an (R(α)−1)-th degree polynomial f(α, x)∈$F_q$ that satisfies f(α, ω)=θ with respect to a predetermined element ω∈$F_q$ of a finite field $F_q$ and outputs it (step S112a), where x is a variable formed by an element of the finite field $F_q$, and an example of the element ω∈$F_q$ is $0_F$.

The index generator 114b-α then generates indices φ(h(α)) ∈$F_q$ corresponding to each of h(α)=1 to H(α) and outputs them (step S112b). If the indices are φ(h(α))=h(α)∈$F_q$ or if the indices φ(h(α))∈$F_q$ have already been obtained, the processing in step S112 may be omitted.

The sharing processing unit 114c-α uses the polynomial f(α, x)∈$F_q$ and the indices φ(h(α))∈$F_q$ to generate shares $$SH(\alpha, h(\alpha)) = (\phi(h(\alpha)), f(\alpha, \phi(h(\alpha))) \cdot g \in G \qquad (5)$$

and outputs them (step S112c, end of detailed description of step S112).

The controller 113 judges whether α stored in the temporary storage 111 is L (step S113). If it is not judged that α=L, the controller 113 specifies α+1 as a new value of α, stores the setting in the temporary storage 111 (step S114), and executes the processing in step S112 with the new value of α. If it is judged in step S113 that α=L, the shares SH(α, h(α)) output from the secret sharing units 114-α are sent to the transmitter 115. The transmitter 115 sends the shares SH(α, h(α)) through the network 150 to the corresponding share management apparatuses [PA(α, h(α))] 120-α-h(α) (step S115). The share SH(1, 1) is sent to the share management apparatus [PA(1, 1)] 120-1-1; the share SH(1, 2) is sent to the share management apparatus [PA(1, 2)] 120-1-2; . . . ; the share SH(L, H(L)) is sent to the share management apparatus [PA(L, H(L))] 120-L-H(L).

[Processing in Common-Value Generator]

The common-value generator 140-α (FIG. 3B) generates the common value σ(α) shared by the share management apparatuses [PA(α, h(α))] 120-α-h(α) included in the subset SUB(α) corresponding to the common-value generator 140-α. In this embodiment a random number generated by the random number generator 141-α is specified as the common value σ(α), and the transmitter 142-α sends the common value σ(α) to the share management apparatuses [PA(α, h(α))] 120-α-h(α) included in the subset SUB(α).

[Processing (in Step S12) in Share Management Apparatuses]

Figure 9A:
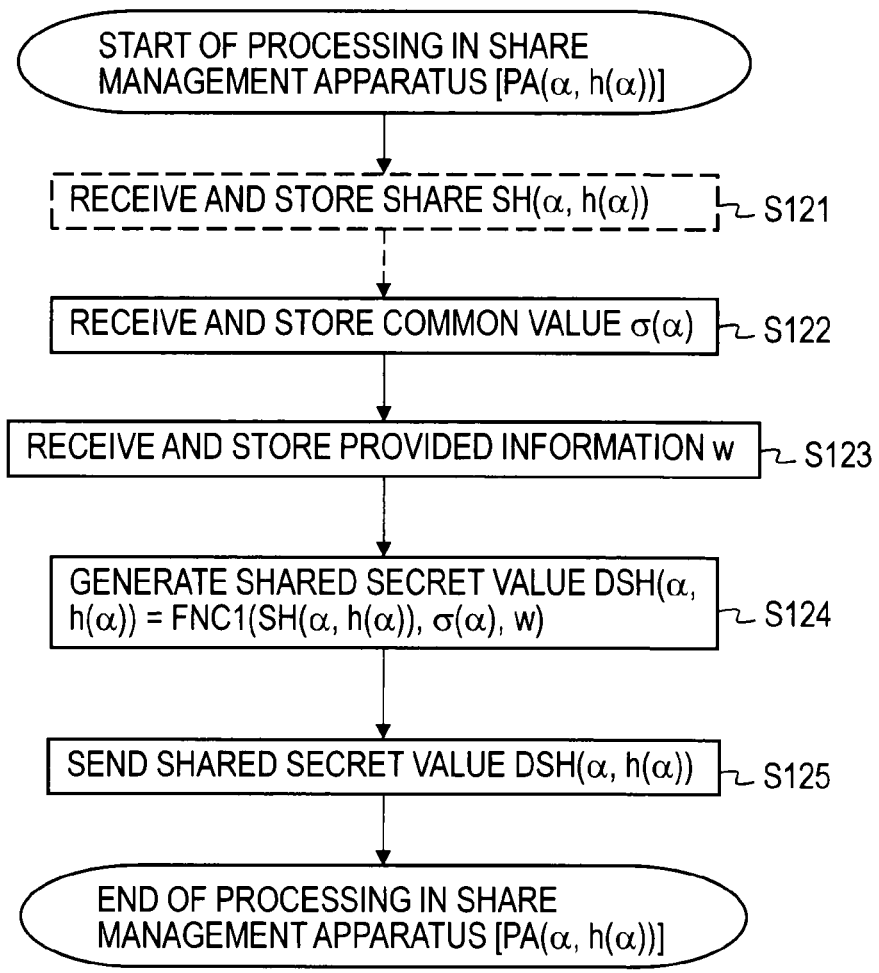
FIG. 9A is a view illustrating an example of processing in the share management apparatus in the first embodiment.
Figure 9B:
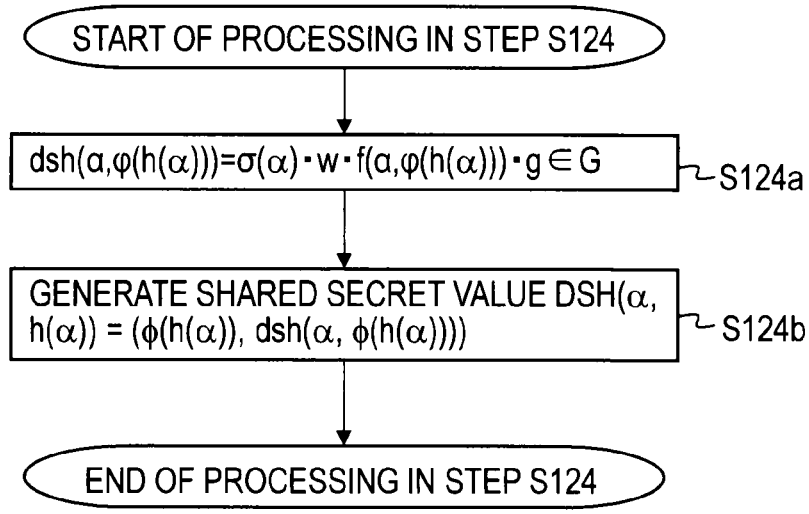
FIG. 9B is a view illustrating an example of processing in step S124 in detail.

FIG. 9A is a view illustrating an example of processing in the share management apparatuses [PA(α, h(α))] 120-α-h(α) in the first embodiment. FIG. 9B is a view illustrating an example of processing in step S124 in detail. The processing in the share management apparatuses [PA(α, h(α))] 120-α-h(α) in this embodiment will be described next with reference to those figures.

Each of the receivers 126-α-h(α) of the share management apparatuses [PA(α, h(α))] 120-α-h(α) (FIG. 3A) receives the sent share SH(α, h(α)) and stores it in the storage 122-α-h(α) (step S121). If the processing in step S121 was executed in the past and if the share SH(α, h(α)) has already been stored in the storage 122-α-h(α) of the share management apparatus [PA(α, h(α))] 120-α-h(α), the processing in step S121 may be omitted.

Each of the receivers 126-α-h(α) of the share management apparatuses [PA(α, h(α))] 120-α-h(α) also receives the common value σ(α) sent from each of the common-value generators 140-α and stores it in each of the storages 122-α-h(α) (step S122).

In this embodiment, the provided information w read from the storage 132 of the acquisition apparatus 130 (FIG. 4) is sent from the transmitter 135 through the network 150 to the share management apparatuses [PA(α, h(α))] 120-α-h(α). The provided information w is common to all the share management apparatuses [PA(α, h(α))] 120-α-h(α). The provided information w is received by each of the receivers 126-α-h(α) of the share management apparatuses [PA((, h(α))] 120-α-h(α) (FIG. 3A) and is stored in each of the storages 122-α-h(α) (step S123).

Each of the shared secret value generators 124-α-h(α) reads the share SH(α, h(α)), the common value σ(α), and the provided information w from each of the storage 122-α-h(α). Each of the shared secret value generators 124-α-h(α) generates a shared secret value DSH(α, h(α)) by performing a common operation FNC1 to the share SH(α, h(α)) and common information that includes the common value σ(α) and the provided information w, and outputs the shared secret value DSH(t, h(α)) (step S124).

Details of Step S124:

The common information used by the shared secret value generators 124-α-h(α) of the share management apparatuses

[PA(α, h(α))] 120-α-h(α) in the same subset SUB(α) is the same, and the shared secret value generators 124-α-h(α) of the share management apparatuses [PA(α, h(α))] 120-α-h(α) in the same subset SUB(α) perform the same common operation. The shares in this embodiment are expressed by Expression (5).

As shown in FIG. 9B, each of the linear operation units 124a-α-h(α) in the shared secret value generators 124-α-h(α) in this embodiment is given the common value σ(α), the provided information w, and f(α, φ(h(α)))·g in the share SH(α, (h(α))=(φ(h(α)), f(α, φ(h(α)))·g). The linear operation unit 124a-α-h(α) performs the operation given by $$dsh(\alpha,\phi(h(\alpha)))=\sigma(\alpha)\cdot w\cdot f(\alpha,\phi(h(\alpha)))\cdot g \in G \quad (6)$$

and outputs the operation result dsh(α, φ(h(α))) (step S124a).

Each output operation result dsh(α, φ(h(α))) is input to each of the shared secret value composition units 124b-α-h(α). Further, each index (h(α)) of the share SH(α, (h(α))=((h(α)), f(α, φ(h(α)))·g) is input to each f¥ of the shared secret value composition units 124b-α-h(α), and each of the shared secret value composition units 124b-α-h(α) generates a shared secret value DSH(α, (h(α)) by the operation given by $$DSH(\alpha,h(\alpha))=(\phi(h(\alpha)),dsh(\alpha,\phi(h(\alpha)))) \quad (7)$$

and outputs it (step S124b, end of detailed description of step S124).

Each generated shared secret value DSH(α, (h(α))) is sent to each of the transmitters 125-α-h(α). Each transmitter 125-α-h(α) sends the shared secret value DSH(α, (h(α))) through the network 150 to the acquisition apparatus 130 (step S125).

[Processing (in Steps S13 and S14) in Acquisition Apparatus]

Figure 10A:
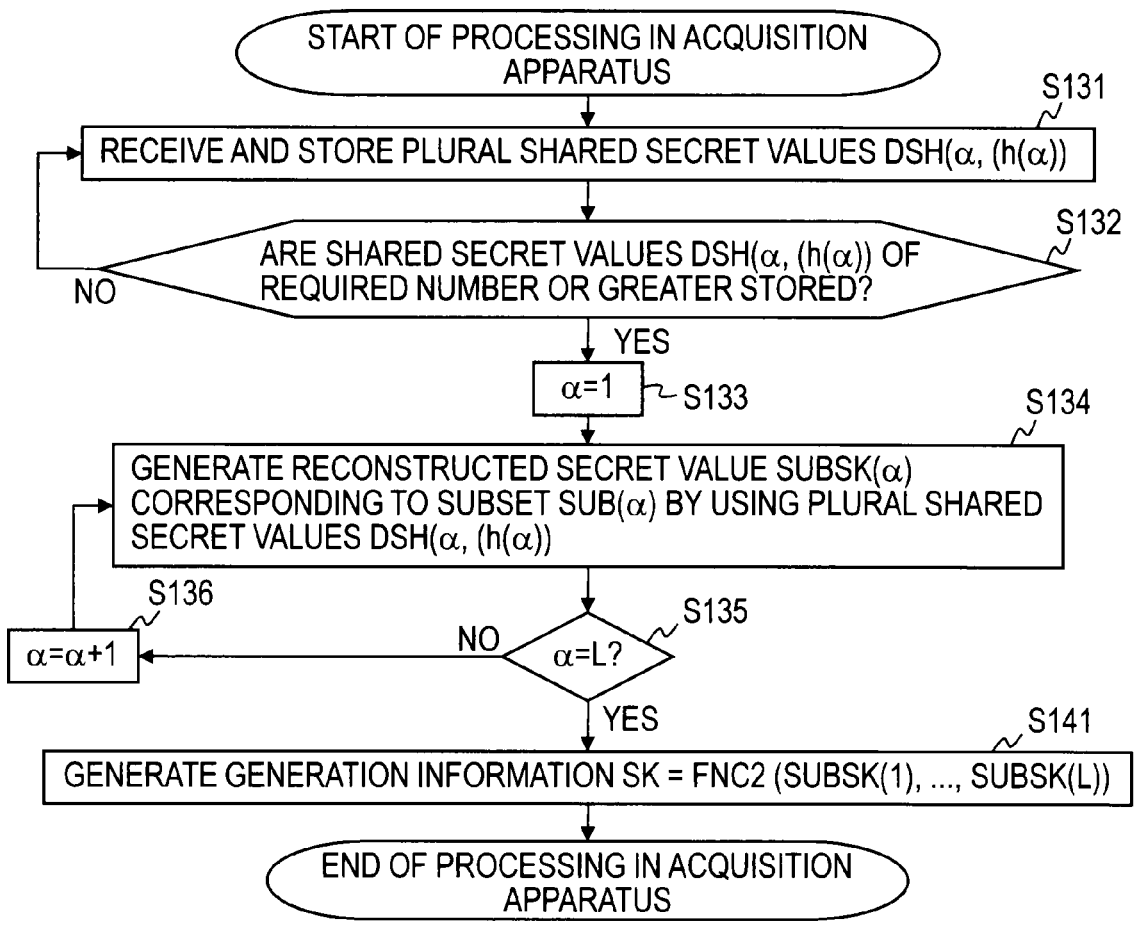
FIG. 10A is a view illustrating an example of processing in the acquisition apparatus in the first embodiment.
Figure 10B:
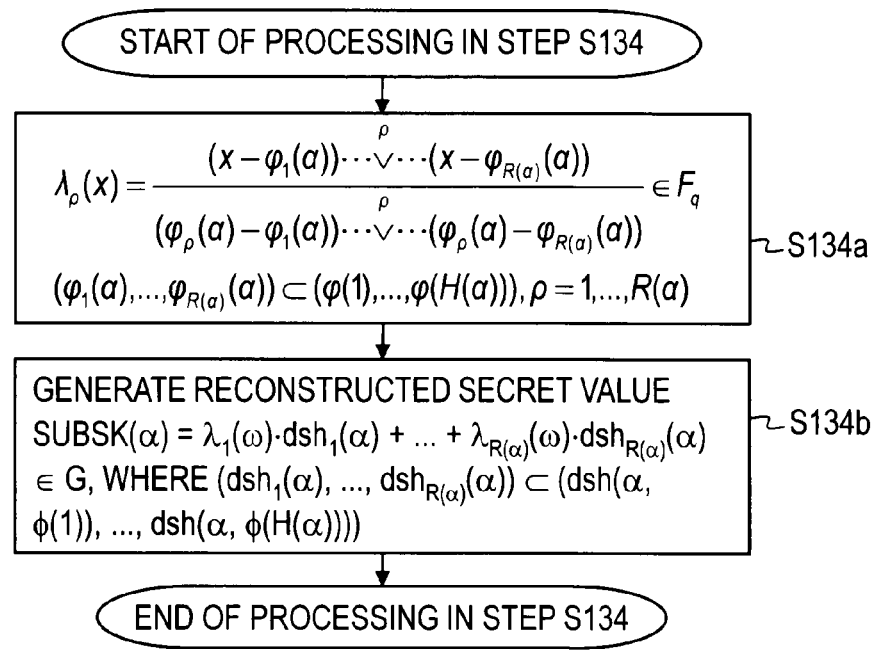
FIG. 10B is a view illustrating an example of processing in step S134.

FIG. 10A is a view illustrating an example of processing in the acquisition apparatus in the first embodiment, and FIG. 10B is a view illustrating an example of processing in step S134.

The shared secret values DSH(α, (h(α))) sent from the share management apparatuses [PA(α, h(α))] 120-α-h(α) are received by the receiver 136 in the acquisition apparatus 130 (FIG. 4) and stored in the storage 132 (step S131).

The controller 133 judges whether the number of shared secret values DSH(α, (h(α))) stored in the storage 132 is greater than or equal to a required number (step S132). In this embodiment, it is judged whether R(α) (2≤R(α)<H(α)) or greater different shared secret values DSH(α, (h(α))) are stored in the storage 132 with respect to each of α=1 to L. If it is not judged here that the number of shared secret values DSH(α, (h(α))) stored in the storage 132 is greater than or equal to the required number, the processing returns to step S131.

If it is judged that the number of shared secret values DSH(α, (h(α))) stored in the storage 132 is greater than or equal to the required number, the controller 133 specifies α=1 and stores the setting in the temporary storage 131 (step S133). Then, the required number of the shared secret values DSH(α, (h(α))), corresponding to the subset SUB(α) are read from the storage 132 and input to the reconstruction unit 134-α. The reconstruction unit 134-α generates a reconstructed secret value SUBSK(α) by reconstruction processing for each subset SUB(α) using the input shared secret values DSH(α, (h(α))), and outputs the reconstructed secret value SUBSK(α) for each subset SUB(α) (step S134).

Details of Step S134:

The shared secret values DSH(α, (h(α))) in this embodiment are given by Expression (7). The reconstruction unit 134-α (FIG. 6) is given R(α) different shared secret values DSH(α, (h(α))) for each value of α. The shared secret values DSH(α, (h(α))) corresponding to each value of α input to the reconstruction unit 134-α will be expressed as follows.

$$DSH(\alpha, \varphi_1(\alpha)) = (\varphi_1(\alpha), dsh(\alpha, \varphi_1(\alpha))) \quad (8)$$
$$\ldots$$
$$DSH(\alpha, \varphi_{R(\alpha)}(\alpha)) = (\varphi_{R(\alpha)}(\alpha), dsh(\alpha, \varphi_{R(\alpha)}(\alpha)))$$

where $$(\varphi_1(\alpha), \ldots, \varphi_{R(\alpha)}(\alpha)) \subset (\varphi(1), \ldots, \varphi(H(\alpha))) \quad (9)$$

$$(dsh_1(\alpha), \ldots, dsh_{R(\alpha)}(\alpha)) \subset (dsh(\alpha, \varphi(1)), \ldots, dsh(\alpha, \varphi(H(\alpha)))) \quad (10)$$

As shown in FIG. 10B, the indices $\phi_1(\alpha)$ to $\phi_{R(\alpha)}(\alpha)$ of DSH(α,φ$_1$(α)) to DSH(α,φ$_{R(\alpha)}$(α)) given by Expression (8) are input to the coefficient calculation unit 134a-α, and the coefficient calculation unit 134a-α performs the following operation for each value of ρ=1 to R(α).

$$\lambda_\rho(x) = \frac{(x - \phi_1(\alpha)) \ldots \overset{\rho}{\vee} \ldots (x - \phi_{R(\alpha)}(\alpha))}{(\phi_\rho(\alpha) - \phi_1(\alpha)) \ldots \overset{\rho}{\vee} \ldots (\phi_\rho(\alpha) - \phi_{R(\alpha)}(\alpha))} \in F_q \quad (11)$$

The coefficients $\lambda_\rho(x)$ (ρ=1 to R(α)) are generated and output (step S134a).

The generated coefficients $\lambda_\rho(x)$ and dsh$_1$(α) to dsh$_{R(\alpha)}$(α) corresponding to DSH(α,φ$_1$(α)) to DSH(α,φ$_{R(\alpha)}$(α)) given by Expression (8) are input to the polynomial operation unit 134b-α. The polynomial operation unit 134b-α generates the reconstructed secret value SUBSK(α) of the subset SUB(α) by the operation given by $$SUBSK(\alpha)=\lambda_1(\omega)\cdot dsh_1(\alpha)+ \ldots +\lambda_{R(\alpha)}(\omega)\cdot dsh_{R(\alpha)}(\alpha)$$
$$\in G \quad (12)$$

and output it (step S134b, end of detailed description of step S134).

Then, the controller 133 judges whether α stored in the temporary storage 131 is L (step S135). If it is not judged that α=L, the controller 133 specifies α+1 as a new value of α, stores the setting in the temporary storage 131 (step S136), and executes the processing in step S134 with the new value of α.

If it is judged in step S135 that α=L, the reconstructed secret values SUBSK(α) output from the reconstruction units 134-α are sent to the composition unit 137. The composition unit 137 generates the generation information $$SK=FNC2(SUBSK(1), \ldots, SUBSK(L)) \quad (13)$$

by using the reconstructed secret values SUBSK(α) generated for the subsets SUB(α) and outputs the generation information SK (step S141).

Details of Step S141:
Examples of Expression (13) will be given below.

EXAMPLE 1

$$SK=SUBSK(1)+ \ldots +SUBSK(L) \in G \quad (14)$$

EXAMPLE 2

$$SK=CE_1 \cdot SUBSK(1)+ \ldots +CE_L \cdot SUBSK(L) \in G \quad (15)$$

where $CE_\alpha \in F_q$ is a coefficient, and an example of the coefficient is the multiplication inverse element $(L)^{-1} \in F_q$ of L. Some of the coefficients $CE_1$ to $CE_L$ may be $0_F$. In that case, the generation information SK is generated by using just a part term of SUBSK(1)+ . . . +SUBSK(L). The composition unit 137 may select randomly a coefficient to be $0_F$ from the coefficients $CE_1$ to $CE_L$. This will improve the level of security. The composition unit 137 may also be adapted to specify the coefficients $CE_1$ to $CE_L$ freely. This allows the acquisition apparatus 130 to generate the generation information SK without using the reconstructed secret values SUBSK(α') corresponding to subsets SUB(α') having a low level of reliability, for example (end of detailed description of step S141).

[Feature of First Embodiment]

In this embodiment, the sharing apparatus 110 generates the shares SH(α, h(α)) by performing secret sharing of the secret information θ·g∈G for each subset SUB(α) separately; the share management apparatuses [PA(α, h(α))] 120-α-h(α) generate the shared secret values DSH(α, h(α)) by conducting the common operation, using the shares SH(α, h(α)) and the common information that includes the common values σ(α) and the provided information w; the acquisition apparatus 13 generates the reconstructed secret values SUBSK(α) by performing reconstruction processing for each subset SUB (α), using a plurality of shared secret values DSH(α, h(α)) corresponding to the same subset SUB(α), and generates the generation information SK by using the reconstructed secret values SUBSK(α).

As described above, the common value σ(α) shared in each subset SUB(α) is used, and the secret sharing, the common operation, and the reconstruction processing are performed for each subset SUB(α). Therefore, all of these pieces of processing are possible. Not all the share management apparatuses [PA(α, h(α))] 120-α-h(α) share the value σ, and the common value σ(α) is shared in each of the subsets SUB(α), so that a high level of security is provided. Especially, in this embodiment, common values σ(α) shared in different subsets SUB(α) are independent of one another. This ensures a high level of security.

In this embodiment, all the share management apparatuses [PA(α, h(α))] 120-α-h(α) (α=1 to L) perform the same common operation FNC1. The common operation FNC1 is linear. Therefore, in this embodiment, by generating the generation information SK through a linear combination of the reconstructed secret values SUBSK(α), the generation information SK generated by using the reconstructed secret values SUBSK(α) can be made equal to the result obtained by performing the common operation FNC1 by using the secret information θ·g and a given value σ as operands.

This embodiment uses the (R(α), H(α)) threshold secret sharing scheme for secret sharing of the secret information θ·g∈G in each subset SUB(α). In this scheme, each of the shares SH(α, (h(α)) includes an element f(α, φ(h(α)))·g∈G of a cyclic group G, where x represents a variable x which is formed of an element of a finite field $F_q$, f(α, x)∈$F_q$ represents an (R(α)−1)-th degree polynomial which satisfies f(α, ω)=θ with respect to a predetermined element ω∈$F_q$ of the finite field $F_q$, and φ(h(α)) represents an index corresponding to h(α). Secret sharing of the secret information θ·g∈G, which is an element of the cyclic group, prevents θ from leaking out even if the secret information θ·g reconstructed from the shares SH(α, (h(α)) leaks, on the assumption that it is hard to solve a discrete logarithm problem in the cyclic group G. This provides a high level of security.

[First Modification of First Embodiment]

A first modification of the first embodiment will be described next.

In the first embodiment, an element of the cyclic group G is secret information θ·g∈G, and the secret information is shared. The element θ∈$F_q$ of the finite field $F_q$ may be shared.

In that case, shares SH(α, h(α)) obtained by secret sharing using the (R(α), H(α)) threshold secret sharing scheme include an element f(α, φ(h(α)))∈$F_q$ of the finite field $F_q$, where a variable formed by an element of the finite field $F_q$ is x, an (R(α)−1)-th degree polynomial f(a, x)∈$F_q$ satisfies f(α, ω)=θ with respect to a predetermined element ω∈$F_q$ of the finite field $F_q$, and an index corresponding to h(α) is φ(h(α)).

Figure 11A:
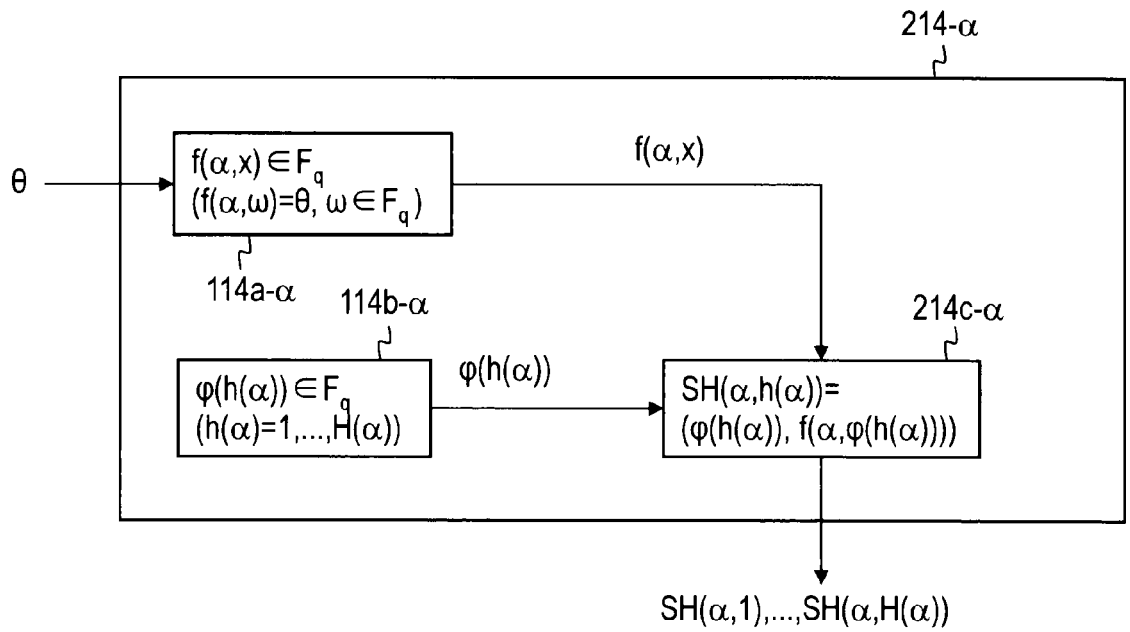
FIG. 11A is a view illustrating the structure of a secret sharing unit in a first modification of the first embodiment.
Figure 11B:
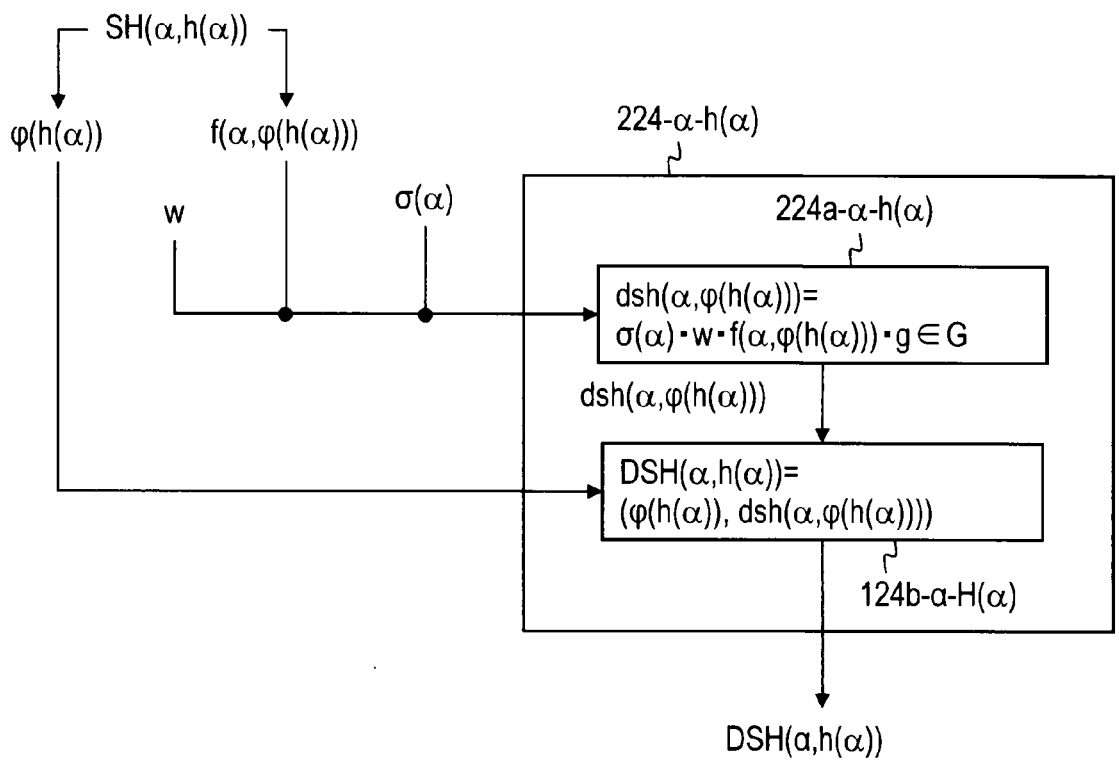
FIG. 11B is a view illustrating the structure of a shared secret value generator in the first modification of the first embodiment.

FIG. 11A is a view illustrating the structure of a secret sharing unit 214-α in the first modification of the first embodiment, and FIG. 11B is a view illustrating the structure of a shared secret value generator 224-α-h(α) in the first modification of the first embodiment. In these figures, components identical to those in the first embodiment are given the same reference numerals as in the first embodiment.

In the first modification of the first embodiment, the secret sharing units 114-α in FIG. 5A are replaced with secret sharing units 214-α; and the shared secret value generators 124-α-h(α) in FIG. 5B are replaced with shared secret value generators 224-α-h(α). The other components are the same as those in the first embodiment.

Modification of Step S112 in first modification of first embodiment

In the first modification of the first embodiment, the processing in step S112 illustrated in FIG. 8B is modified as follows.

Steps S112a and S112b shown in FIG. 8B are executed first. Then, instead of step S112c, each of the sharing processing units 214c-α (FIG. 11A) in the secret sharing unit 214-α generates shares $$SH(\alpha, h(\alpha)) = (\phi(h(\alpha)), f(\alpha, \phi(h(\alpha)))) \qquad (16)$$

by using the polynomial f(α, x)∈$F_q$ and the index φ(h(α))∈$F_q$ and outputs them (end of description of the modification of step S112 in the first modification of the first embodiment).

Modification of step S124 in first modification of first embodiment:

In the first modification of the first embodiment, the processing in step S124 in FIG. 9B is modified as follows.

Instead of step S124a, each of the linear operation units 224a-α-h(α) (FIG. 11B) is given the common value σ(α), the provided information w, and f(α, φ(h(α))) in the share SH(α, h(α))=(φ(h(α)),f(α, φ(h(α)))), and performs the operation given by $$dsh(\alpha, \phi(h(\alpha))) = \sigma(\alpha) \cdot w \cdot f(\alpha, \phi(h(\alpha))) \cdot g \in G \qquad (17)$$

and outputs the result dsh(α, φ(h(α)))∈G. Each operation result dsh(α, φ(h(α)))∈G becomes partial information of the shared secret value DSH(α, h(α)). Then, the processing in step S124b shown in FIG. 9B is executed (end of description of a modification of step S124 in the first modification of the first embodiment). The other processing is the same as in the first embodiment.

[Second Modification of First Embodiment]

A second modification of the first embodiment will be described next.

In the second modification of the first embodiment, the element θ∈$F_q$ of the finite field $F_q$ is shared with a secret sharing scheme as well. A difference from the first modification of the first embodiment is that each of the operation results dsh(α, φ(h(α))) is not an element of the cyclic group G but is an element of the finite field $F_q$.

Figure 12A:
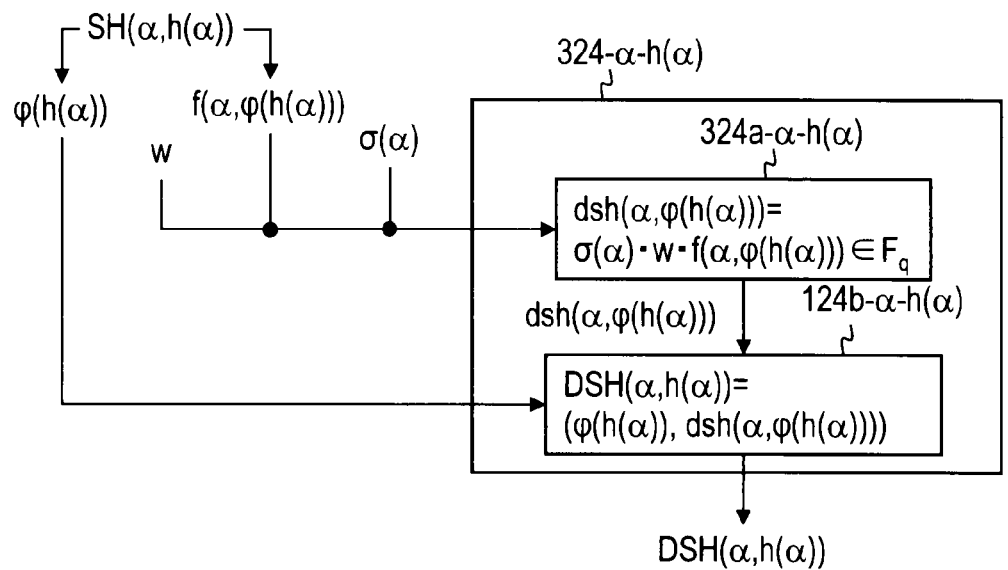
FIG. 12A is a view illustrating the structure of a shared secret value generator in a second modification of the first embodiment.
Figure 12B:
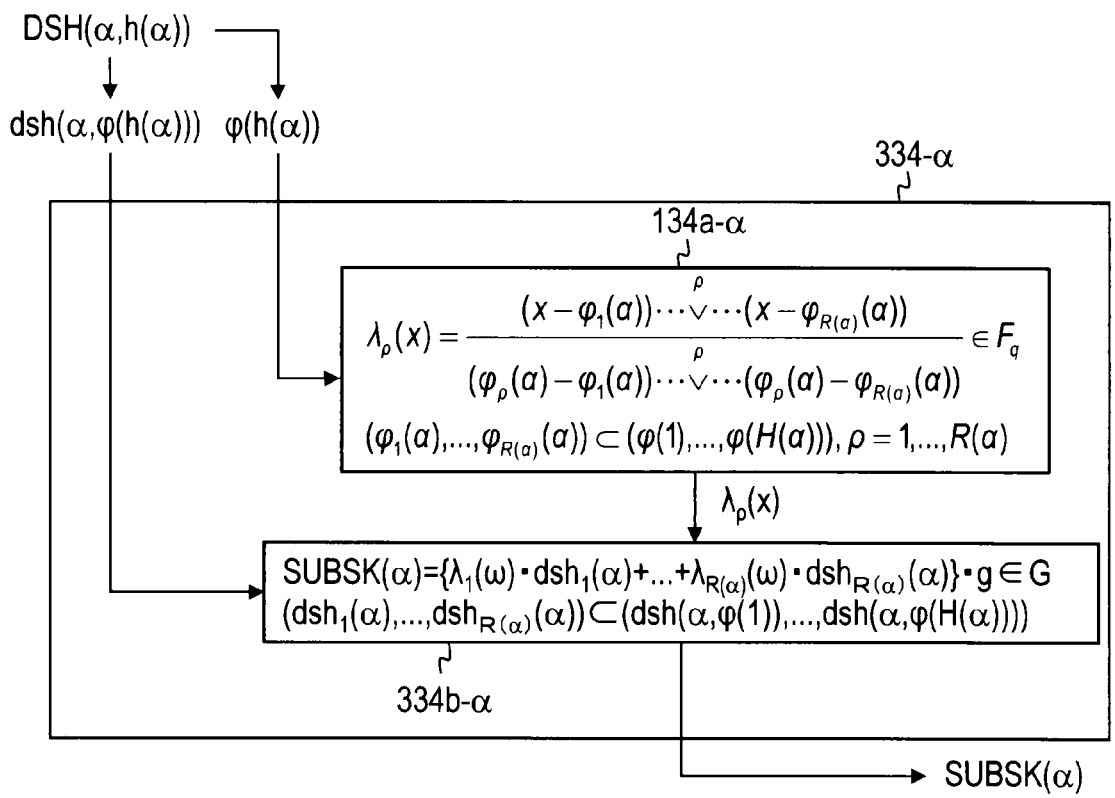
FIG. 12B is a view illustrating the structure of a reconstruction unit in the second modification of the first embodiment.

FIG. 12A is a view illustrating the structure of a shared secret value generator 324-α-h(α) in the second modification of the first embodiment, and FIG. 12B is a view illustrating the structure of a reconstruction unit 334-α in the second modification of the first embodiment. In these figures, components identical to those in the first embodiment are given the same reference numerals as in the first embodiment.

In the second modification of the first embodiment, the shared secret value generators 124-α-h(α) in FIG. 5B are replaced with shared secret value generators 324-α-h(α), and the reconstruction units 134-α in FIG. 6 are replaced with reconstruction units 334-α. As in the first modification of the first embodiment, the sharing processing units 114c-α in FIG. 5A are replaced with the sharing processing units 214c-α. The other components are the same as in the first embodiment.

Modification of step S112 in second modification of first embodiment:

A modification of step S112 in the second modification of the first embodiment is the same as the modification of step S112 in the first modification of the first embodiment.

Modification of step S124 in second modification of first embodiment:

In the second modification of the first embodiment, the processing in step S124 in FIG. 9B is modified as follows.

Instead of step S124a, each of the linear operation units 324a-α-h(α) (FIG. 12A) is given the common value σ(α), the provided information w, and f(α, φ(h(α))) in the share SH(α, h(α))=((h(α)), f(α, φ(h(α)))), and performs the operation given by $$dsh(\alpha,\phi(h(\alpha)))=\sigma(\alpha)\cdot w\cdot f(\alpha,\phi(h(\alpha)))\epsilon F_q \quad (18)$$

and outputs the result dsh(α, φ(h(α)))∈$F_q$. Each operation result dsh(α, φ(h(α)))∈$F_q$ becomes partial information of the shared secret value DSH(α, h(α)). Then, the processing in step S124b shown in FIG. 9B is executed.

Modification of step S134 in second modification of first embodiment:

The processing in step S134a shown in FIG. 10B is executed first. Then, instead of the processing in step S134b shown in FIG. 10B, each of the polynomial operation units 334b-α (FIG. 12B) is given the coefficients $\lambda_p(x)$ and $dsh_1(\alpha)$ to $dsh_{R(\alpha)}(\alpha)$ of DSH(α,φ$_1$(α)) to DSH(α,φ$_{R(\alpha)}$(α)) given by Expression (8), and generates a reconstructed secret value SUBSK(α) of the subset SUB(α) by the operation given below $$SUBSK(\alpha)=\{\lambda_1(\omega)\cdot dsh_1(\alpha)+\ldots+\lambda_{R(\alpha)}(\omega)\cdot dsh_{R(\alpha)}(\alpha)\}\cdot g\epsilon G \quad (19)$$

and outputs it (end of description of the modification of step S134 in the second modification of the first embodiment). The other processing is the same as in the first embodiment.

[Third Modification of First Embodiment]

In a third modification of the first embodiment, secret information is shared by using the (H(α), H(α)) threshold secret sharing scheme instead of the (R(α), H(α)) threshold secret sharing scheme.

Figure 13A:
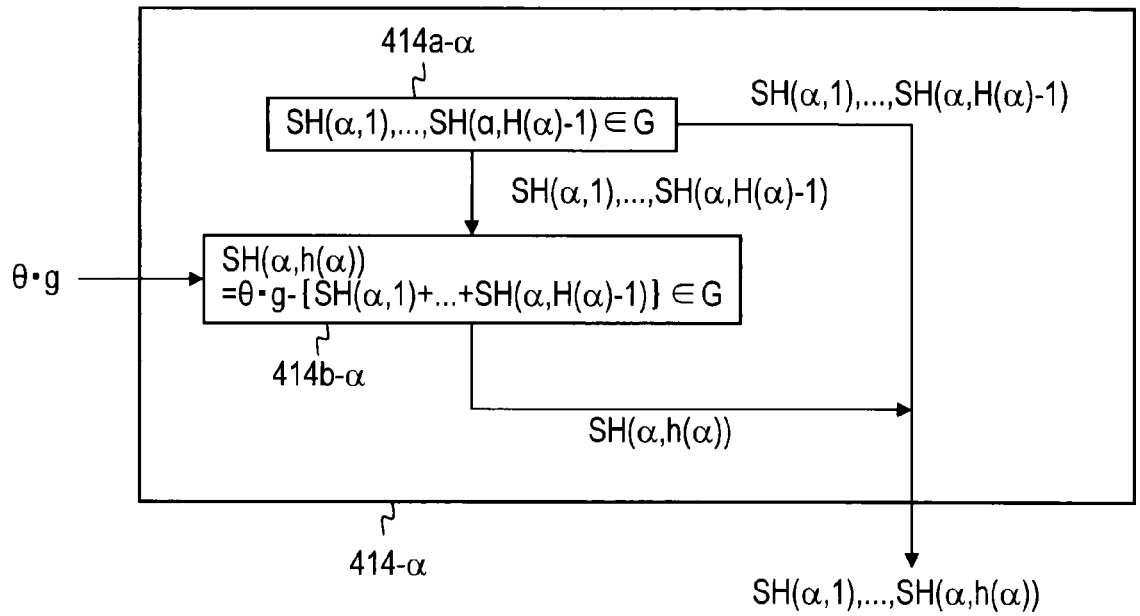
FIG. 13A is a view illustrating the structure of a secret sharing unit in a third modification of the first embodiment.
Figure 13B:
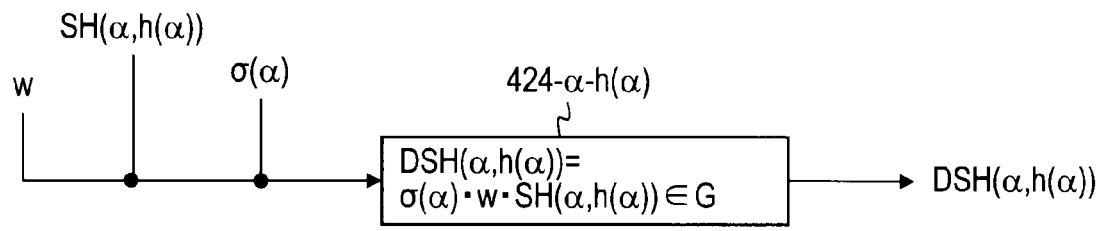
FIG. 13B is a view illustrating the structure of a shared secret value generator in the third modification of the first embodiment.
Figure 13C:
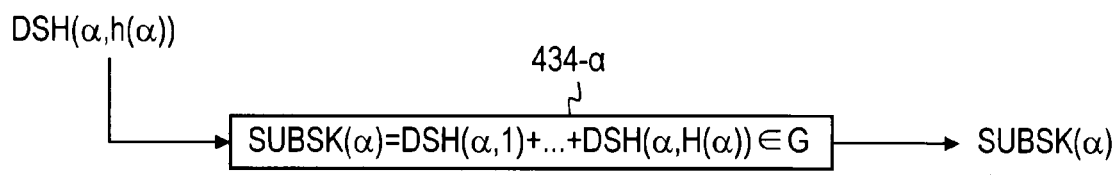
FIG. 13C is a view illustrating the structure of a reconstruction unit in the third modification of the first embodiment.

FIG. 13A is a view illustrating the structure of a secret sharing unit 414-α in the third modification of the first embodiment, FIG. 13B is a view illustrating the structure of a shared secret value generator 424-α-h(α) in the third modification of the first embodiment, and FIG. 13C is a view illustrating the structure of a reconstruction unit 434-α in the third modification of the first embodiment.

In the third modification of the first embodiment, the secret sharing units 114-α in FIG. 5A are replaced with secret sharing units 414-α, the shared secret value generators 124-α-h(α) in FIG. 5B are replaced with shared secret value generators 424-α-h(α), and the reconstruction units 134-α in FIG. 6 are replaced with reconstruction units 434-α. The other components are the same as in the first embodiment.

Modification of step S112 in third modification of first embodiment:

In the third modification of the first embodiment, the processing in step S112 shown in FIG. 8B is modified as follows.

Each of the random number generators 414a-α in the secret sharing unit 414-α (FIG. 13A) selects (H(α)−1) elements $$SH(\alpha,1),\ldots,SH(\alpha, H(\alpha)-1)\epsilon G \quad (20)$$

of the cyclic group G at random and outputs them.

Secret information θ·g∈G and (H(α)−1) elements SH(α, 1) to SH(α,H(α)−1)∈G of the cyclic group G are input to an inverse element operation unit 414b-α. The inverse element operation unit 414b-α generates SH(α, h(α)) by the operation given by $$SH(\alpha,h(\alpha))=\theta\cdot g-\{SH(\alpha,1)+\ldots+SH(\alpha,H(\alpha)-1)\}\epsilon G \quad (21)$$

and outputs it.

Each of the secret sharing units 414-α outputs $$SH(\alpha,1),\ldots,SH(\alpha, H(\alpha))\epsilon G$$

as shares of the subset SUB(α). These shares satisfy $$SH(\alpha,1)+SH(\alpha,2)+\ldots+SH(\alpha,H(\alpha))=\theta\cdot g\epsilon G \quad (22)$$

(end of description of a modification of step S112 in the third modification of the first embodiment).

Modification of step S124 in third modification of first embodiment:

In the third modification of the first embodiment, the processing in step S124 shown in FIG. 9B is modified as follows.

Each of the shared secret value generators 424-α-h(α) (FIG. 13B) is given the common value σ(α), the provided information w, and the shares SH(α, 1) to SH(α, (H(α)), generates shared secret values DSH(α, h(α)) by the operation given by $$DSH(\alpha,h(\alpha))=\sigma(\alpha)\cdot w\cdot SH(\alpha,h(\alpha))\epsilon G \quad (23)$$

and outputs them (end of description of a modification of step S124 in the third modification of the first embodiment).

Modification of step S132 in third modification of first embodiment:

In the third modification of the first embodiment, the processing in step S132 shown in FIG. 10A is modified as follows.

In the third modification, the controller 133 judges whether the number of shared secret values DSH(α, (h(α)) stored in the storage 132 is greater than or equal to a required number, and the required number in the third modification is H(α). In other words, it is judged in the third modification whether all the shared secret values DSH(α, (h(α)) are stored in the storage 132 with respect to each of α=1 to L.

Modification of step S134 in third modification of first embodiment:

In the third modification of the first embodiment, the processing in step S134 shown in FIG. 10B is modified as follows.

The shared secret value DSH(α, (h(α)) in the third modification is given by Expression (23). All the shared secret values DSH(α, (h(α)) (h(α)=1 to H(α)) corresponding to α are input to the reconstruction unit 434-α (FIG. 13C). The reconstruction unit 434-α then generates a reconstructed secret value SUBSK(α) corresponding to the subset SUB(α) by the operation given by $$SUBSK(\alpha)=DSH(\alpha,1)+\ldots+DSH(\alpha,H(\alpha))\epsilon G \quad (24)$$

and outputs it (end of description of the modification of step S134 in the third modification of the first embodiment). The other processing is the same as in the first embodiment.

[Fourth Modification of First Embodiment]

Also in a fourth modification of the first embodiment, secret information is shared by using the (H(α), H(α)) threshold secret sharing scheme instead of the (R(α), H(α)) threshold secret sharing scheme. A difference from the third modification is that the secret information θ∈$F_q$, which is an element of the finite field $F_q$, is shared with the secret sharing scheme.

Figure 14A:
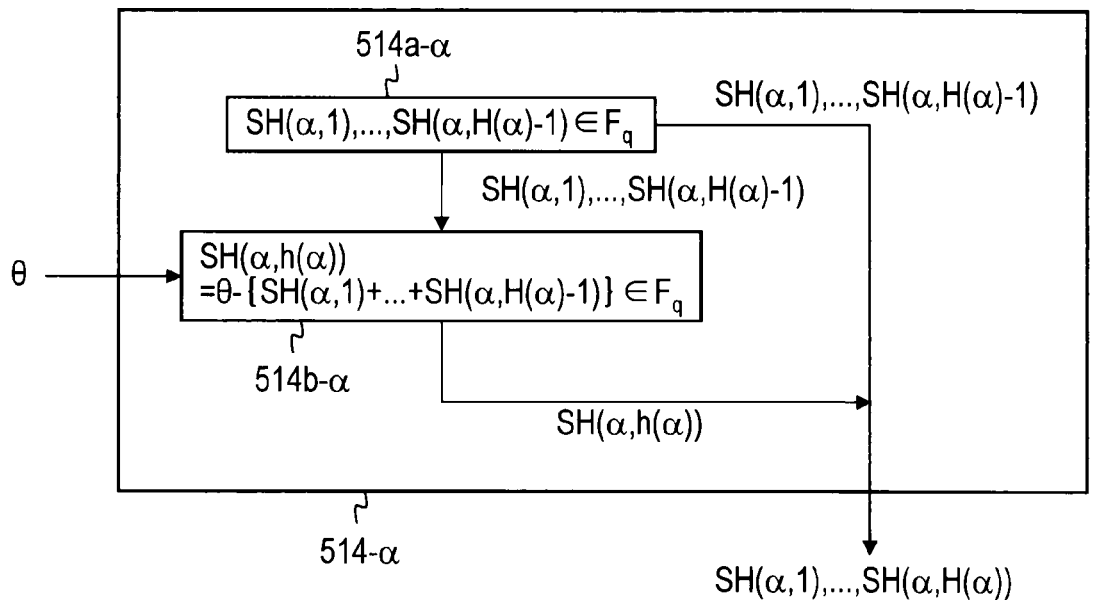
FIG. 14A is a view illustrating the structure of a secret sharing unit in a fourth modification of the first embodiment.
Figure 14B:
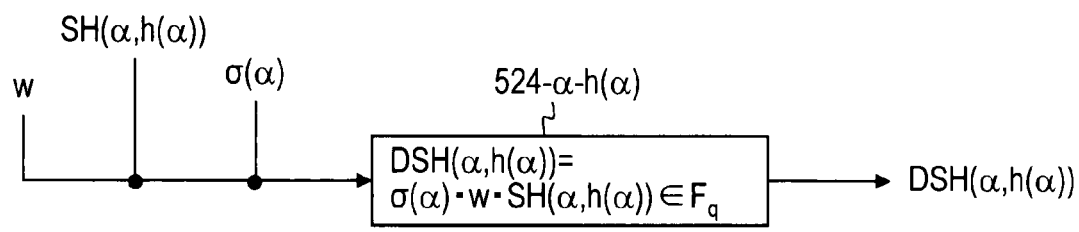
FIG. 14B is a view illustrating the structure of a shared secret value generator in the fourth modification of the first embodiment.
Figure 14C:
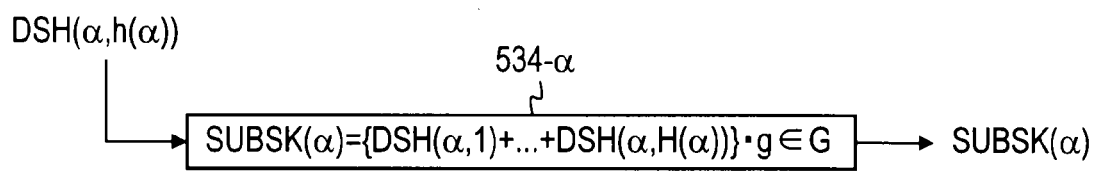
FIG. 14C is a view illustrating the structure of a reconstruction unit in the fourth modification of the first embodiment.

FIG. 14A is a view illustrating the structure of a secret sharing unit 514-α in the fourth modification of the first embodiment; FIG. 14B is a view illustrating the structure of a shared secret value generator 524-α-h(α) in the fourth modification of the first embodiment; and FIG. 14C is a view illustrating the structure of a reconstruction unit 534-α in the fourth modification of the first embodiment.

In the fourth modification of the first embodiment, the secret sharing units 114-α in FIG. 5A are replaced with secret sharing units 514-α; the shared secret value generators 124-α-h(α) in FIG. 5B are replaced with shared secret value generators 524-α-h(α); and the reconstruction units 134-α in FIG. 6 is replaced with reconstruction units 534-α. The other components are the same as in the first embodiment.

Modification of step S112 in fourth modification of first embodiment:

In the fourth modification of the first embodiment, the processing in step S112 shown in FIG. 8B is modified as follows.

Each of the random number generators 514a-α in the secret sharing unit 514-α (FIG. 14A) selects (H(α)−1) elements $$SH(\alpha,1),\ldots,SH(\alpha, H(\alpha)-1) \in F_q \quad (25)$$

of the finite element $F_q$ at random and outputs them.

Each of the inverse element operation unit 514b-α is given the secret information θ∈$F_q$ and the (H(α)−1) elements SH(α, 1) to SH(α, H(α)−1)∈$F_q$ of the finite element $F_q$, generates SH(α, h(α)) by the operation given by $$SH(\alpha,h(\alpha))=\theta-\{SH(\alpha,1)+\ldots+SH(\alpha,H(\alpha)-1)\} \in F_q \quad (26)$$

and outputs it.

Each of the secret sharing unit 514-α outputs $$SH(\alpha,1),\ldots,SH(\alpha, H(\alpha)) \in F_q \quad (27)$$

as shares of the subset SUB(α). These shares satisfy $$SH(\alpha,1)+SH(\alpha,2)+\ldots+SH(\alpha,H(\alpha))=\theta \in F_q \quad (28)$$

(end of description of the modification of step S112 in the fourth embodiment of the first embodiment).

Modification of step S124 ion fourth modification of first embodiment:

In the fourth modification of the first embodiment, the processing in step S124 shown in FIG. 9B is modified as follows.

Each of the shared secret value generator 524-α-h(α) (FIG. 14B) is given the common value σ(α), the provided information w, and the shares SH(α, 1) to SH(α, (H(α)), generates a shared secret value DSH(α, h(α)) by the operation given by $$DSH(\alpha,h(\alpha))=\sigma(\alpha) \cdot w \cdot SH(\alpha,h(\alpha)) \in F_q \quad (29)$$

and outputs it (end of description of a modification of step S124 in the fourth modification of the first embodiment).

Modification of step S132 in fourth modification of first embodiment

The modification of step S132 in the fourth modification of the first embodiment is the same as in the third modification of the first embodiment.

Modification of step S134 in fourth modification of first embodiment:

In the fourth modification of the first embodiment, the processing in step S134 shown in FIG. 10B is modified as follows.

The shared secret value DSH(α, h(α)) in the fourth modification is given by Expression (29). All the shared secret values DSH(α, (h(α)) (h(α)=1 to H(α)) corresponding to α are input to the reconstruction unit 534-α corresponding to α (FIG. 14C). The reconstruction unit 534-α then generates a reconstructed secret value SUBSK(α) of the subset SUB(α) by the operation given by $$SUBSK(\alpha)=\{DSH(\alpha,1)+\ldots+DSH(\alpha,H(\alpha))\} \cdot g \in G \quad (30)$$

and outputs it (end of description of the modification of step S134 in the fourth modification of the first embodiment). The other processing is the same as in the first embodiment.

[Other Modifications of First Embodiment]

Other modifications of the first embodiment can be made within the scope of the present invention. For example, the operation given by $$DSH(\alpha,h(\alpha))=\sigma(\alpha) \cdot w \cdot SH(\alpha,h(\alpha)) \in F_q \quad (31)$$

may be carried out instead of Expression (29) in the fourth modification of the first embodiment, and the operation of Expression (24) may be carried out instead of Expression (30). The reconstructed secret value SUBSK(α) may be an element of the finite field $F_q$.

In this embodiment, the same secret sharing scheme is used in each subset SUB(α) to share a secret. Different secret sharing schemes may be used for different subsets SUB.

The common-value generator 140-α is provided for each subset SUB(α) in this embodiment. Any given share management apparatus in each subset SUB(α) may have the function of the common-value generator. In that case, the common-value generator 140-α becomes unnecessary.

In this embodiment, the common operation FNC1 is carried out by using the shares SH(α, h(α)) and the common information containing the common value σ(α) and the provided information w to generate the shared secret value DSH (α, h((α)). The shared secret value DSH(α, h(α)) may be generated by using the common value σ((α) as the common information without using the provided information. The common information may contain the common value σ(α), the provided information w, and other information.

The common operation for obtaining the shared secret values DSH(α, h(α)) must be the same in each subset SUB (α). However, different subsets SUB(α) do not always need to carry out the same common operation.

[Second Embodiment]

A second embodiment of the present invention will be described next. This embodiment is an application of the first embodiment to key generation in inner product predicate encryption.

[Definitions]

Terms and symbols to be used in the embodiments will be defined first.

Matrix: A matrix represents a rectangular arrangement of elements of a set in which an operations is defined. Not only elements of a ring but also elements of a group can form the matrix.

$(\cdot)^T$: $(\cdot)^T$ represents a transposed matrix of "·".

$(\cdot)^{-1}$: $(\cdot)^{-1}$ represents a inverse matrix of "·".

∧: ∧ represents logical AND.

∨: ∨ represents logical OR.

Z: Z represents a set of integers.

k: k represents a security parameter (k∈Z, k>0).

$F_q$: $F_q$ represents a finite field of order q, where q is an integer equal to or larger than 1. For example, the order q is a prime number of a power of a prime number. In other words, the finite field $F_q$ is a prime field or an extension field over the prime field, for example.

$0_F$: $0_F$ represents an additive identity element of the finite field $F_q$.

$1_F$: represents a multiplicative identity element of the finite field $F_q$.

$\delta(i,j)$: $\delta(i,j)$ represents a Kronecker's delta function. When $i=j$, $\delta(i,j)=1_F$. When $i\neq j$, $\delta(i,j)=0_F$.

E: E represents an elliptic curve over the finite field $F_q$.

$G_1$, $G_2$, $G_T$: $G_1$, $G_2$, $G_T$ represent cyclic groups of order q, respectively. Examples of the cyclic groups $G_1$ and $G_2$ include the finite set E[p] of p-division points on the elliptic curve E and subgroups thereof. $G_1$ may equal $G_2$, or $G_1$ may not equal $G_2$. Examples of the cyclic group $G_T$ include a finite set forming an extension field over the finite field $F_q$. A specific example thereof is a finite set of the p-th root of 1 on the algebraic closure of the finite field $F_q$.

In the embodiment, operations defined on the cyclic groups $G_1$ and $G_2$ are expressed additively, and an operation defined on the cyclic group $G_T$ is expressed multiplicatively. More specifically, $\chi \cdot \Omega \in G_1$ for $\chi \in F_q$ and $\Omega \in G_1$ means that the operation defined in the cyclic group $G_1$ is applied to $\Omega \in G_1$, $\chi$ times, and $\Omega_1 + \Omega_2 \in G_1$ for $\Omega_1, \Omega_2 \in G_1$ means that the operation defined in the cyclic group $G_1$ is applied to $\Omega_1 \in G_1$ and $\Omega_2 \in G_1$. In the same way, $\chi \cdot \Omega \in G_2$ for $\chi \in F_q$ and $\Omega \in G_2$ means that the operation defined in the cyclic group $G_2$ is applied to $\Omega \in G_2$, $\chi$ times, and $\Omega_1 + \Omega_2 \in G_2$ for $\Omega_1, \Omega_2 \in G_2$ means that the operation defined in the cyclic group $G_2$ is applied to $\Omega_1 \in G_2$ and $\Omega_2 \in G_2$. In contrast, $\Omega^{\chi \times G}{}_T$ for $\chi \in F_q$ and $\Omega \in G_T$ means that the operation defined in the cyclic group $G_T$ is applied to $\Omega \in G_T$, $\chi$ times, and $\Omega_1 \cdot \Omega_2 \in G_T$ for $\Omega_1, \Omega_2 \in G_T$ means that the operation defined in the cyclic group $G_T$ is applied to $\Omega_1 \in G_T$ and $\Omega_2 \in G_T$.

n: n represents an integer equal to or larger than 1

$\zeta$: $\zeta$ represents an integer equal to or larger than 1. An example of $\zeta$ is 2 or 3.

$G_1{}^{n+\zeta}$: $G_1{}^{n+1}$ represents a direct product of $(n+\zeta)$ cyclic groups $G_1$.

$G_2{}^{n+\zeta}$: $G_2{}^{n+1}$ represents a direct product of $(n+\zeta)$ cyclic groups $G_2$.

$g_1$, $g_2$, $g_T$: $g_1$, $g_2$, $g_T$ represent generators of the cyclic groups G, $G_1$, $G_2$, $G_T$, respectively.

V: V represents an $(n+\zeta)$-dimensional vector space formed of the direct product of the $(n+\zeta)$ cyclic groups $G_1$.

V*: V* represents an $(n+\zeta)$-dimensional vector space formed of the direct product of the $(n+\zeta)$ cyclic groups $G_2$.

e: e represents a function (hereinafter referred to as "bilinear function") for calculating a non-degenerate bilinear map that maps the direct product $G_1{}^{n+\zeta} \times G_2{}^{n+\zeta}$ of the direct product $G_1{}^{n+\zeta}$ and the direct product $G_2{}^{n+\zeta}$ to the cyclic group $G_T$. The bilinear function e outputs an element of the cyclic group $G_T$ in response to input $(n+\zeta)$ elements $\gamma_\beta$ ($\beta=1, \ldots, n+\zeta$) of the cyclic group $G_1$ and $(n+\zeta)$ elements $\gamma_\beta^*$ ($\beta=1, \ldots, n+\zeta$) of the cyclic group $G_2$.

$$e: G_1{}^{n+\zeta} \times G_2{}^{n+\zeta} \to G_T \tag{32}$$

The bilinear function e satisfies the following characteristics:

Bilinearity: The following relationship is satisfied for all $\Gamma_1 \in G_1{}^{n+\zeta}$, $\Gamma_2 \in G_2{}^{n+\zeta}$, and $\nu, \kappa \in F_q$ $$e(\nu \cdot \Gamma_1, \kappa \cdot \Gamma_2) = e(\Gamma_1, \Gamma_2)^{\nu \cdot \kappa} \tag{33}$$

Non-degeneracy: This function does not map all $\Gamma_1 \in G_1{}^{n+\zeta}$ and $\Gamma_2 \in G_2{}^{n+\zeta}$ onto the identity element of the cyclic group $G_T$.

Computability: There exists an algorithm for efficiently calculating $e(\Gamma_1, \Gamma_2)$ for all $$\Gamma_1 \in G_1{}^{n+\zeta}, \Gamma_2 \in G_2{}^{n+\zeta} \tag{34}$$

In the embodiment, the bilinear function e is formed with following a non-degenerate bilinear function which maps the direct product $G_1 \times G_2$ of the cyclic groups $G_1$ and $G_2$ to the cyclic group $G_T$.

$$\text{Pair}: G_1 \times G_2 \to G_T \tag{35}$$

The bilinear function e outputs an element of the cyclic group $G_T$ in response to an input $(n+\zeta)$-dimensional vector $(\gamma_1, \ldots, \gamma_{n+\zeta})$ formed of $(n+\zeta)$ elements $\gamma_\beta$ ($\beta=1, \ldots, n+\zeta$) of the cyclic group $G_1$ and an input $(n+\zeta)$-dimensional vector $(\gamma_1^*, \ldots, \gamma_{n+\zeta}^*)$ formed of $(n+\zeta)$ elements $\gamma_\beta^*$ ($\beta=1, \ldots, n+\zeta$) of the cyclic group $G_2$.

$$e = \Pi_{\beta=1}^{n+\zeta} \text{Pair}(\gamma_\beta, \beta_\beta^*) \tag{36}$$

The bilinear function Pair outputs an element of the cyclic group $G_T$ in response to an input element of the cyclic group $G_1$ and an input element of the cyclic group $G_2$, and satisfies the following characteristics:

Bilinearity: The following relationship is satisfied for all $\Omega_1 \in G_1$, $\Omega_2 \in G_2$, and $\nu, \kappa \in F_q$ $$\text{Pair}(\nu \cdot \Omega_1, \kappa \cdot \Omega_2) = \text{Pair}(\Omega_1, \Omega_2)^{\nu \cdot \kappa} \tag{37}$$

Non-degeneracy: This function does not map all $$\Omega_1 \in G_1, \Omega_2 \in G_2 \tag{38}$$

onto the identity element of the cyclic group $G_T$.

Computability: There exists an algorithm for efficiently calculating $\text{Pair}(\Omega_1, \Omega_2)$ for all $\Omega_1 \in G_1$, $\Omega_2 \in G_2$.

A specific example of the bilinear function Pair is a function for performing a pairing computation such as Weil pairing or Tate pairing. (See reference literature 4, Alfred. J. Menezes, "Elliptic Curve Public Key Cryptosystems", Kluwer Academic Publishers, ISBN 0-7923-9368-6, pp. 61-81, for example.) Depending on the kind of the elliptic curve E, a modified pairing function $e(\Omega_1, \text{phi}(\Omega_2))$ ($\Omega_1 \in G_1, \Omega_2 \in G_2$) which is a combination of a predetermined function phi and the function for pairing computation such as the Tate paring may be used as the bilinear function Pair (see reference literature 2, for example). As the algorithm for performing a pairing computation on a computer, the Miller algorithm (see reference literature 5, V. S. Miller, "Short Programs for Functions on Curves", 1986, http://crypto.stanford.edu/miller/miller.pdf) or some other known algorithm can be used. Forming methods of a cyclic group and an elliptic curve for effective pairing computation have been well known. (For example, see reference literature 2; reference literature 6, A. Miyaji, M. Nakabayashi, and S. Takano, "New Explicit Conditions of Elliptic Curve Traces for FR Reduction", IEICE Trans. Fundamentals, Vol. E84-A, No. 5, pp. 1234-1243, May 2001; reference literature 7, P. S. L. M. Barreto, B. Lynn, M. Scott, "Constructing Elliptic Curves with Prescribed Embedding Degrees", Proc. SCN '2002, LNCS 2576, pp. 257-267, Springer-Verlag. 2003; and reference literature 8, R. Dupont, A. Enge, F. Morain, "Building Curves with Arbitrary Small MOV Degree over Finite Prime Fields", http://eprint.iacr.org/2002/094/).

$a_i$ ($i=1, \ldots, n+\zeta$): $a_i$ ($i=1, \ldots, n+1$) represent $(n+\zeta)$-dimensional basis vectors having $(n+\zeta)$ elements of the cyclic group $G_1$ as elements. For example, each of the basis vectors $a_i$ is the $(n+1)$-dimensional vector in which i-th element is $\kappa_1 \cdot g_1 \in G_1$ and remain elements are identity elements (each of which is expressed additively as "0") of the cyclic group $G_1$.

In that case, the elements of the (n+ζ)-dimensional basis vectors $a_i$ (i=1, ..., n+ζ) can be listed as follows:

$$a_1 = (\kappa_1 \cdot g_1, 0, 0, \ldots, 0) \quad (39)$$

$$a_2 = (0, \kappa_1 \cdot g_1, 0, \ldots, 0)$$

$$\ldots$$

$$a_{n+\zeta} = (0, 0, 0, \ldots, \kappa_1 \cdot g_1)$$

Here, $\kappa_1$ is a constant that is an element of the finite field $F_q$ other than the additive identity element $0_F$. An example of $\kappa_1 \in F_q$ is $\kappa_1 = 1_F$. The basis vectors $a_i$ are orthogonal bases. Each (n+ζ)-dimensional vector having (n+ζ) elements of the cyclic group $G_1$ as elements is expressed by a linear combination of the (n+ζ)-dimensional basis vectors $a_i$ (i=1, ..., n+ζ). That is, the (n+ζ)-dimensional basis vectors $a_i$ span the vector space V, described earlier.

$a_i^*$ (i=1, ..., n+ζ): $a_i^*$ (i=1, ..., n+1) represent (n+ζ)-dimensional basis vectors having (n+ζ) elements of the cyclic group $G_2$ as elements. For example, each of the basis vectors $a_i^*$ is the (n+1)-dimensional vector in which i-th element is $\kappa_2 \cdot g_2 \in G_2$ and remain elements are identity elements (each of which is expressed additively as "0") of the cyclic group $G_2$. In that case, the elements of the basis vectors $a_i^*$ (i=1, ..., n+ζ) can be listed as follows:

$$a_1^* = (\kappa_2 \cdot g_2, 0, 0, \ldots, 0) \quad (40)$$

$$a_2^* = (0, \kappa_2 \cdot g_2, 0, \ldots, 0)$$

$$\ldots$$

$$a_{n+\zeta}^* = (0, 0, 0, \ldots, \kappa_2 \cdot g_2)$$

Here, $\kappa_2$ is a constant that is an element of the finite field $F_q$ other than the additive identity element $0_F$. An example of $\kappa_2 \in F_q$ is $\kappa_2 = 1_F$. The basis vectors $a_i^*$ are orthogonal bases. Each (n+ζ)-dimensional vector having (n+ζ) elements of the cyclic group $G_2$ as elements is expressed by a linear combination of (n+ζ)-dimensional basis vectors $a_i^*$ (i=1, ..., n+ζ). That is, the (n+ζ)-dimensional basis vectors $a_i^*$ span the vector space V*, described earlier.

The basis vectors $a_i$ and the basis vectors $a_i^*$ satisfy the following expression for an element $\tau = \kappa_1 \cdot \kappa_2$ of the finite field $F_q$ other than $0_F$:

$$e(a_i, a_j^*) = g_T^{\tau \cdot \delta(i,j)} \quad (41)$$

When i=j, the following expression is satisfied from Expressions (36) and (37).

$$e(a_i, a_j^*) = \text{Pair}(\kappa_1 \cdot g_1, \kappa_2 \cdot g_2) \cdot \text{Pair}(0, 0) \cdot \ldots \cdot \text{Pair}(0, 0)$$

$$= \text{Pair}(g_1, g_2)^{\kappa_1 \kappa_2} \cdot \text{Pair}(g_1, g_2)^{0 \cdot 0} \cdot \ldots \cdot \text{Pair}(g_1, g_2)^{0 \cdot 0}$$

$$= \text{Pair}(g_1, g_2)^{\kappa_1 \kappa_2}$$

$$= g_T^{\tau}$$

When i≠j, the right side of $e(a_i, a_j^*) = \Pi_{i=1}^{n+\zeta} \text{Pair}(a_i, a_j^*)$ does not include $\text{Pair}(\kappa_1 \cdot g_1, \kappa_2 \cdot g_2)$ and is the product of $\text{Pair}(\kappa_1 \cdot g_1, 0)$, $\text{Pair}(0, \kappa_2 \cdot g_2)$, and $\text{Pair}(0, 0)$. In addition, the following expression is satisfied from Expression (37).

$$\text{Pair}(g_1, 0) = \text{Pair}(0, g_2) = \text{Pair}(g_1, g_2)^0$$

Therefore, when i≠j, the following expression is satisfied.

$$e(a_i, a_j^*) = e(g_1, g_2)^0 = g_T^0$$

Especially when $\tau = \kappa_1 \cdot \kappa_2 = 1_F$ (for example, $\kappa_1 = \kappa_2 = 1_F$), the following expression is satisfied.

$$e(a_i, a_j^*) = g_T^{\delta(i,j)} \quad (42)$$

Here, $g_T^0 = 1$ is the identity element of the cyclic group $G_T$, and $g_T^1 = g_T$ is a generator of the cyclic group $G_T$. In that case, the basis vectors $a_i$ and the basis vectors $a_i^*$ are dual normal orthogonal bases, and the vector space V and the vector space V* are a dual vector space in which the bilinear mapping can be defined (dual pairing vector space (DPVS)).

A: "A" represents an (n+ζ) row by (n+ζ) column matrix having the basis vectors $a_i$ (i=1, ..., n+ζ) as elements. When the basis vectors $a_i$ (i=1, ..., n+ζ) are expressed by Expression (39), for example, the matrix A is as follows:

$$A = \begin{pmatrix} a_1 \\ a_2 \\ \vdots \\ a_{n+1} \end{pmatrix} = \begin{pmatrix} \kappa_1 \cdot g_1 & 0 & \cdots & 0 \\ 0 & \kappa_1 \cdot g_1 & & \vdots \\ \vdots & & \ddots & 0 \\ 0 & \cdots & 0 & \kappa_1 \cdot g_1 \end{pmatrix} \quad (43)$$

A*: "A*" represents an (n+ζ) row by (n+ζ) column matrix having the basis vectors $a_i^*$ (i=1, ..., n+ζ) as elements. When the basis vectors $a_i^*$ (i=1, ..., n+ζ) are expressed by Expression (40), for example, the matrix A* is as follows:

$$A^* = \begin{pmatrix} a_1^* \\ a_2^* \\ \vdots \\ a_{n+1}^* \end{pmatrix} = \begin{pmatrix} \kappa_2 \cdot g_2 & 0 & \cdots & 0 \\ 0 & \kappa_2 \cdot g_2 & & \vdots \\ \vdots & & \ddots & 0 \\ 0 & \cdots & 0 & \kappa_2 \cdot g_2 \end{pmatrix} \quad (44)$$

X: X represents an (n+ζ) row by (n+ζ) column matrix having elements of the finite field $F_q$ as entries. The matrix X is used for coordinate transformation of the basis vectors $a_i$. The matrix X is expressed as $\chi_{i,j} \in F_q$, the matrix X is as follows:

$$X = \begin{pmatrix} \chi_{1,1} & \chi_{1,2} & \cdots & \chi_{1,n+\zeta} \\ \chi_{2,1} & \chi_{2,2} & & \vdots \\ \vdots & & \ddots & \vdots \\ \chi_{n+\zeta,1} & \chi_{n+\zeta,2} & \cdots & \chi_{n+\zeta,n+\zeta} \end{pmatrix} \quad (45)$$

where each $\chi_{i,j} \in F_q$ is the entry in the i-th row and the j-th column (i=1, ..., n+1, j=1, ..., n+1) of the matrix X.

Here, each entry $\chi_{i,j}$ of the matrix X is called as a transformation coefficient.

X*: X* represents the transposed matrix of the inverse matrix of the matrix X. $X^* = (X^{-1})^T$. The matrix X* is used to for coordinate transformation of the basis vectors $a_i^*$. The matrix X* is expressed as follows:

$$X^* = \begin{pmatrix} \chi_{1,1}^* & \chi_{1,2}^* & \cdots & \chi_{1,n+\zeta}^* \\ \chi_{2,1}^* & \chi_{2,2}^* & & \vdots \\ \vdots & & \ddots & \vdots \\ \chi_{n+\zeta,1}^* & \chi_{n+\zeta,2}^* & \cdots & \chi_{n+\zeta,n+\zeta}^* \end{pmatrix} \quad (46)$$

where each $\chi_{i,j}^* \in F_q$ is the entry in the i-th row and j-th column of the matrix $X^*$.

Here, each entry $\chi_{i,j}^*$ of the matrix $X^*$ is called as a transformation coefficient.

In that case, $X \cdot (X^*)^T = I$ is satisfied, where "I" represents an (n+1) row by (n+1) column unit matrix. In other words, the unit matrix is expressed as follows.

$$I = \begin{pmatrix} 1_F & 0_F & \cdots & 0_F \\ 0_F & 1_F & & \vdots \\ \vdots & & \ddots & 0_F \\ 0_F & 0_F & \cdots & 1_F \end{pmatrix} \qquad (47)$$

The following expression is satisfied.

$$\begin{pmatrix} \chi_{1,1} & \chi_{1,2} & \cdots & \chi_{1,n+\zeta} \\ \chi_{2,1} & \chi_{2,2} & & \vdots \\ \vdots & & \ddots & \vdots \\ \chi_{n+\zeta,1} & \chi_{n+\zeta,2} & \cdots & \chi_{n+\zeta,n+\zeta} \end{pmatrix} \cdot \begin{pmatrix} \chi_{1,1}^* & \chi_{2,1}^* & \cdots & \chi_{n+\zeta,1}^* \\ \chi_{1,2}^* & \chi_{2,2}^* & & \vdots \\ \vdots & & \ddots & \vdots \\ \chi_{1,n+\zeta}^* & \chi_{2,n+\zeta}^* & \cdots & \chi_{n+\zeta,n+\zeta}^* \end{pmatrix} = \qquad (48)$$

$$\begin{pmatrix} 1_F & 0_F & \cdots & 0_F \\ 0_F & 1_F & & \vdots \\ \vdots & & \ddots & 0_F \\ 0_F & 0_F & \cdots & 1_F \end{pmatrix}$$

Here, (n+ζ)-dimensional vectors will be defined below.

$$\vec{\chi_i} = (\chi_{i,1}, \ldots, \chi_{i,n+\zeta}) \qquad (49)$$

$$\vec{\chi_j} = (\chi_{j,1}, \ldots, \chi_{j,n+\zeta}) \qquad (50)$$

The inner product of the (n+ζ)-dimensional vectors $\vec{\chi_i}$ and $\vec{\chi_j}^*$ satisfies the following expression from Expression (48).

$$\vec{\chi_i} \cdot \vec{\chi_j}^* = \delta(i,j) \qquad (51)$$

$b_i$: $b_i$ represent (n+ζ)-dimensional basis vectors having (n+ζ) elements of the cyclic group $G_1$ as elements. The basis vectors $b_i$ are obtained by coordinate transformation of the basis vectors $a_i$ (i=1, ..., n+1) with the matrix X. That is, the basis vectors b are obtained by the following calculation.

$$b_i = \Sigma_{j=1}^{n+\zeta} \chi_{i,j} \cdot a_j \qquad (52)$$

When the basis vectors $a_j$ (j=1, ..., n+ζ) are expressed by Expression (39), each element of the basis vectors $b_i$ is shown below.

$$b_i = (\chi_{i,1} \cdot \kappa_1 \cdot g_1, \chi_{i,2} \cdot \kappa_1 \cdot g_1, \ldots, \chi_{i,n+\zeta} \cdot \kappa_1 \cdot g_1) \qquad (53)$$

Each (n+ζ)-dimensional vector having (n+ζ) elements of the cyclic group $G_1$ as elements is expressed by a linear combination of (n+ζ)-dimensional basis vectors $b_i$ (i=1, ..., n+ζ). That is, the (n+ζ)-dimensional basis vectors $b_i$ span the vector space V, described earlier.

$b_i^*$: $b_i^*$ represent (n+ζ)-dimensional basis vectors having (n+ζ) elements of the cyclic group $G_2$ as elements. The basis vectors $b_i^*$ are obtained by coordinate transformation of the basis vectors $a_i^*$ (i=1, ..., n+ζ) with the matrix $X^*$. That is, the basis vectors $b_i^*$ are obtained by the following calculation $$b_i^* = \Sigma_{j=1}^{n+\zeta} \chi_{i,j}^* \cdot a_j^* \qquad (54)$$

When the basis vectors $a_j$ (j=1, ..., n+ζ) are expressed by Expression (40), each element of the basis vectors $b_i^*$ are shown below.

$$b_i^* = (\chi_{i,1}^* \cdot \kappa_2 \cdot g_2, \chi_{i,2}^* \cdot \kappa_2 \cdot g_2, \ldots, \chi_{i,n+\zeta}^* \cdot \kappa_2 \cdot g_2) \qquad (55)$$

Each (n+ζ)-dimensional vector having (n+ζ) elements of the cyclic group $G_2$ as elements is expressed by a linear combination of (n+ζ)-dimensional basis vectors $b_i^*$ (i=1, ..., n+ζ). That is, the (n+ζ)-dimensional basis vectors $b_i^*$ span the vector space $V^*$, described earlier.

The basis vectors $b_i$ and the basis vectors $b_i^*$ satisfy the following expression for the elements $\tau = \kappa_1 \cdot \kappa_2$ of the finite field $F_q$ other than $0_F$:

$$e(b_i, b_j^*) = g_T^{\tau \cdot \delta(i,j)} \qquad (56)$$

The following expression is satisfied from Expressions (36), (51), (53), and (55).

$$e(b_i, b_j^*) = \prod_{\beta=1}^{n+\zeta} \text{Pair}(\chi_{i,\beta} \cdot \kappa_1 \cdot g_1, \chi_{j,\beta}^* \cdot \kappa_2 \cdot g_2)$$

$$= \text{Pair}(\chi_{i,1} \cdot \kappa_1 \cdot g_1, \chi_{j,1}^* \cdot \kappa_2 \cdot g_2) \cdot \ldots \cdot$$

$$(\chi_{i,n} \cdot \kappa_1 \cdot g_1, \chi_{j,n}^* \cdot \kappa_2 \cdot g_2) \times$$

$$\text{Pair}(\chi_{j,n+1} \cdot \kappa_1 \cdot g_1, \chi_{j,n+1}^* \cdot \kappa_2 \cdot g_2) \cdot \ldots \cdot$$

$$\text{Pair}(\chi_{j,n+\zeta} \cdot \kappa_1 \cdot g_1, \chi_{j,n+\zeta}^* \cdot \kappa_2 \cdot g_2)$$

$$= \text{Pair}(g_1, g_2)^{\kappa_1 \cdot \kappa_2 \cdot \chi_{i,1} \cdot \chi_{j,1}^*} \cdot \ldots \cdot \text{Pair}(g_1, g_2)^{\kappa_1 \cdot \kappa_2 \cdot \chi_{i,2} \cdot \chi_{j,2}^*} \times$$

$$\text{Pair}(g_1, g_2)^{\kappa_1 \cdot \kappa_2 \cdot \chi_{i,n+1} \cdot \chi_{j,n+1}^*} \cdot \ldots \cdot$$

$$\text{Pair}(g_1, g_2)^{\kappa_1 \cdot \kappa_2 \cdot \chi_{i,n+\zeta} \cdot \chi_{j,n+\zeta}^*}$$

$$= \text{Pair}(g_1, g_2)^{\kappa_1 \cdot \kappa_2 (\chi_{i,1} \cdot \chi_{j,1}^* + \chi_{i,2} \cdot \chi_{j,2}^* + \cdots + \chi_{i,n+1} \cdot \chi_{j,n+1}^* + \cdots + \chi_{i,n+\zeta} \cdot \chi_{j,n+\zeta}^*)}$$

$$= \text{Pair}(g_1, g_2)^{\kappa_1 \cdot \kappa_2 \cdot \vec{\chi_i} \cdot \vec{\chi_j}^*}$$

$$= \text{Pair}(g_1, g_2)^{\tau \cdot \delta(i,j)}$$

$$= g_T^{\tau \cdot \delta(i,j)}$$

Especially when $\tau = \kappa_1 \cdot \kappa_2 = 1_F$ (for example, $\kappa_1 = \kappa_2 = 1_F$), the following expression is satisfied.

$$e(b_i, b_j^*) = g_T^{\delta(i,j)} \qquad (57)$$

In that case, the basis vectors $b_i$ and the basis vectors $b_i^*$ are the dual normal orthogonal basis of a dual pairing vector space (the vector space V and the vector space $V^*$).

As long as Expression (56) is satisfied, the basis vectors $a_i$ and $a_i^*$ other than those shown in Expressions (39) and (40) as examples, and the basis vectors $b_i$ and $b_i^*$ other than those shown in Expressions (52) and (54) as examples may be used.

B: B represents an (n+ζ) row by (n+ζ) column matrix having the basis vectors $b_i$ (i=1, ..., n+ζ) as elements. B=X·A is satisfied. When the basis vectors $b_i$ are expressed by Expression (53), for example, the matrix B is as follows:

$$B = \begin{pmatrix} b_1 \\ b_2 \\ \vdots \\ b_{n+\zeta} \end{pmatrix} \qquad (58)$$

$$= \begin{pmatrix} \chi_{1,1} \cdot \kappa_1 \cdot g_1 & \chi_{1,2} \cdot \kappa_1 \cdot g_1 & \cdots & \chi_{1,n+\zeta} \cdot \kappa_1 \cdot g_1 \\ \chi_{2,1} \cdot \kappa_1 \cdot g_1 & \chi_{2,2} \cdot \kappa_1 \cdot g_1 & & \vdots \\ \vdots & & \ddots & \chi_{n+\zeta-1,n+\zeta} \cdot \kappa_1 \cdot g_1 \\ \chi_{n+\zeta,1} \cdot \kappa_1 \cdot g_1 & \cdots & \chi_{n+\zeta,n+\zeta-1} \cdot \kappa_1 \cdot g_1 & \chi_{n+\zeta,n+\zeta} \cdot \kappa_1 \cdot g_1 \end{pmatrix}$$

$B^*$: $B^*$ represents an (n+ζ) row by (n+ζ) column matrix having the basis vectors $b_i^*$ (i=1, ..., n+ζ) as elements.

$B^* = X^* \cdot A^*$ is satisfied. When the basis vectors $b_i^*$ ($i=1, \ldots, n+\zeta$) are expressed by Expression (55), for example, the matrix $B^*$ is as follows:

$$B^* = \begin{pmatrix} b_1^* \\ b_2^* \\ \vdots \\ b_{n+\zeta}^* \end{pmatrix} \quad (59)$$

$$= \begin{pmatrix} \chi_{1,1}^* \cdot \kappa_2 \cdot g_2 & \chi_{1,2}^* \cdot \kappa_2 \cdot g_2 & \cdots & \chi_{1,n+\zeta}^* \cdot \kappa_2 \cdot g_2 \\ \chi_{2,1}^* \cdot \kappa_2 \cdot g_2 & \chi_{2,2}^* \cdot \kappa_2 \cdot g_2 & & \vdots \\ \vdots & & \ddots & \chi_{n+\zeta-1,n+\zeta}^* \cdot \kappa_2 \cdot g_2 \\ \chi_{n+\zeta,1}^* \cdot \kappa_2 \cdot g_2 & \cdots & \chi_{n+\zeta,n+\zeta-1}^* \cdot \kappa_2 \cdot g_2 & \chi_{n+\zeta,n+\zeta}^* \cdot \kappa_2 \cdot g_2 \end{pmatrix}$$

$\vec{w}$: $\vec{w}$ represents an n-dimensional vector having elements of the finite field $F_q$ as elements.

$$\vec{w} = (w_1, \ldots, w_n) \in F_q^n \quad (60)$$

$w_\mu$: $w_\mu$ represents the µ-th (µ=1, . . . , n) element of the n-dimensional vector.

$\vec{v}$: $\vec{v}$ represents an n-dimensional vector having elements of the finite field $F_q$ as elements.

$$\vec{v} = (v_1, \ldots, v_n) \in F_q^n \quad (61)$$

$v_\mu$: $v_\mu$ represents the µ-th (µ=1, . . . , n) element of the n-dimensional vector.

[Inner Product Predicate Encryption]

The basic scheme of inner product predicate encryption will be described below.

[Predicate Encryption]

In the predicate encryption (sometimes called as function encryption), a ciphertext can be decrypted when a combination of attribute information and predicate information makes a predetermined logical formula true. One of the attribute information and predicate information is embedded in the ciphertext and the other is embedded in key information. The conventional predicate encryption is, for example, disclosed in reference literature 9, Jonathan Katz, Amit Sahai and Brent Waters, "Predicate Encryption Supporting Disjunctions, Polynomial Equations, and Inner Products", one of four papers from Eurocrypt 2008 invited by the Journal of Cryptology.

[Inner Product Predicate Encryption]

In the inner product predicate encryption, a ciphertext can be decrypted when the inner product of the attribute information and the predicate information which are vectors is zero. In inner product predicate encryption, an inner product of zero is equivalent to the logical formula of true.

[Relationship Between Logical Formula and Polynomial]

In the inner product predicate encryption, the logical formula formed of a logical OR(s) and/or a logical AND(s) is expressed by a polynomial.

The logical OR $(x=\eta_1) \vee (x=\eta_2)$ of a proposition 1 indicating that x is $\eta_1$ and a proposition 2 indicating that x is $\eta_2$ is expressed by the following polynomial.

$$(x-\eta_1) \cdot (x-\eta_2) \quad (62)$$

Then, the relationships between truth values and the function values of Expression (62) are shown in the following table.

TABLE 1

| Proposition 1 ($x = \eta_1$) | Proposition 2 ($x = \eta_2$) | Logical OR ($x = \eta_1$)∨($x = \eta_2$) | Function value ($x = \eta_1$) · ($x = \eta_2$) |
|---|---|---|---|
| True | True | True | 0 |
| True | False | True | 0 |
| False | True | True | 0 |
| False | False | False | Other than 0 |

As understood from Table 1, when the logical OR $(x=\eta_1) \vee (x=\eta_2)$ is true the function value of Expression (62) is zero; and when the logical OR $(x=\eta_1) \vee (x=\eta_2)$ is false, the function value of Expression (62) is a value other than zero. In other words, the logical OR $(x=\eta_1) \vee (x=\eta_2)$ of true is equivalent to the function value of zero in Expression (62). Therefore, the logical OR can be expressed by Expression (62).

The logical AND $(x=\eta_1) \wedge (x=\eta_2)$ of the proposition 1 indicating that x is $\chi_1$ and the proposition 2 indicating that x is $\eta_2$ is expressed by the following polynomial $$\iota_1 \cdot (x-\eta_1) + \iota_2 \cdot (x-\eta_2) \quad (63)$$

where $\iota_1$ and $\iota_2$ are random numbers. Then, the relationships between truth values and the function values of Expression (63) are shown in the following table.

TABLE 2

| Proposition 1 ($x = \eta_1$) | Proposition 2 ($x = \eta_2$) | Logical AND ($x = \eta_1$)∧($x = \eta_2$) | Function value $\iota_1 \cdot (x - \eta_1) + \iota_2 \cdot (x - \eta_2)$ |
|---|---|---|---|
| True | True | True | 0 |
| True | False | False | Other than 0 |
| False | True | False | Other than 0 |
| False | False | False | Other than 0 |

As understood from Table 2, when the logical AND $(x=\eta_1) \wedge (x=\eta_2)$ is true, the function value of Expression (67) is zero; and when the logical AND $x=\eta_1) \wedge (x=\eta_2)$ is false, the function value of Expression (63) is a value other than zero. In other words, a logical AND $(x=\eta_1) \wedge (x=\eta_2)$ of true is equivalent to a function value of zero in Expression (63). Therefore, the logical AND can be expressed by Expression (63).

As described above, by using Expressions (62) and (63), a logical formula formed of a logical OR(s) and/or a logical AND(s) can be expressed by a polynomial f(x). An example will be shown below.

Logical formula: $\{(x=\eta_1) \vee (x=\eta_2) \vee (x=\eta_3)\} \wedge (x=\eta_4) \wedge (x=\eta_5)$ Polynomial: $f(x) = \iota_1 \cdot \{(x-\eta_1) \cdot (x-\eta_2) \cdot (x-\eta_3)\} + \iota_2 \cdot (x-\eta_4) + \iota_3 \cdot (x-\eta_5)$ (64)

In Expression (62), one indeterminate element x is used to express the logical OR. A plurality of indeterminate elements can also be used to express a logical OR. For example, when two indeterminate elements $x_0$ and $x_1$ are used, the logical OR $(x_0=\eta_0) \vee (x_1=\eta_1)$ of the proposition 1 indicating that $x_0$ is $\eta_0$ and the proposition 2 indicating that $x_1$ is $\eta_1$ can be expressed by the following polynomial.

$$(x_0-\eta_0) \cdot (x_1-\eta_1)$$

Three or more indeterminate elements can also be used to express a logical OR by a polynomial.

In Expression (63), one indeterminate element x is used to express the logical AND. A plurality of indeterminate elements can also be used to express a logical AND. For example, the logical AND $(x_0=\eta_0) \wedge (x_1=\eta_1)$ of the proposition 1 indicating that $x_0$ is $\eta_0$ and the proposition 2 indicating that $x_1$ is $\eta_1$ can be expressed by the following polynomial.

$$\iota_0 \cdot (x_0 - \eta_0) + \iota_1 (x_1 - \eta_1)$$

Three or more indeterminate elements can also be used to express a logical AND by a polynomial.

A logical formula including a logical OR(s) and/or a logical AND(s) is expressed with H (H≥1) types of indeterminate elements $x_0, \ldots, x_{H-1}$ as the polynomial $f(x_0, \ldots, x_{H-1})$. It is assumed that a proposition for each of the indeterminate elements $x_0, \ldots, X_{H-1}$ is "$x_h$ is $\eta_h$", where $\eta_h$ (h=0, …, H−1) is a constant determined for each proposition. Then, in the polynomial $f(x_0, \ldots, x_{H-1})$ indicating the logical formula, the proposition indicating that an indeterminate element $x_h$ is a constant $\eta_h$ is expressed by the polynomial indicating the difference between the indeterminate element $x_h$ and the constant $\eta_h$; the logical OR of propositions is expressed by the product of the polynomials indicating the propositions; and the logical AND of propositions or the logical ORs of propositions is expressed by a linear combination of the polynomials indicating the propositions or the logical ORs of propositions. For example, five indeterminate elements $x_0, \ldots, x_4$ are used to express a logical formula $$\{(x_0 = \eta_0) \vee (x_1 = \eta_1) \vee (x_2 = \eta_2)\} \wedge (x_3 = \eta_3) \wedge (x_4 = \eta_4)$$

by the following polynomial $$f(x_0, \ldots, x_4) = \iota_0 \cdot \{(x_0 - \eta_0) \cdot (x_1 - \eta_1) \cdot (x_2 - \eta_2)\} + \iota_1 \cdot (x_3 - \eta_3) + \iota_2 \cdot (x_4 - \eta_4)$$

[Relationship Between Polynomial and Inner Product]

The polynomial $f(x_0, \ldots, x_{H-1})$ indicating a logical formula can be expressed by the inner product of two n-dimensional vectors. More specifically, the polynomial $f(x_0, \ldots, x_{H-1})$ is equal to the inner product of a vector $$\vec{v} = (v_1, \ldots, v_n),$$

which has the indeterminate elements of the terms of the polynomial $f(x_0, \ldots, x_{H-1})$ as elements, and a vector $$\vec{w} = (w_1, \ldots, w_n)$$

which has the coefficients of the terms of the polynomial $f(x_0, \ldots, X_{H-1})$ as elements $$f(x_0, \ldots, x_{H-1}) = \vec{w} \cdot \vec{v}$$

In other words, whether the polynomial $f(x_0, \ldots, X_{H-1})$ indicating a logical formula is zero is equivalent to whether the inner product of the vector $\vec{v}$ having the indeterminate elements of the terms of the polynomial $f(x_0, \ldots, X_{H-1})$ as elements and the vector $\vec{w}$ having the coefficients of the terms of the polynomial $f(x_0, \ldots, x_{H-1})$ as elements is zero.

$$f(x_0, \ldots, x_{H-1}) = 0 \longleftrightarrow \vec{w} \cdot \vec{v} = 0$$

For example, a polynomial $f(x) = \theta_0 \cdot x^0 + \theta_1 \cdot x + \ldots + \theta_{n-1} \cdot x^{n-1}$ expressed with one indeterminate element x can be expressed by the inner product of two n-dimensional vectors as follows.

$$\vec{w} = (w_1, \ldots, w_n) = (\theta_0, \ldots, \theta_{n-1}) \tag{65}$$

$$\vec{v} = (v_1, \ldots, v_n) = (x^0, \ldots, x^{n-1}) \tag{66}$$

$$f(x) = \vec{w} \cdot \vec{v} \tag{67}$$

In other words, whether the polynomial $f(x)$ indicating a logical formula is zero is equivalent to whether the inner product in Expression (67) is zero.

$$f(x) = 0 \longleftrightarrow \vec{w} \cdot \vec{v} = 0 \tag{68}$$

When a vector having the indeterminate elements of the terms of the polynomial $f(x_0, \ldots, x_{H-1})$ as elements is expressed by $$\vec{w} = (w_1, \ldots, w_n)$$

and a vector having the coefficients of the terms of the polynomial $f(x_0, \ldots, x_{H-1})$ as elements is expressed by $$\vec{v} = (v_1, \ldots, v_n)$$

whether the polynomial $f(x_0, \ldots, x_{H-1})$ indicating a logical formula is zero is equivalent to whether the inner product of the vector $\vec{w}$ and the vector $\vec{v}$ is zero.

For example, when the following expressions are used instead of Expressions (65) and (66), $$\vec{w} = (w_1, \ldots, w_n) = (x^0, \ldots, x^{n-1}) \tag{69}$$

$$\vec{v} = (v_1, \ldots, v_n) = (\theta_0, \ldots, \theta_{n-1}) \tag{70}$$

whether the polynomial $f(x)$ indicating a logical formula is zero is equivalent to whether the inner product in Expression (67) is zero.

In the inner product predicate encryption, one of the vectors $\vec{v} = (v_0, \ldots, v_{n-1})$ and $\vec{w} = (w_0, \ldots, w_{n-1})$ is used as the attribute information and the other is used as the predicate information. One of the attribute information and predicate information is embedded in ciphertext and the other is embedded in key information. For example, an n-dimensional vector $(\phi_0, \ldots, \theta_{n-1})$ is used as the predicate information, another n-dimensional vector $(x^0, \ldots, x^{n-1})$ is used as the attribute information, one of the attribute information and predicate information is embedded in ciphertext, and the other is embedded in key information. It is assumed in the following description that an n-dimensional vector embedded in key information is $\vec{w} = (w_1, \ldots, w_n)$ and another n-dimensional vector embedded in ciphertext is $\vec{v} = (v_1, \ldots, v_n)$. For example, Predicate information: $\vec{w} = (w_1, \ldots, w_n) = (\theta_0, \ldots, \theta_{n-1})$
Attribute information: $\vec{v} = (v_1, \ldots, v_n) = (x^0, \ldots, x^{n-1})$
Alternatively,
Predicate information: $\vec{v} = (v_1, \ldots, v_n) = (\phi_0, \ldots, \phi_{n-1})$
Attribute information: $\vec{w} = (w_1, \ldots, w_n) = (x^0, \ldots, x^{n-1})$

[Basic Scheme of Inner Product Predicate Encryption]

An example of basic scheme of a key encapsulation mechanism (KEM) using the inner product predicate encryption will be described below. This scheme includes Setup($1^k$), GenKey(MSK, $\vec{w}$), Enc(PA, $\vec{v}$), and Dec(SKw, $C_2$).

Setting up Setup($1^k$):
Input: Security parameter k
Output: Master key information MSK, public parameter PK In an example of Setup($1^k$), the security parameter k is used as n, and the (n+ζ) row by (n+ζ) column matrix A having the (n+ζ)-dimensional basis vectors $a_i$ (i=1, …, n+ζ) as elements, the (n+ζ) row by (n+ζ) column matrix A* having the basis vectors $a_i^*$ (i=1, …, n+ζ) as elements, and the (n+ζ) row by (n+ζ) column matrixes X and X* used for coordinate transformation are selected. Then, the (n+ζ)-dimensional basis vectors $b_i$ (i=1, …, n+ζ) are calculated through coordinate transformation by Expression (52), and the (n+ζ)-dimensional basis vectors $b_i^*$ (i=1, …, n+ζ) are calculated through coordinate transformation by Expression (54). Then, the (n+ζ) row by (n+ζ) column matrix B* having the basis vectors $b_i^*$(i=1, …, n+ζ) as elements is output as the master key information MSK; and the vector spaces V and V*, the (n+ζ) row by (n+ζ) column matrix B having the basis vectors $b_i$ (i=1, ..., n+ζ) as elements, the security parameter k, the finite field $F_q$, the elliptic curve E, the cyclic groups $G_1$, $G_2$, and $G_T$, the generators $g_1$, $g_2$, and $g_T$, the bilinear function e, and others are output as the public parameter PK.

Key information generation GenKey(MSK, $w^\rightarrow$):
Input: Master key information MSK, vector $w^\rightarrow$
Output: Key information D* corresponding to vector $w^\rightarrow$
In an example of GenKey(MSK, $w^\rightarrow$), an element $\alpha \in F_q$ is selected from the finite field $F_q$. Then, the matrix B*, which is the master key information MSK, is used to generate and output the key information D* corresponding to the vector $w^\rightarrow$ in the following way.

$$D^* = \alpha \cdot (\Sigma_{\mu=1}^n w_\mu \cdot b_\mu^*) + b_{n+1}^* \in G_2^{n+1} \tag{71}$$

If it is difficult to solve a discrete logarithmic problem on the cyclic group $G_2$, it is difficult to separate and extract the component of $b_\mu^*$ from the key information D*.

Encryption Enc(PA, $v^\rightarrow$):
Input: Public parameter PK, vector $v^\rightarrow$
Output: Ciphertext $C_2$, common key K
In an example of Enc(PA, $v^\rightarrow$), the common key K and a random number $\upsilon_0$ which is an element of the finite field $F_q$, are generated. Then, the public parameter PK, such as the matrix B, elements $\upsilon_1, \ldots, \upsilon_\zeta$ of the finite field $F_q$, the vector $v^\rightarrow$, and the random number $\upsilon_0$ are used to generate ciphertext $C_2$ in the following way.

$$C_2 = \upsilon_0 \cdot (\Sigma_{\mu=1}^n v_\mu b_\mu) + \Sigma_{\mu=n+1}^{n+\zeta} \upsilon_{\mu-n} \cdot b_\mu \in G_1^{n+\zeta} \tag{72}$$

The ciphertext $C_2$ and the common key K are output. An example of the common key K is $g_T^{\tau \cdot \upsilon 1} \in G_T$, where $\upsilon 1$ means $\upsilon_1$. An example of $\tau$ is $1_F$, as described above. If it is difficult to solve a discrete logarithmic problem on the cyclic group $G_1$, it is difficult to separate and extract the component of $b_\mu$ from the ciphertext $C_2$.

Decryption and key sharing Dec(SKw, $C_2$):
Input: Key information $D_1^*$ corresponding to vector $w^\rightarrow$, ciphertext $C_2$
Output: Common key K
In an example of Dec(SKw, $C_2$), the ciphertext $C_2$ and the key information $D_1^*$ are input to the bilinear function e of Expression (32). Then, from the characteristics of Expressions (33) and (56), the following is satisfied.

$$e(C_2, D^*) = e\left(\upsilon_0 \cdot \left(\sum_{\mu=1}^n v_\mu \cdot b_\mu\right) + \sum_{\mu=n+1}^{n+\zeta} \upsilon_{\mu-n} \cdot b_\mu, \sigma \cdot \left(\sum_{\mu=1}^n w_\mu \cdot b_\mu^*\right) + b_{n+1}^*\right) \tag{73}$$

$$= e(\upsilon_0 \cdot v_1 \cdot b_1, \sigma \cdot w_1 \cdot b_1^*) \cdot \ldots \cdot e(\upsilon_0 \cdot v_n \cdot b_n, \sigma \cdot w_n \cdot b_n^*) \times$$
$$e(\upsilon_1 \cdot b_{n+1}, b_{n+1}^*) \cdot e(\upsilon_2 \cdot b_{n+2}, 0) \cdot \ldots \cdot e(\upsilon_\zeta \cdot b_{n+\zeta}, 0)$$
$$= e(b_1, b_1^*)^{\upsilon_0 \cdot v_1 \cdot \sigma \cdot w_1} \cdot \ldots \cdot e(b_n, b_n^*)^{\upsilon_0 \cdot v_n \cdot \sigma \cdot w_n} \cdot e(b_{n+1}, b_{n+1}^*)^{\upsilon_1}$$
$$= g_T^{\tau \cdot \upsilon_0 \cdot v_1 \cdot \sigma \cdot w_1} \cdot \ldots \cdot g_T^{\tau \cdot \upsilon_0 \cdot v_n \cdot \sigma \cdot w_n} \cdot g_T^{\tau \cdot \upsilon_1}$$
$$= g_T^{\tau \cdot \upsilon_0 \cdot \sigma \cdot v^* \cdot w^*} \cdot g_T^{\tau \cdot \upsilon_1}$$

When the inner product $w^\rightarrow \cdot v^\rightarrow$ is zero, Expression (73) can be deformed to the following form.

$$e(C_2, D^*) = g_T^{\tau \cdot \upsilon_0 \cdot \sigma \cdot 0} \cdot g_T^{\tau \cdot \upsilon_1} \tag{74}$$
$$= g_T^{\tau \cdot \upsilon_1}$$

From this result, the common key K is generated and output. An example of the common key K is $g_T^{\tau \cdot \upsilon 1} \in G_T$.

[Overall Structure]

Figure 15:
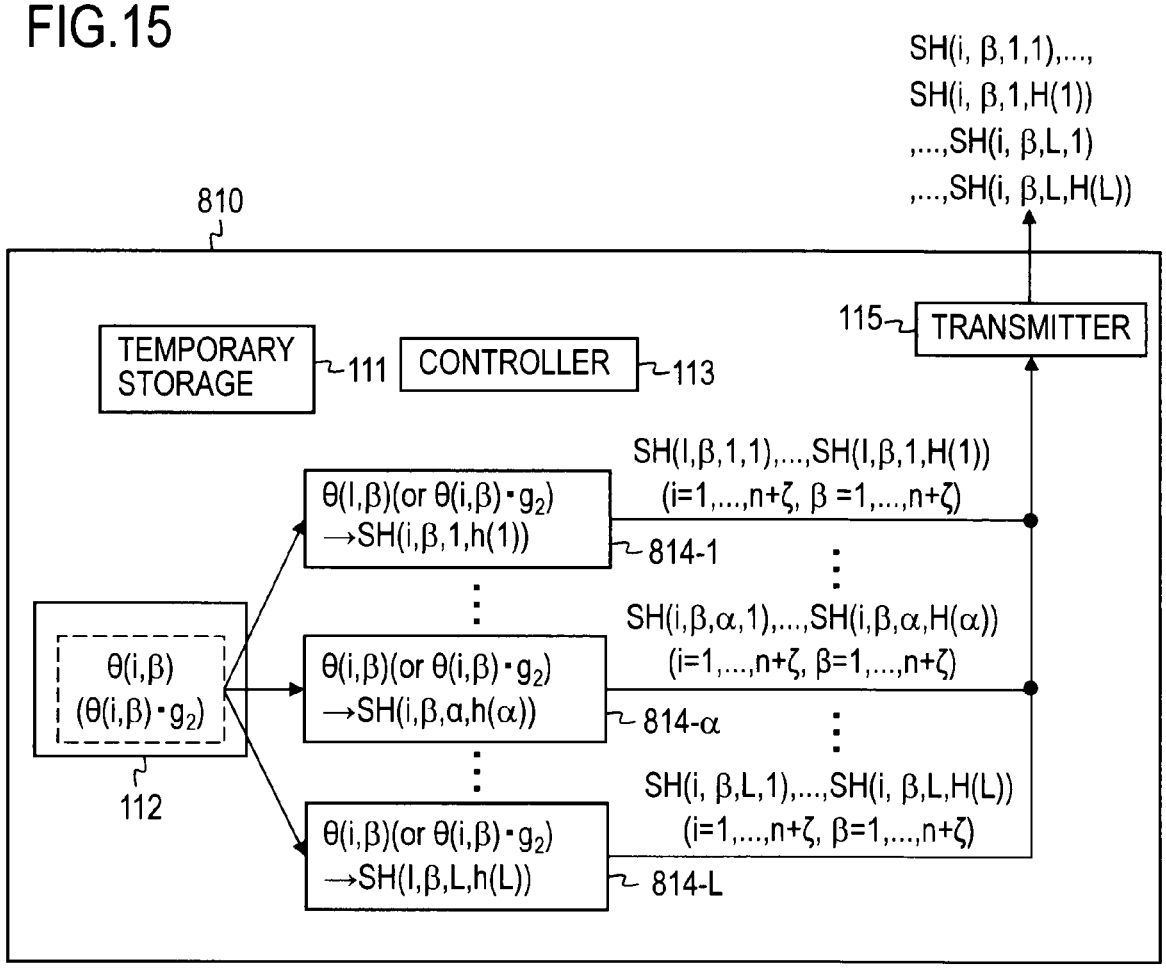
FIG. 15 is a block diagram illustrating the structure of a sharing apparatus according to a second embodiment.
Figure 16:
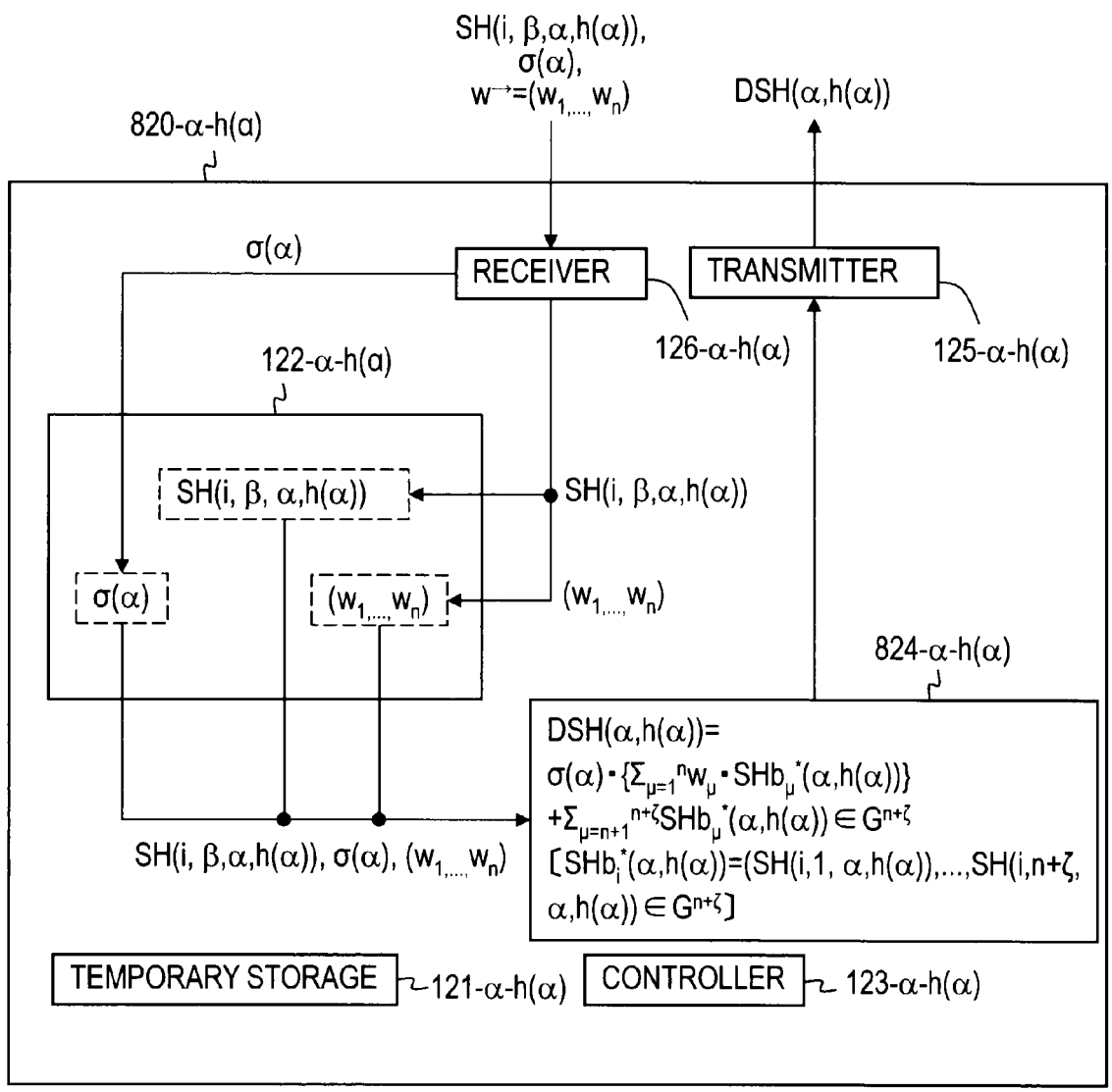
FIG. 16 is a block diagram illustrating the structure of a share management apparatus in the second embodiment.
Figure 17:
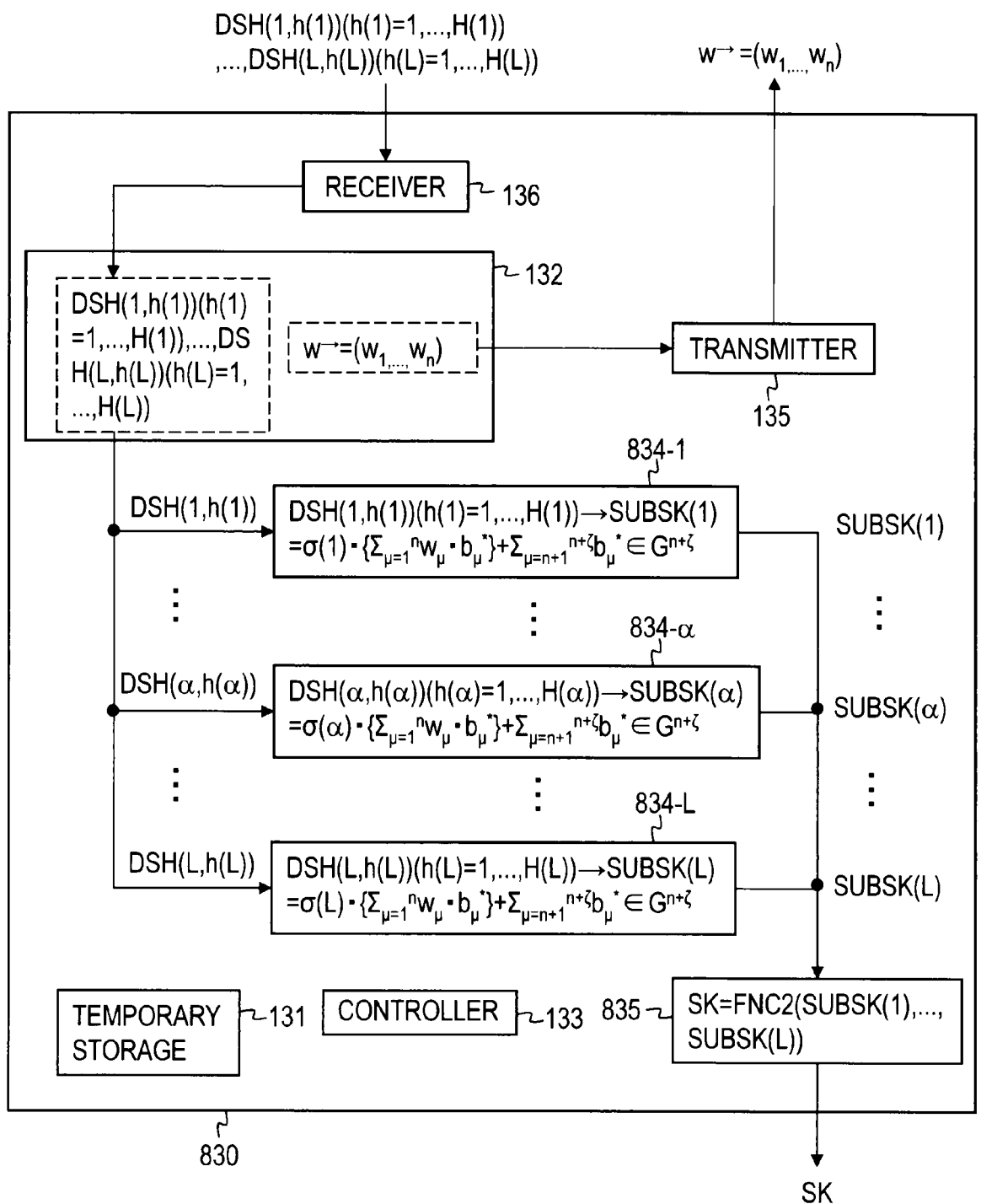
FIG. 17 is a block diagram illustrating the structure of an acquisition apparatus in the second embodiment.
Figure 18:
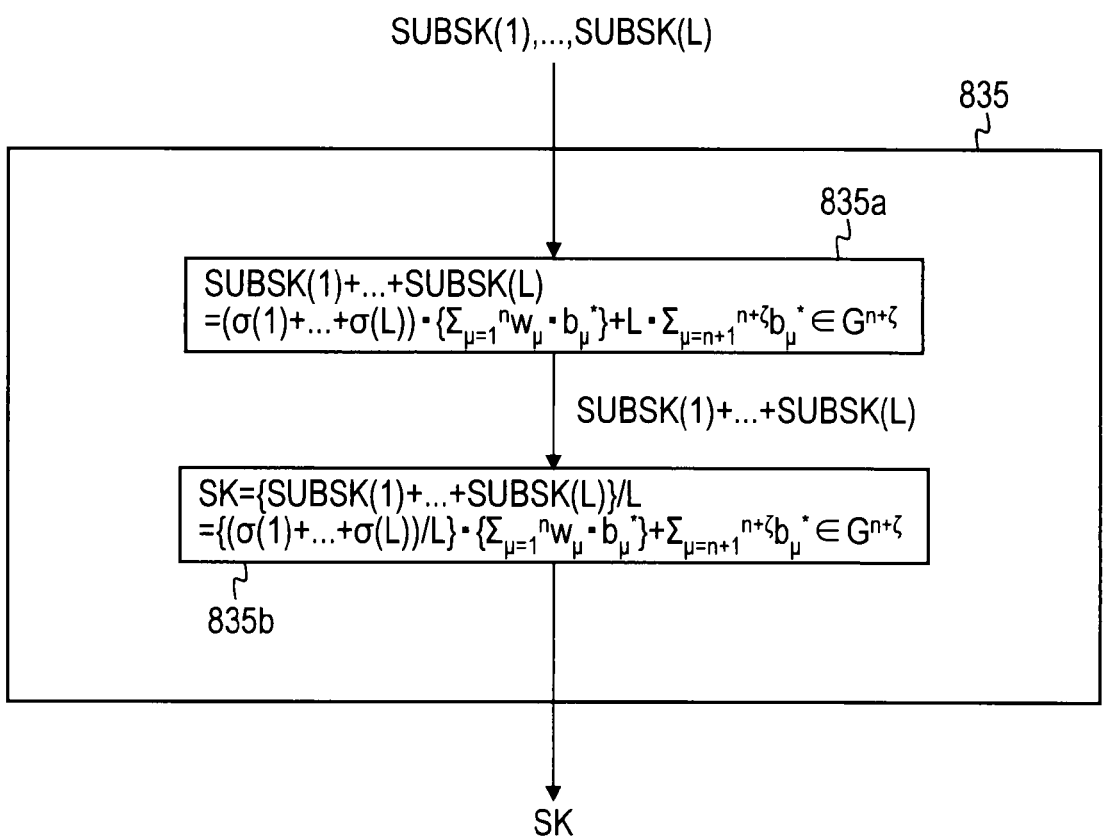
FIG. 18 is a block diagram illustrating the structure of a composition unit in FIG. 17.

FIG. 15 is a block diagram illustrating the structure of a sharing apparatus 810 according to the second embodiment. FIG. 16 is a block diagram illustrating the structure of share management apparatuses [PA(α, h(α))] 820-α-h(α) according to the second embodiment. FIG. 17 is a block diagram illustrating the structure of an acquisition apparatus 830 according to the second embodiment. FIG. 18 is a block diagram illustrating the structure of a composition unit 835 in FIG. 17. In those figures, components identical to those in the first embodiment are given the same reference numerals as in the first embodiment for the sake of simplicity.

A secret sharing system according to this embodiment is obtained by replacing the sharing apparatus 110 in FIG. 1 with the sharing apparatus 810, replacing the share management apparatuses [PA(α, h(α))] 120-α-h(α) with the share management apparatuses [PA(α, h(α))] 820-α-h(α), and replacing the acquisition apparatus 130 with the acquisition apparatus 830.

[Sharing Apparatus 810]

As shown in FIG. 15, the sharing apparatus 810 in this embodiment includes a temporary storage 111, a storage 112, a controller 113, secret sharing units 814-α (α=1 to L), and a transmitter 115. The sharing apparatus 810 in this embodiment is implemented by executing a predetermined program read into a known computer provided with a CPU, a RAM, a ROM, and the like, for example.

[Share Management Apparatuses [PA(α, h(α))] 820-α-h(α)]

As illustrated in FIG. 16, each of the share management apparatuses [PA(α, h(α))] 820-α-h(α) in this embodiment includes a temporary storage 121-α-h(α), a storage 122-α-h(α), a controller 123-α-h(α), a shared secret value generator 824-α-h(α), a transmitter 125-α-h(α), and a receiver 126-α-h(α). Each of the share management apparatus [PA(α, h(α))] 820-α-h(α) in this embodiment is implemented by executing a predetermined program read into a known computer provided with a CPU, a RAM, a ROM, and the like, for example.

[Common-Value Generator 140-α]

The common-value generator 140-α is the same as in the first embodiment.

[Acquisition Apparatus 830]

As illustrated in FIG. 17, the acquisition apparatus 830 in this embodiment includes a temporary storage 131, a storage 132, a controller 133, reconstruction units 834-α (α=1 to L), a composition unit 835, a transmitter 135, and a receiver 136. As shown in FIG. 18, the composition unit 835 includes a first operation unit 835a and a second operation unit 835b. The acquisition apparatus 830 in this embodiment is implemented by executing a predetermined program read into a known computer provided with a CPU, a RAM, a ROM, and the like, for example.

[Secret Sharing Processing]

The secret sharing processing in this embodiment will be described next.

This embodiment is an application of the first embodiment: A matrix B* (Expression (59)), which is the master key information MSK of the inner product predicate encryption, is shared with a secret sharing scheme, and the key information D*, as given by Expression (71), is reconstructed. In the description given below, the key information D* of Expression (71) is generalized to the generation information given by $$SK = \sigma(\alpha) \cdot \{\Sigma_{\mu=1}^{n} w_\mu \cdot b_\mu^*\} + \Sigma_{\mu=n+1}^{n+\zeta} b_\mu^* \in G^{n+\zeta} \qquad (75)$$

Expression (71) is an example when $\zeta=1$.

The elements $$\chi_{i,\beta} \cdot \eta_2 \cdot g_2 \in G_2 (i=1, \ldots, n+\zeta, \beta=1, \ldots, n+\zeta) \qquad (76)$$

of the matrix B* given by Expression (55) are expressed as $$\theta(i,\beta) \cdot g_2 \in G_2 \qquad (77)$$

$$\theta(i,\beta) = \chi_{i,\beta} \cdot \kappa_2 \in F_q \qquad (78)$$

When the basis vector $b_i^*$ of Expression (55) is expressed as $$b_i^* = (\theta(i,1) \cdot g_2, \ldots, \theta(i,n+\zeta) \cdot g_2) \in G_2^{n+\zeta} \qquad (79)$$

This indicates that secret sharing of the matrix B* and reconstruction of the generation information SK can be executed by extending the first embodiment or its modifications to multiple dimensions.

The difference from the first embodiment and its modifications will be described mainly below. Commonalities to them will not be described.

[Preparatory Processing]

In preparatory processing for the secret sharing processing in this embodiment, information $\theta(i, \beta) \in F_q$ for identifying secret information $\theta(i, \beta) \cdot g_2 \in G_2$ (i=1 to n+ζ, β=1 to n+ζ), each piece of which is an element of the basis vector $b_i^*$, is stored in the storage 112 of the sharing apparatus 810.

[Entire Secret Sharing Processing]

Figure 19:
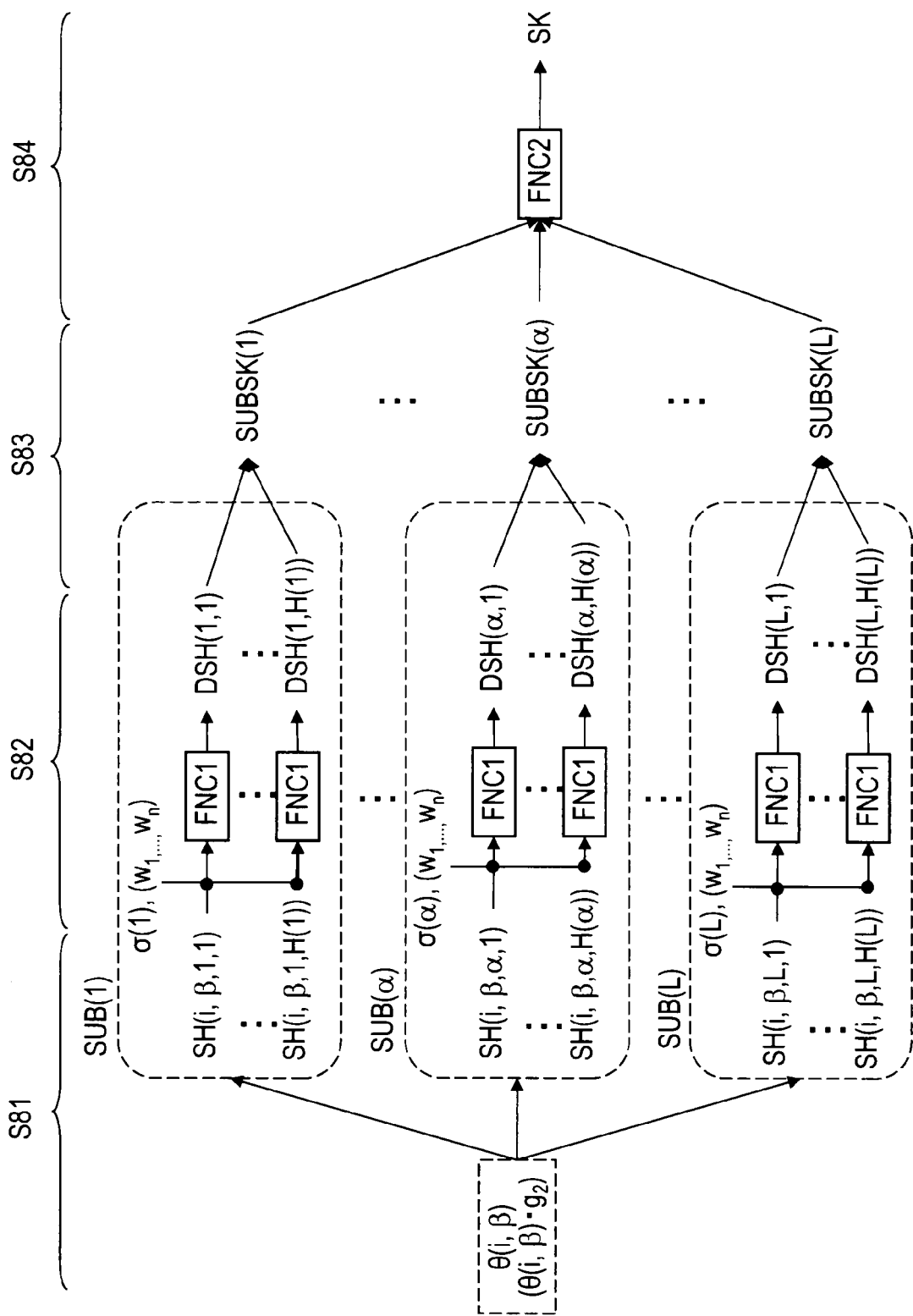
FIG. 19 is a view illustrating the entire secret sharing processing in the second embodiment.

FIG. 19 is a view illustrating the entire secret sharing processing in the second embodiment. The entire secret sharing processing in this embodiment will be described next with reference to FIG. 19.

In this embodiment, the sharing apparatus 810 (FIG. 15) generates shares SH(i, β, α, h(α)) by sharing secret information $\theta(i, \beta) \cdot g_2 \in G_2$, each piece of which is an element of the basis vector $b_i^*$, for each of the subsets SUB(α) separately and outputs the shares SH(i, β, α, h(α)) (step S81). The specific secret sharing scheme is the same as in the first embodiment. A set of shares SH(i, β, α, h(α))∈$G_2$ (i=1 to n+ζ, β=1 to n+ζ) is called a share SH(α, h(α)). Shares SH(α, h(α)) are sent through the network 150 to the corresponding share management apparatuses [PA(α, h((α))] 820-α-h(α).

Each of the share management apparatuses [PA(α, h((α))] 820-α-h(α) to which each of the shares SH(α, h((α)) was sent generates a shared secret value DSH(α, h(α)) by using the shares SH(i, β, α, h(α)) forming each of the shares SH(α, h(α)), a common value σ(α) used in each of the subsets SUB(α), and an n-dimensional vector $\vec{w} = (w_1, \ldots, w_n)$ having elements of a finite field $F_q$ as elements $w_\mu$ (μ=1 to n) (step S82). The shared secret value DSH(α, h(α)) in this embodiment is $$DSH(\alpha, h(\alpha)) = \qquad (81)$$

$$\sigma(\alpha) \cdot \left\{ \sum_{\mu=1}^{n} w_\mu \cdot SHb_\mu^*(\alpha, h(\alpha)) \right\} + \sum_{\mu=n+1}^{n+\zeta} SHb_\mu^*(\alpha, h(\alpha)) \in G^{n+\zeta}$$

where $SHb_i^*(\alpha, h(\alpha))$ is following (n+ζ) dimensional shared basis vector, which has (n+ζ) shares SH(i, 1, α, h(α)) to SH(i, n+ζ, α, h(α)) as elements.

$$SHb_i^*(\alpha, h(\alpha)) = (SH(i,1,\alpha,h(\alpha)), \ldots, SH(i,n+\zeta,\alpha,h(\alpha))) \in G^{n+\zeta} \qquad (80)$$

In this embodiment, the common values (σ(α)) of different subsets SUB(α) are independent of one another.

The shared secret values DSH(α, h(α)) output from the share management apparatuses [PA(α, h(α))] 820-α-h(α) are sent separately through the network 150 to the acquisition apparatus 830. By using the plurality of shared secret values DSH(α, h(α)) corresponding to the same subset SUB(α), the acquisition apparatus 830 generates a reconstructed secret value SUBSK(α) expressed as follows by reconstruction processing for each subset SUB(α) (step S83).

$$SUBSK(\alpha) = \sigma(\alpha) \cdot \{\Sigma_{\mu=1}^{n} w_\mu \cdot b_\mu^*\} + \Sigma_{\mu=n+1}^{n+\zeta} b_\mu^* \in G^{n+\zeta} \qquad (82)$$

This processing can be implemented by executing the reconstruction processing in the first embodiment or its modifications for each dimension p of the shared secret values DSH(α, h(α)).

The acquisition apparatus 830 then generates generation information SK by using the reconstructed secret values SUBSK(α) generated for the corresponding subsets SUB(α) and outputs the generation information SK (step S84).

In this embodiment, the acquisition apparatus 830 generates the generation information SK by performing a linear combination of the reconstructed secret values SUBSK(α). An example of the generation information is expressed as follows.

$$SK = \{(\sigma(1) + \ldots + \sigma(L))/L\} \cdot \left\{ \sum_{\mu=1}^{n} w_\mu \cdot b_\mu^* \right\} + \sum_{\mu=n+1}^{n+\zeta} b_\mu^* \in G^{n+\zeta} \qquad (83)$$

[Processing (in Step S81) in Sharing Apparatus]

Figure 20:
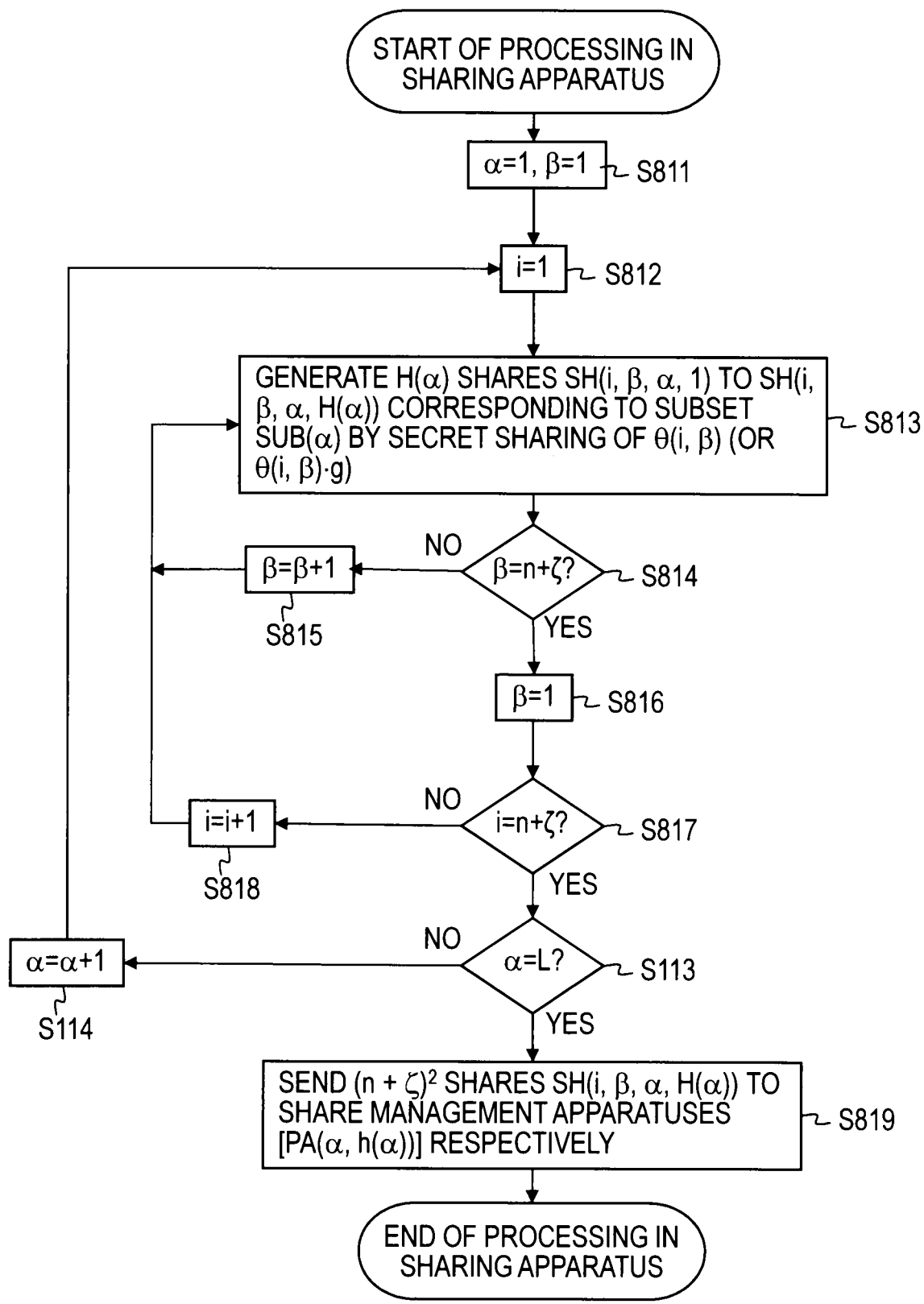
FIG. 20 is a view illustrating an example of processing in the sharing apparatus in the second embodiment.

FIG. 20 is a view illustrating an example of processing in the sharing apparatus in the second embodiment. The processing in the sharing apparatus 810 will be described next in detail with reference to this figure.

The controller 113 of the sharing apparatus 810 (FIG. 15) specifies α=1 and β=1 and stores the settings in the temporary storage 111 (step S811). The controller 113 of the sharing apparatus 810 then specifies i=1 and stores the setting in the temporary storage 111 (step S812).

The information $\theta(i, \beta) \in F_q$ for identifying the secret information $\theta(i, \beta) \cdot g_2 \in G_2$ (i=1 to n+ζ, β=1 to n+ζ) is read from the storage 112 and input to the secret sharing unit 814-α. The secret sharing unit 814-α generates H(α) shares $$SH(i,\beta,\alpha,1), \ldots, SH(i,\beta,\alpha,H(\alpha)) \qquad (84)$$

for a subset SUB(α) by sharing the secret information $\theta(i, \beta) \cdot g_2$ by using the information $\theta(i, \beta) \in F_q$ and outputs them (step S813). This processing can be executed by the same method as in step S112 of the first embodiment or its modifications.

The controller 113 then judges whether β stored in the temporary storage 111 is n+ζ (step S814). If it is not judged that β=n+ζ, the controller 113 specifies β+1 as a new value of β, stores the setting in the temporary storage 111 (step S815), and causes the processing of step S813 to be executed with this new value of β.

If it is judged in step S814 that β=n+ζ, the controller 113 specifies β=1 and stores the setting in the temporary storage 111 (step S816). Then, the controller 113 judges whether i stored in the temporary storage 111 is n+ζ (step S817). If it is not judged that i=n+ζ, the controller 113 specifies i+1 as a new value of i, stores the setting in the temporary storage 111 (step S818), and causes the processing of step S813 to be executed with the new value of i.

If it is judged in step S817 that i=n+ζ, the controller 113 judges whether α stored in the temporary storage 111 is L (step S113). If it is not judged that α=L, the controller 113 specifies α+1 as a new value of α, stores the setting in the temporary storage 111 (step S114), and causes the processing of step S812 to be executed with the new value of α.

If it is judged in step S113 that α=L, the shares SH(α, h(α)) output from the secret sharing units 814-α are sent to the transmitter 115. The transmitter 115 sends sets of $(n+\zeta)^2$ shares $$SH(i,\beta,\alpha,h(\alpha))(i=1,\ldots,n+\zeta,\beta=1,\ldots,n+\zeta) \tag{85}$$

to the corresponding share management apparatuses [PA(α, h(α))] 820-α-h(α) through the network 150 (step S819). The share SH(1, 1) formed of $(n+\zeta)^2$ shares SH(i, β, 1, 1) (i=1 to n+ζ, β=1 to n+ζ) is sent to the share management apparatus [PA(1, 1)] 820-1-1; the share SH(1, 2) formed of $(n+\zeta)^2$ shares SH(i, β, 1, 2) (i=1 to n+ζ, β=1 to n+ζ) is sent to the share management apparatus [PA(1, 2)] 820-1-2; . . . ; and the share SH(L, H(L)) formed of $(n+\zeta)^2$ shares SH(i, β, L, H(L)) (i=1 to n+ζ, β=1 to n+ζ) is sent to the share management apparatus [PA(L, H(L))] 820-L-H(L).

[Processing in Common-value Generator]

Each of the common-value generators 140-α (FIG. 3B) generates a common value σ(α) to be shared by the share management apparatuses [PA(α, h(α))] 820-α-h(α) included in the subset SUB(α) corresponding to the common-value generator 140-α. In this embodiment, a random number generated by the random number generator 141-α is used as the common value σ(α), and the transmitter 142-α sends the common value σ(α) to the share management apparatuses [PA(α, h(α))] 820-α-h(α) included in the subset SUB(α).

[Processing (in Step S82) of Share Management Apparatuses]

Figure 21:
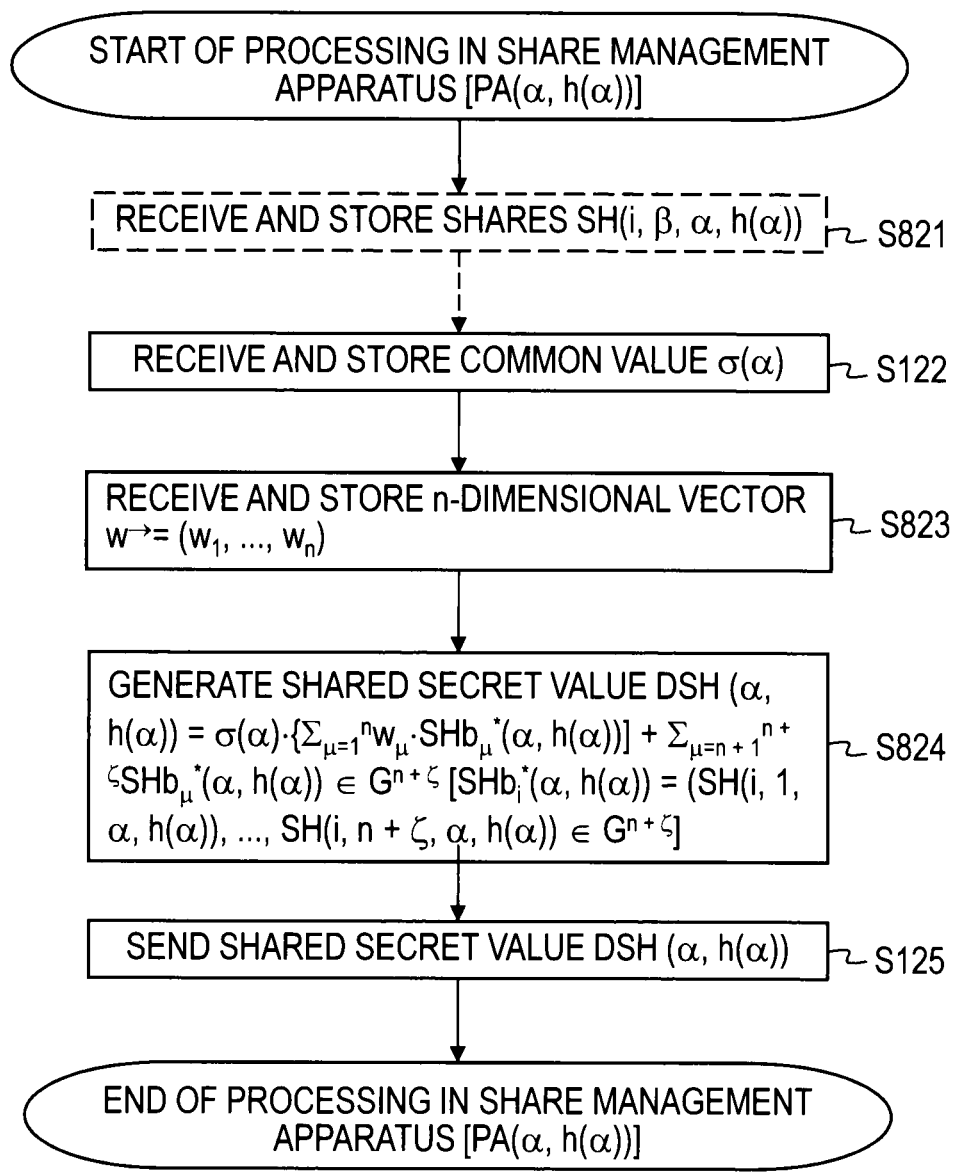
FIG. 21 is a view illustrating an example of processing in the share management apparatus in the second embodiment.

FIG. 21 is a view illustrating an example of processing in the share management apparatuses [PA(α, h(α))] 820-α-h(α) in the second embodiment. The processing in the share management apparatuses [PA(α, h(α))] 820-α-h(α) in this embodiment will be described next with reference to this figure.

Each of the receivers 126-α-h(α) of the share management apparatuses [PA(α, h(α))] 820-α-h(α) (FIG. 16) receives the share SH(α, h(α)) formed of the sent $(n+\zeta)^2$ shares SH(i, β, α, h(α)) (i=1 to n+ζ, β=1 to n+ζ) and stores it in the storage 122-α-h(α) (step S821). If the processing in step S821 was executed before and if the share SH(α, h(α)) has already been stored in the storage 122-α-h(α) of the share management apparatus [PA(α, h(α))] 820-α-h(α), the processing of step S821 may be omitted.

Each of the receivers 126-α-h(α) of the share management apparatuses [PA(α, h(α))] 820-α-h(α) receives each of the common values σ(α) sent from the common-value generators 140-α and stores it in each of the storages 122-α-h(α) (step S122).

In this embodiment, an n-dimensional vector $\vec{w}=(w_1,\ldots,w_n)$, which is the provided information read from the storage 132 of the acquisition apparatus 830 (FIG. 17), is sent from the transmitter 135 through the network 150 to the share management apparatuses [PA(α, h(α))] 820-α-h(α). The n-dimensional vector $\vec{w}=(w_1,\ldots,w_n)$ is common to all the share management apparatuses [PA(α, h(α))] 820-α-h(α). The n-dimensional vector $\vec{w}=(w_1,\ldots,w_n)$ is received by each of the receivers 126-α-h(α) of the share management apparatuses [PA(α, h(α))] 820-α-h(α) (FIG. 16) and is stored in each of the storages 122-α-h(α) (step S823).

Each of the shared secret value generators 824-α-h(α) reads the share SH(α, h(α)), the common value σ(α), and the n-dimensional vector $\vec{w}=(w_1,\ldots,w_n)$ from each of the storages 122-α-h(α). Each of the shared secret value generators 824-α-h(α) generates a shared secret value DSH(α, h(α)) given by Expression (81), by using the share SH(α, h(α)) and common information containing the common value σ(α) and $\vec{w}=(w_1 \text{ to } w_n)$, and outputs the shared secret value DSH(α, h(α)) (step S824).

Each of the generated shared secret values DSH(α, h(α)) is sent to each of the transmitters 125-α-h(α). The transmitters 125-α-h(α) sends the shared secret values DSH(α, h(α)) through the network 150 to the acquisition apparatus 830 (step S125).

[Processing (in Steps S83 and S84) in Acquisition Apparatus]

Figure 22:
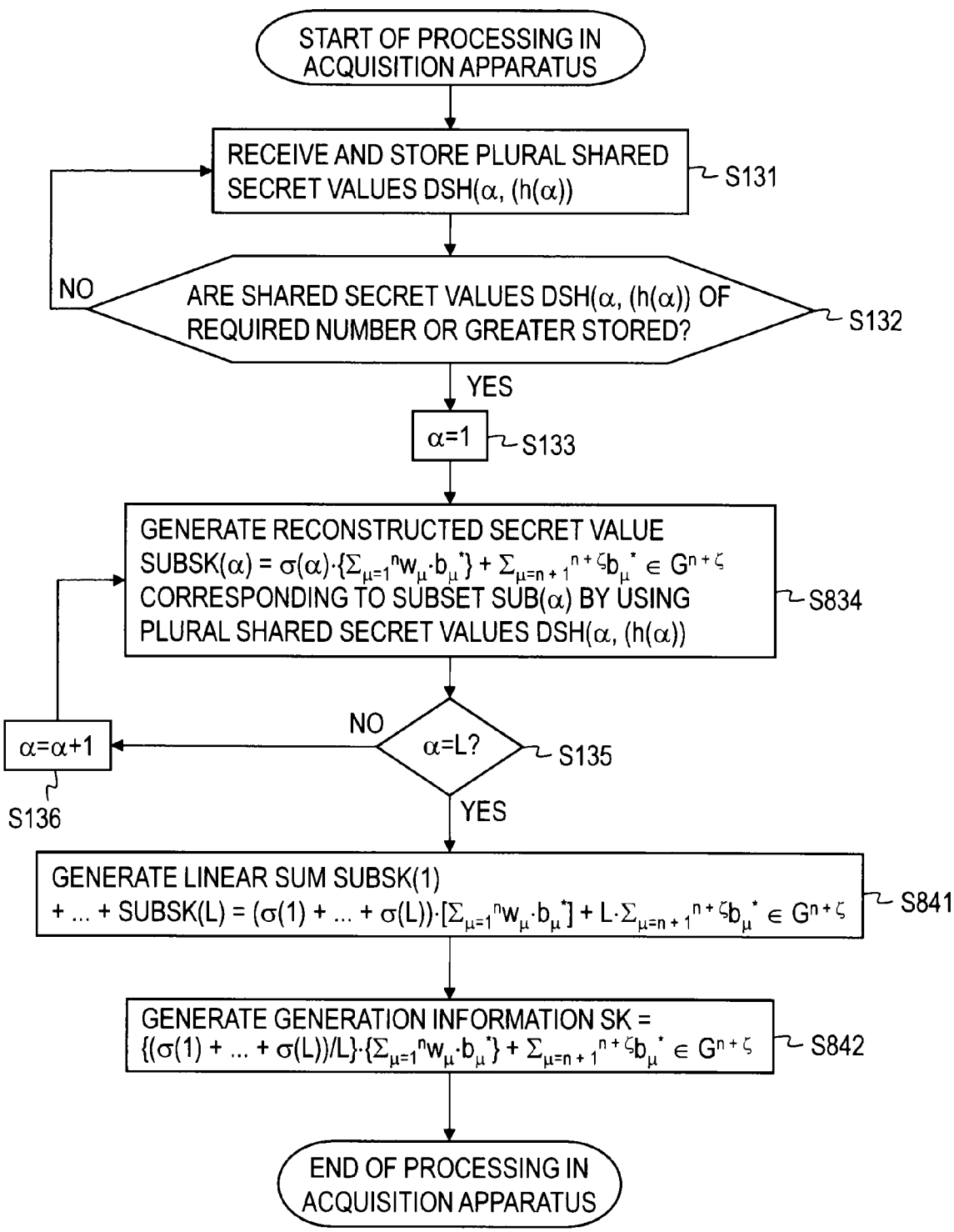
FIG. 22 is a view illustrating an example of processing in the acquisition apparatus in the second embodiment.

FIG. 22 is a view illustrating an example of processing in the acquisition apparatus in the second embodiment.

The shared secret values DSH(α, h(α)) sent from the share management apparatuses [PA(α, h(α))] 820-α-h(α) are received by the receiver 136 of the acquisition apparatus 830 (FIG. 17) and are stored in the storage 132 (step S131).

Then, the controller 133 judges whether the number of shared secret values DSH(α, h(α)) stored in the storage 132 is greater than or equal to a required number (step S132). If it is not judged here that the shared secret values DSH(α, h(α)) of the require number or greater are stored in the storage 132, the processing returns to step S131.

If is judged that the number of shared secret values DSH(α, h(α)) stored in the storage 132 is greater than or equal to the required number, the controller 133 specifies α=1 and stores the setting in the temporary storage 131 (step S133). Then, the required number of shared secret values DSH(α, h(α)) corresponding to the subset SUB(α) are read from the storage 132 and input to the reconstruction unit 834-α. The reconstruction unit 834-α generates a reconstructed secret value SUBSK(α) given by Expression (82), by the reconstruction processing for the subset SUB(α), by using the input shared secret values DSH(α, h(α)), and outputs the reconstructed secret value SUBSK(α) of the subset SUB(α) (step S834).

The controller 133 next judges whether a stored in the temporary storage 131 is L (step S135). If it is not judged here that a=L, the controller 133 specifies α+1 as a new value of α, stores the setting in the temporary storage 131 (step S136), and causes the processing in step S834 to be executed with the new value of α.

If it is judged in step S135 that α=L, the reconstructed secret values SUBSK(α) output from the corresponding reconstruction units 134-α are sent to the composition unit 835. The first operation unit 835a (FIG. 18) of the composition unit 835 generates the following linear combination and outputs it (step S841).

$$SUBSK(1) + \ldots + SUBSK(L) = \tag{86}$$
$$(\sigma(1) + \ldots + \sigma(L)) \cdot \left\{ \sum_{\mu=1}^{n} w_\mu \cdot b_\mu^* \right\} + L \cdot \sum_{\mu=n+1}^{n+\zeta} b_\mu^* \in G^{n+\zeta}$$

The linear combination SUBSK(1)+ . . . +SUBSK(L) is input to the second operation unit 835b. The second operation unit 835b generates the following generation information and outputs the generation information SK (step S842).

$$SK = \{(\sigma(1) + \ldots + \sigma(L))/L\} \cdot \left\{ \sum_{\mu=1}^{n} w_\mu \cdot b_\mu^* \right\} + \sum_{\mu=n+1}^{n+\zeta} b_\mu^* \in G^{n+\zeta} \quad (87)$$

[Modification of Second Embodiment]

The modifications of the first embodiment can be applied to this embodiment, too.

[Other Modifications and Others]

The present invention is not limited to the embodiments described above. For example, each operation defined on the finite field $F_q$ may be replaced with an operation defined on a finite ring $Z_q$ whose order is q. A method of replacing the operation defined on the finite field $F_q$ with the operation defined on the finite ring $Z_q$ is to permit q other than prime numbers or their powers.

Instead of Expression (71), the following Expression may be used:

$$D^* = \sigma \cdot (\Sigma_{\mu=1}^{n} w \cdot b_\mu^*) + \Sigma_{\iota=n+1}^{n+\zeta} \upsilon_\iota \cdot b_\iota^* \in G_2^{n+\zeta}$$

where $\upsilon_\iota$ is a constant or a variable (such as a random number). The processing described above may be executed in the order in which it is described here or may be executed in parallel or independently, in accordance with the processing capabilities of the units that execute the processing or as needed. Other modifications are possible within the scope of the present invention.

When the above described structure is implemented by a computer, the processing details of the functions that should be provided by each apparatus are described in a program. When the program is executed by a computer, the processing functions described above are implemented on the computer.

The program containing the processing details can be recorded in a computer-readable storage medium. The computer-readable storage medium can be any type of medium, such as a magnetic storage device, an optical disc, a magneto-optical storage medium, and a semiconductor memory.

The program is distributed by selling, transferring, or lending a portable recording medium such as a DVD or a CD-ROM with the program recorded on it, for example. The program may also be distributed by storing the program in a storage unit of a server computer and transferring the program from the server computer to another computer through the network.

A computer that executes this type of program first stores the program recorded on the portable recording medium or the program transferred from the server computer in its storage unit. Then, the computer reads the program stored in its storage unit and executes processing in accordance with the read program. In a different program execution form, the computer may read the program directly from the portable recording medium and execute processing in accordance with the program, or the computer may execute processing in accordance with the program each time the computer receives the program transferred from the server computer. Alternatively, the processing may be executed by a so-called application service provider (ASP) service, in which the processing function is implemented just by giving a program execution instruction and obtaining the results without transferring the program from the server computer to the computer. The program of this embodiment includes information that is provided for use in processing by a computer and is treated correspondingly as a program (something that is not a direct instruction to the computer but is data or the like that has characteristics that determine the processing executed by the computer).

In this embodiment, the apparatuses are implemented by executing the predetermined program on the computer, but at least a part of the processing may be implemented by hardware.

Description Of Reference Numerals

| | |
|---|---|
| 1: | Secret sharing system |
| 110, 810: | Sharing apparatuses |
| 120, 820: | Share management apparatuses |
| 130, 830: | Acquisition apparatuses |
| 140: | Common-value generator |

What is claimed is:

1. A secret sharing system comprising:
a sharing apparatus;
$\Sigma_{\alpha=1}^{L} h(\alpha)$ share management apparatuses PA($\alpha$, h($\alpha$)) where $\alpha=1, \ldots, L, L \geq 2, h(\alpha)=1, \ldots, H(\alpha), H(\alpha) \geq 2$; and
an acquisition apparatus; wherein
the sharing apparatus includes secret sharing units adapted to generate shares SH($\alpha$, h($\alpha$)) by secret sharing of secret information with a secret sharing scheme separately for respective subsets SUB($\alpha$) each of which is formed of H($\alpha$) share management apparatuses PA($\alpha$, 1), ..., PA($\alpha$, H($\alpha$)), and to output the shares SH($\alpha$, h($\alpha$));
the share management apparatuses PA($\alpha$, h($\alpha$)) include shared secret value generators adapted to generate shared secret values DSH($\alpha$, h($\alpha$)) and to output the shared secret values DSH($\alpha$, h($\alpha$)) respectively, each of the shared secret values DSH($\alpha$, h($\alpha$)) being generated by performing a common operation to one of the shares SH($\alpha$, h($\alpha$)) and common information containing one of common values $\sigma(\alpha)$, each of the common values $\sigma(\alpha)$ being shared in each of the subsets SUB($\alpha$), the common information used by the share management apparatuses PA($\alpha$, h($\alpha$)) belonging to same one of subsets SUB($\alpha$) being the same, and the share management apparatuses PA($\alpha$, h($\alpha$)) belonging to the same one of subsets SUB ($\alpha$) performing the same common operation;
the acquisition apparatus includes:
reconstruction units adapted to generate reconstructed secret values SUBSK($\alpha$) corresponding to the subsets SUB($\alpha$) respectively, each of the reconstructed secret values SUBSK($\alpha$) being generated by performing reconstruction processing with the secret sharing scheme for each of the subsets SUB($\alpha$), using a plurality of the shared secret values DSH($\alpha$, h($\alpha$)) corresponding to the same one of the subsets SUB($\alpha$); and
a composition unit adapted to generate generation information SK by using the reconstructed secret values SUBSK($\alpha$) and to output the generation information SK.

2. The secret sharing system according to claim 1, wherein the common values $\sigma(\alpha)$ shared in different subsets SUB($\alpha$) are independent of one another.

3. The secret sharing system according to claim 1 or 2, wherein the shared secret value generators of the share management apparatuses PA($\alpha$, h($\alpha$)), where $\alpha=1, \ldots, L$, perform the same common operation.

4. The secret sharing system according to claim 3, wherein the common operation is linear; and the composition unit is adapted to generate the generation information SK by performing a linear combination of the reconstructed secret values SUBSK($\alpha$).

5. The secret sharing system according to claim 1, wherein the common information contains the one of the common values $\sigma(\alpha)$ and provided information common to all the share management apparatuses PA($\alpha$, h($\alpha$)), provided by the acquisition apparatus.

6. The secret sharing system according to claim 1, wherein the composition unit is adapted to generate the generation information SK by performing a linear combination of the reconstructed secret values SUBSK($\alpha$).

7. The secret sharing system according to claim 1, wherein the common operation is linear.

8. The secret sharing system according to claim 1, wherein each of the secret sharing units is adapted to generate the shares SH($\alpha$, h($\alpha$)) by secret sharing of the secret information by using an (R($\alpha$), H($\alpha$)) threshold secret sharing scheme, where $2 \leq R(\alpha) < H(\alpha)$, with respect to at least a part of the subsets SUB($\alpha$); and the reconstruction units are adapted to generate the reconstructed secret values SUBSK($\alpha$) corresponding to the subsets SUB($\alpha$) respectively, each of the reconstructed secret values SUBSK($\alpha$) being generated by using R($\alpha$) or more shared secret values DSH($\alpha$, h($\alpha$)) corresponding to the same one of the subsets SUB($\alpha$).

9. The secret sharing system according to claim 8, wherein the secret information contains an element $\theta \cdot g \in G$ of a cyclic group G, where g is a generator of the cyclic group G, and $\theta$ is an element of a finite field $F_q$;

the element $\theta \in F_q$ identifies the secret information; and each of the shares SH($\alpha$, h($\alpha$)) generated by using the (R($\alpha$), H($\alpha$)) threshold secret sharing scheme includes an element $f(\alpha, \phi(h(\alpha))) \cdot g \in G$ of the cyclic group G, where x represents a variable which is an element of the finite field $F_q$, $f(\alpha, x) \in F_q$ represents an (R($\alpha$) −1)-th degree polynomial satisfying $f(\alpha, \omega)=\theta$ with respect to a predetermined element $\omega \in F_q$ of the finite field $F_q$, and $\phi)(h(\alpha))$ represents an index corresponding to h($\alpha$).

10. The secret sharing system according to claim 8, wherein the secret information contains an element $\theta$ of a finite field $F_q$; and each of the shares SH($\alpha$, h($\alpha$)) generated by using the (R($\alpha$), H($\alpha$)) threshold secret sharing scheme includes an element $f(\alpha, \phi(h(\alpha))) \in F_q$ of the finite field $F_q$, where x represents a variable which is an element of the finite field $F_q$, $f(\alpha, x) \in F_q$ represents an (R($\alpha$) −1)-th degree polynomial satisfying $f(\alpha, \omega)=\theta$ with respect to a predetermined element $\omega \in F_q$ of the finite field $F_q$, and $\phi(h(\alpha))$ represents an index corresponding to h($\alpha$).

11. The secret sharing system according to claim 1, wherein each of the secret sharing units is adapted to generate the shares SH($\alpha$, h($\alpha$)) of the secret information by using an (H($\alpha$), H($\alpha$)) threshold secret sharing scheme with respect to at least a part of the subsets SUB($\alpha$); and the reconstruction units are adapted to generate the reconstructed secret values SUBSK($\alpha$) corresponding to the subsets SUB($\alpha$) respectively, each of the reconstructed secret values SUBSK($\alpha$) being generated by using H($\alpha$) shared secret values DSH($\alpha$, h($\alpha$)) corresponding to the same one of the subsets SUB($\alpha$).

12. The secret sharing system according to claim 11, wherein the secret information contains an element $\theta \cdot g \in G$ of a cyclic group G, where g is a generator of the cyclic group G and, $\theta$ is an element of a finite field $F_q$; and the shares SH($\alpha$, h($\alpha$)) generated by using the (H($\alpha$), H($\alpha$)) threshold secret sharing scheme are elements of the cyclic group G, satisfying SH($\alpha$, 1) +SH($\alpha$, 2)+ . . . +SH($\alpha$, H($\alpha$))=$\theta \cdot g \in G$.

13. The secret sharing system according to claim 11, wherein the secret information contains an element $\theta$ of a finite field $F_q$; and the shares SH($\alpha$, h($\alpha$)) generated by using the (H($\alpha$), H($\alpha$)) threshold secret sharing scheme are elements of the finite field $F_q$, satisfying SH($\alpha$,1) +SH($\alpha$,2)+ . . . +SH($\alpha$, H($\alpha$)) =$\theta \in F_q$.

14. The secret sharing system according to any one of claims 5 to 13, wherein the secret information is a set of basis vectors $b_i^*$ that are $b_1^*, \ldots, b_{n+\zeta}^*$, where g is a generator of a cyclic group G, $\theta(i, \beta)$ is an element of a finite field $F_q$, $i=1, \ldots, n+\zeta, \beta=1, \ldots, n+\zeta, n \geq 1, \zeta \geq 1$, and $b_i^* = (\theta(i, 1) \cdot g, \ldots, \theta(i, n+\zeta) \cdot g) \in G^{n+\zeta}$ is an (n +$\zeta$)-dimensional basis vector having (n +$\zeta$) elements of the cyclic group G as elements;

each of the secret sharing units is adapted to generate shares SH(i,$\beta$, $\alpha$, h($\alpha$))$\in$G by secret sharing of the elements $\theta(i, \beta) \cdot g \in G$ of the basis vectors $b_i^*$ separately for respective subsets SUB($\alpha$), and each of the shares SH($\alpha$, h($\alpha$)) is a set of the shares SH(i, $\beta$,$\alpha$, h($\alpha$))$\in$G where $i=1, \ldots, n+\zeta, \beta=1, \ldots, n+\zeta$;

an n-dimensional vector $\vec{w}=(w_1, \ldots, w_n)$ having elements of the finite field $F_q$ as elements $w_\mu$, where $\mu=1, \ldots, n$, is provided;

each of the shared secret value generators generates each of the shared secret values DSH($\alpha$, h($\alpha$)) by using the shares SH(i, $\beta$, $\alpha$, h($\alpha$)) where $i=1, \ldots, n+\zeta, \beta=1, \ldots, n+\beta$, the one of the common values $\sigma(\alpha)$, and the n-dimensional vector $\vec{w}$, and each of the shared secret values DSH($\alpha$, h($\alpha$)) is DSH($\alpha$, h($\alpha$))= $\sigma(\alpha) \cdot \{\Sigma_{\mu=1}^{n} w_\mu \cdot SHb_\mu^*(\alpha, h(\alpha))\}+\Sigma_{\mu=n+1}^{n+\zeta} SHb_\mu^*(\alpha, h(\alpha))\in G^{n+\zeta}$ with respect to an (n+$\zeta$)-dimensional share basis vector $SHb_i^*(\alpha, h(\alpha))=SH(i, 1, \alpha, h(\alpha)), \ldots, SH(i, n+\zeta, \alpha, h(\alpha)))\in G^{n+\zeta}$ formed of (n+$\zeta$) shares SH(i, 1, $\alpha$, h($\alpha$)), . . . , SH(i, n+$\zeta$, $\alpha$, h($\alpha$)); and each of the reconstructed secret values SUBSK($\alpha$) is SUBSK($\alpha$)=$\sigma(\alpha) \cdot \{\Sigma_{\mu=1}^{n} w_\mu \cdot b_\mu^*\}+\Sigma_{\mu=n+1}^{n+\zeta} b_\mu^* \in G^{n+\zeta}$.

15. The secret sharing system according to claim 14, wherein the composition unit is adapted to calculate the generation information SK=$\{(\sigma(1)+ \ldots +\sigma(L))/L\} \cdot \{\Sigma_{\mu=1}^{n} w_\mu \cdot b_\mu^*\}+\Sigma_{\mu=n+1}^{n+\zeta} b_\mu^*$.

16. A share management apparatus comprising:

a shared secret value generator adapted to generate a shared secret value DSH($\alpha$, h($\alpha$)) by performing a common operation to one of the shares SH($\alpha$, h($\alpha$)) obtained by secret sharing of secret information separately for each of subsets SUB($\alpha$) and common information containing one of common values $\sigma(\alpha)$, each of the common values $\sigma(\alpha)$ being shared in each of the subsets SUB($\alpha$), each of the subsets SUB($\alpha$) being formed of H($\alpha$) share management apparatuses PA($\alpha$, 1), . . . , PA($\alpha$, H($\alpha$)), and to output the shared secret value DSH($\alpha$, h($\alpha$)), where $\alpha=1, \ldots, L, L \geq 2, h(\alpha)=1, \ldots, H(\alpha), H(\alpha) \geq 2$;

the common information is shared with the share management apparatuses PA($\alpha$, h($\alpha$)) belonging to same one of the subsets SUB($\alpha$); and the common operation is performed by the share management apparatuses PA($\alpha$, h($\alpha$)) belonging to the same one of the subsets SUB($\alpha$).

17. The share management apparatus according to claim 16, wherein the common values $\sigma(\alpha)$ shared in different subsets SUB($\alpha$) are independent of one another.

18. The share management apparatus according to one of claims 16 and 17, wherein the common operation is performed by all shared secret value generators of the share management apparatuses PA($\alpha$, h($\alpha$)) where $\alpha=1, \ldots, L$.

19. The share management apparatus according to claim 16, wherein the common information contains the one of the common values $\sigma(\alpha)$ and provided information common to all the share management apparatuses PA($\alpha$, h($\alpha$)), provided by an acquisition apparatus.

20. The share management apparatus according to claim 19, wherein the provided information is an n-dimensional vector $\vec{w}=(w_1, \ldots, w_n)$ having elements of a finite field $F_q$ as elements $w_\mu$ ($\mu=1, \ldots, n$); and the shared secret value generator generates the shared secret value DSH($\alpha$, h($\alpha$)) by using the shares SH(i, $\beta$, $\alpha$, h($\alpha$)), the one of the common values $\sigma(\alpha)$, and the n-dimensional vector $\vec{w}$; and the shared secret value DSH($\alpha$, h($\alpha$)) is DSH($\alpha$, h($\alpha$))=$\sigma(\alpha) \cdot \{\Sigma_{\mu=1}^{n} w_\mu \cdot SHb_\mu^*(\alpha, h(\alpha))\} + \Sigma_{\mu=n+1}^{n+\zeta} SHb_\mu^*(\alpha, h(\alpha)) \in G^{n+\zeta}$ with respect to an $(n+\zeta)$-dimensional share basis vector $SHb_i^*(\alpha, h(\alpha))=(SH(i, 1, \alpha, h(\alpha)), \ldots, SH(i, n+\zeta, \alpha, h(\alpha))) \in G^{n+\zeta}$ formed of $(n+\zeta)$ shares SH(i, 1, $\alpha$, h($\alpha$)), ..., SH(i, n+$\zeta$, $\alpha$, h($\alpha$)) where $\zeta \geq 1$.

21. An acquisition apparatus comprising:
reconstruction units adapted to generate reconstructed secret values SUBSK($\alpha$) corresponding to subsets SUB($\alpha$) respectively, each of the subsets SUB($\alpha$) being formed of H($\alpha$) share management apparatuses PA($\alpha$, 1), ..., (PA($\alpha$, H($\alpha$)), each of the reconstructed secret values SUBSK($\alpha$) being generated by reconstruction processing with a secret sharing scheme for each of the subsets SUB($\alpha$) using a plurality of shared secret values DSH($\alpha$, h($\alpha$)) corresponding to same one of the subsets SUB($\alpha$), $\alpha=1, \ldots, L$, $L \geq 2$, h($\alpha$)=1, ..., H($\alpha$), H($\alpha$)$\geq 2$;
a composition unit adapted to generate generation information SK by using the reconstructed secret values SUBSK($\alpha$) and to output the generation information SK; and
an output unit for outputting an n-dimensional vector $\vec{w}=(w_1, \ldots, w_n)$ having elements of a finite field $F_q$ as elements $w_\mu$ where $\mu=1, \ldots, n$; wherein
each of the reconstructed secret values SUBSK(($\alpha$) is SUBSK($\alpha$)=$\sigma(\alpha) \cdot \{\Sigma_{\mu=1}^{n} w_\mu \cdot b_\mu^*\} + \Sigma_{\mu=n+1}^{n+\zeta} b_\mu^* \in G^{n+\zeta}$, where $\sigma(\alpha)$ is a common value shared in each of the subsets SUB($\alpha$), g is a generator of a cyclic group G, $\theta$(i, $\beta$) is an element of the finite field $F_q$, i=1, ..., n+$\zeta$, $\beta=1, \ldots, n+\zeta$, n$\geq 1$, $\zeta \geq 1$, and $b_i^*=(\theta(i, 1) \cdot g, \ldots, \theta(i, n+\zeta) \cdot g) \in G^{n+\zeta}$ is an $(n+\zeta)$-dimensional basis vector having $(n+\zeta)$ elements of the cyclic group G as elements.

22. The acquisition apparatus according to claim 21, wherein the composition unit is adapted to calculate the generation information SK=$\{(\sigma(1)+ \ldots +\sigma(L))/L\} \cdot \{\Sigma_{\mu=1}^{n} w_\mu \cdot b_\mu^*\} + \Sigma_{\mu=n+1}^{n+\zeta} b_\mu^*$.

23. A secret sharing method comprising the steps of:
(a) generating, in a sharing apparatus, shares SH($\alpha$, h($\alpha$)) by secret sharing of secret information separately for respective subsets SUB($\alpha$), where $\alpha=1, \ldots, L$, $L\geq 2$, each of the subsets SUB($\alpha$) being formed of H($\alpha$) share Management apparatuses PA($\alpha$, 1), ..., PA($\alpha$, H($\alpha$)) belonging to a set formed of $\Sigma_{\alpha=1}^{L} h(\alpha)$ share management apparatuses PA($\alpha$, h($\alpha$)), where h($\alpha$)=1, ..., H($\alpha$), H($\alpha$)$\geq 2$, and outputting the shares SH($\alpha$, h($\alpha$));
(b) generating, in each of the share management apparatuses PA($\alpha$, h($\alpha$)), a shared secret value DSH($\alpha$, h($\alpha$)) by performing a common operation to one of the shares SH($\alpha$, h($\alpha$)) and common information containing one of common values $\sigma(\alpha)$, each of the common values $\sigma(\alpha)$ being shared in each of the subsets SUB($\alpha$), and outputting the shared secret value DSH($\alpha$, h($\alpha$));
(c) generating, in an acquisition apparatus, reconstructed secret values SUBSK($\alpha$) corresponding to the subsets SUB($\alpha$) respectively, each of the reconstructed secret values SUBSK($\alpha$) being generated by reconstruction processing with the secret sharing scheme for each of the subsets SUB($\alpha$), using a plurality of shared secret values DSH($\alpha$, h($\alpha$)) corresponding to same one of the subsets SUB($\alpha$); and
(d) generating, in the acquisition apparatus, generation information SK by using the reconstructed secret values SUBSK($\alpha$) and outputting the generation information SK;
in step (b), the common information used by the share management apparatuses PA($\alpha$, h($\alpha$)) belonging to the same one of the subsets SUB($\alpha$) being the same, and the share management apparatuses PA($\alpha$, h($\alpha$)) belonging to the same one of the subsets SUB($\alpha$) performing the same common operation.

24. A processing method for a share management apparatus, the processing method comprising the steps of:
generating a shared secret value DSH($\alpha$, h($\alpha$)) by performing a common operation to one of the shares SH($\alpha$, h($\alpha$)) obtained by secret sharing of secret information separately for each of subsets SUB($\alpha$) and common information containing one of common values $\sigma(\alpha)$, each of the common values $\sigma(\alpha)$ being shared in each of the subsets SUB($\alpha$), the one of common values $\sigma(\alpha)$ being shared in one of the subsets SUB($\alpha$), each of the subsets SUB($\alpha$) being formed of H($\alpha$) share management apparatuses PA($\alpha$, 1), ..., PA($\alpha$, H($\alpha$)), where $\alpha=1, \ldots, L$, $L\geq 2$, h($\alpha$)=1, ..., H($\alpha$), H($\alpha$)$\geq 2$, in first means of the share management apparatus; and
outputting the shared secret value DSH($\alpha$, h($\alpha$)), in second means of the share management apparatus;
the common information is shared with the share management apparatuses PA($\alpha$, h($\alpha$)) belonging to same one of subsets SUB($\alpha$), and the common operation is performed by the share management apparatuses PA($\alpha$, h($\alpha$)) belonging to the same one of the subsets SUB($\alpha$).

25. A processing method for an acquisition apparatus, the processing method comprising steps of:
generating, in first means of the acquisition apparatus, reconstructed secret values SUBSK($\alpha$) corresponding to subsets SUB($\alpha$) respectively, each of the subsets SUB($\alpha$) being formed of H($\alpha$) share management apparatuses PA($\alpha$, 1), ..., (PA($\alpha$, H($\alpha$)), each of the reconstructed secret values SUBSK($\alpha$) being generated by reconstruction processing with a secret sharing scheme for each of the subsets SUB($\alpha$), using a plurality of shared secret values DSH($\alpha$, h($\alpha$)) corresponding to same one of the subsets SUB($\alpha$), where each of the subsets SUB($\alpha$) is a subset formed of H($\alpha$) share management apparatuses PA($\alpha$, 1), ..., PA($\alpha$, H($\alpha$)), $\alpha=1, \ldots, L$, $L \geq 2$, h($\alpha$)=1, ..., H($\alpha$), H($\alpha$) $\geq 2$; and
generating, in second means of the acquisition apparatus, generation information SK by using the reconstructed secret values SUBSK($\alpha$) and outputting the generation information SK, wherein
each of the reconstructed secret values SUBSK($\alpha$) is SUBSK($\alpha$)=$\sigma(\alpha) \cdot \{\Sigma_{\mu=1}^{n} w_\mu \cdot b_\mu^*\} + \Sigma_{\mu=n+1}^{n+\zeta} b_\mu^* \in G^{n+\zeta}$, where $\sigma(\alpha)$ is a common value shared in each of the subsets SUB($\alpha$), $\vec{w}$ is an n-dimensional vector $\vec{w}=(w_1, \ldots, w_n)$ having elements of a finite field $F_q$ as elements $w_\mu$ where $\mu=1, \ldots, n$, g is a generator of a cyclic group G, $\theta(i, \beta)$ is an element of the finite field $F_q$, $i=1, \ldots, n+\zeta$, $\beta=1, \ldots, n+\zeta$, $n \geq 1, \zeta \geq 1$, and $b_i^* = (\theta(i, 1) \cdot g, \ldots, \theta(i, n+\zeta) \cdot g) \in G^{n+\zeta}$ is an $(n+\zeta)$-dimensional basis vector having $(n+\zeta)$ elements of the cyclic group G as elements.

26. The processing method according to claim 25, wherein the generation information is $SK = \{(\sigma(1) + \ldots + \sigma(L))/L\} \cdot \{\Sigma_{\mu=1}^{n} w_\mu \cdot b_\mu^*\} + \Sigma_{\mu=n+1}^{n+\zeta} b_\mu^*$.

27. A non-transitory computer-readable recording medium having stored thereon a program for causing a computer to function as the share management apparatus according to one of claims 16 to 20.

28. A non-transitory computer-readable recording medium having stored thereon a program for causing a computer to function as the acquisition apparatus according to claim 21 or 22.

\* \* \* \* \*